(12) United States Patent
Baker et al.

(10) Patent No.: US 6,493,761 B1
(45) Date of Patent: *Dec. 10, 2002

(54) SYSTEMS AND METHODS FOR DATA PROCESSING USING A PROTOCOL PARSING ENGINE

(75) Inventors: Peter D. Baker, Aliso Viejo; Karen Neal, Los Angeles, both of CA (US)

(73) Assignee: NB Networks, Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/898,852

(22) Filed: Jul. 3, 2001

Related U.S. Application Data

(63) Continuation-in-part of application No. 09/113,704, filed on Jul. 10, 1998, now Pat. No. 6,266,700, which is a continuation of application No. 09/080,325, filed on May 15, 1998, now Pat. No. 6,000,041, which is a continuation of application No. 08/888,875, filed on Jul. 7, 1997, now Pat. No. 5,781,729, which is a continuation of application No. 08/575,506, filed on Dec. 20, 1995, now Pat. No. 5,793,954.

(51) Int. Cl.[7] .......................... G06F 15/16; H04L 12/28
(52) U.S. Cl. ........................ 709/230; 709/220; 709/223; 709/224; 709/250; 370/401
(58) Field of Search .................. 709/200, 202–203, 709/213–214, 220, 223–224, 227–230, 249–250; 370/400–401

(56) References Cited

U.S. PATENT DOCUMENTS

| | | | | | |
|---|---|---|---|---|---|
| 5,121,342 | A | * | 6/1992 | Szymborski et al. | 709/224 |
| 5,515,513 | A | * | 5/1996 | Metzger et al. | 370/401 |
| 5,727,149 | A | * | 3/1998 | Hirata et al. | 709/250 |
| 5,764,899 | A | * | 6/1998 | Eggleston et al. | 709/203 |
| 5,781,729 | A | * | 7/1998 | Baker et al. | 709/230 |
| 5,793,954 | A | * | 8/1998 | Baker et al. | 709/250 |
| 5,796,954 | A | * | 8/1998 | Hanif et al. | 709/230 |
| 5,826,030 | A | * | 10/1998 | Hebert | 709/220 |

* cited by examiner

Primary Examiner—Bharat Barot
(74) Attorney, Agent, or Firm—Lyon & Lyon LLP

(57) ABSTRACT

The invention provides a general-purpose data parsing and analysis system and methods of use. A common system is used for analyzing any data composed of interrelated data structures similar to the protocols found within network frames. A single logic control module is utilized to perform any number of data manipulation functions, for example parsing, filtering, statistics collection and format conversion based upon one or more programmably configurable protocol descriptions, which may be stored in and retrieved from an associated data storage device.

14 Claims, 24 Drawing Sheets

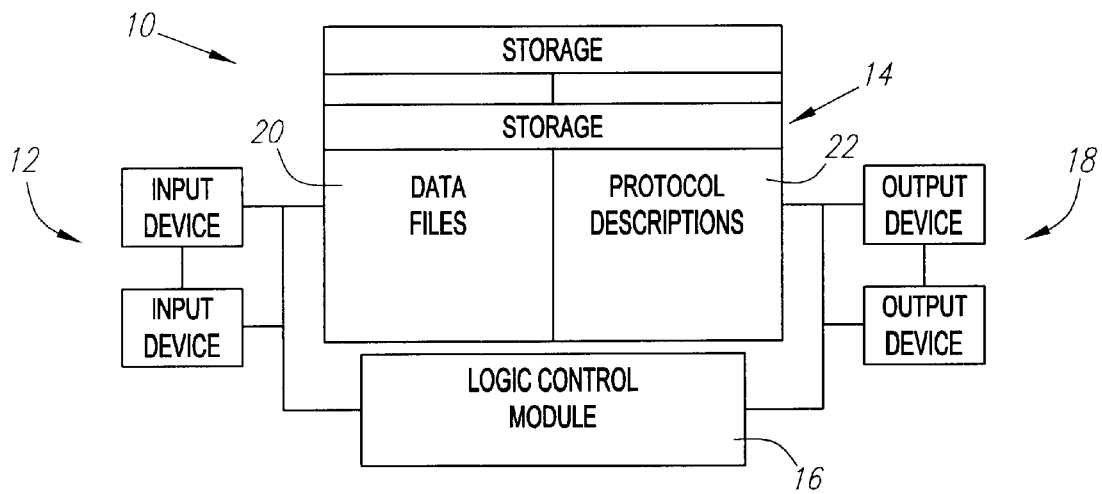
FIG. 1
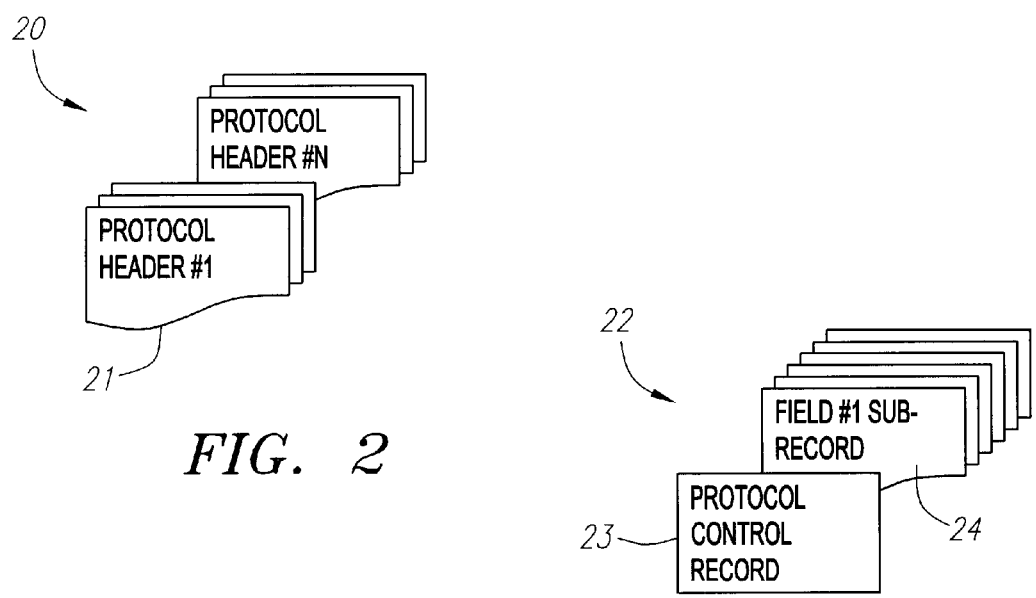
FIG. 2
FIG. 3

| BASE PROTOCOL CONTROL RECORD ASCII CHARACTER SET | | | | | |
|---|---|---|---|---|---|
| PROTOCOL NAME | NUMBITS | NUMFIELDS | CURFIELD | FIELDS | OPTIONS |
| BASEPROTOCOL | 72 | 10 | 0 | FIG. 9A | [NONE] |

*FIG. 9*

| INDEX | FIELD NAME | BIT OFFSET | BIT LENGTH | LEFT SHIFT | RIGHT SHIFT | DEFAULT (HEX) | FRAME LENGTH | HEADER LENGTH | STATISTICS | LOOKUP STRUCTURE | FILTER STRUCTURE | FORMAT |
|---|---|---|---|---|---|---|---|---|---|---|---|---|
| 0 | FIELD 0 | 0 | 0 | 24 | 24 | - | 0 | 0 | [NONE] | FIG 9B | [NONE] | HEX |
| 1 | FIELD 1 | 8 | 8 | 24 | 24 | -1 | 0 | 0 | INCNTRL EODOC | FIG 9C | [NONE] | HEX |
| 2 | FIELD 2 | 16 | 8 | 24 | 24 | 0 | 0 | 0 | INCNTRL | FIG 9C | [NONE] | HEX |
| 3 | FIELD 3 | 24 | 8 | 24 | 24 | 9 | 0 | 0 | LF | FIG 9C | [NONE] | HEX |
| 4 | FIELD 4 | 32 | 8 | 24 | 24 | c | 0 | 0 | INLINE INSENT INPARA INSPACE INDOC EOWORD EOPAGE | FIG 9C | [NONE] | HEX |
| 5 | FIELD 5 | 40 | 8 | 24 | 24 | d | 0 | 0 | CR | FIG 9C | [NONE] | HEX |
| 6 | FIELD 6 | 48 | 8 | 24 | 24 | 20 | 0 | 0 | ALLSPACE | FIG 9C | [NONE] | HEX |
| 7 | FIELD 7 | 56 | 8 | 24 | 24 | 21 | 0 | 0 | SENTENCE | FIG 9C | [NONE] | HEX |
| 8 | FIELD 8 | 64 | 8 | 24 | 24 | 22 | 0 | 0 | PUNCTUATION | FIG 9C | [NONE] | HEX |
| 9 | FIELD 9 | 72 | 8 | 24 | 24 | 30 | 0 | 0 | ALPHANUMERIC | FIG 9C | [NONE] | HEX |

*FIG. 9A*

| FIELD 0 LOOKUP_ARRAY STRUCTURE | | | |
|---|---|---|---|
| ARRAY INDEX | FIELD INDEX | NEXTFIELD INDEX | NEXT PROTOCOL |
| 0 | 1 | 0 | NULL |
| 1 | 2 | 0 | NULL |
| 2 | 2 | 0 | NULL |
| 3 | 2 | 0 | NULL |
| 4 | 2 | 0 | NULL |
| 5 | 2 | 0 | NULL |
| 6 | 2 | 0 | NULL |
| 7 | 2 | 0 | NULL |
| 8 | 2 | 0 | NULL |
| 9 | 2 | 0 | NULL |
| 10 | 3 | 0 | NULL |
| 11 | 3 | 0 | NULL |
| 12 | 3 | 0 | NULL |
| 13 | 4 | 0 | NULL |
| 14 | 5 | 0 | NULL |
| 15 | 2 | 0 | NULL |
| 16 | 2 | 0 | NULL |
| 17 | 2 | 0 | NULL |
| 18 | 2 | 0 | NULL |
| 19 | 2 | 0 | NULL |
| 20 | 2 | 0 | NULL |
| 21 | 2 | 0 | NULL |
| 22 | 2 | 0 | NULL |
| 23 | 2 | 0 | NULL |
| 24 | 2 | 0 | NULL |
| 25 | 2 | 0 | NULL |
| 26 | 2 | 0 | NULL |
| 27 | 2 | 0 | NULL |
| 28 | 2 | 0 | NULL |
| 29 | 2 | 0 | NULL |
| 30 | 2 | 0 | NULL |
| 31 | 2 | 0 | NULL |
| 32 | 2 | 0 | NULL |
| 33 | 6 | 0 | NULL |
| 34 | 7 | 0 | NULL |
| 35 | 8 | 0 | NULL |
| 36 | 8 | 0 | NULL |
| 37 | 8 | 0 | NULL |
| 38 | 8 | 0 | NULL |
| 39 | 8 | 0 | NULL |
| 40 | 8 | 0 | NULL |
| 41 | 8 | 0 | NULL |
| 42 | 8 | 0 | NULL |
| 43 | 8 | 0 | NULL |

*FIG. 9B*

| FIELD 0 LOOKUP_ARRAY STRUCTURE | | | |
|---|---|---|---|
| ARRAY INDEX | FIELD INDEX | NEXTFIELD INDEX | NEXT PROTOCOL |
| 44 | 8 | 0 | NULL |
| 45 | 8 | 0 | NULL |
| 46 | 8 | 0 | NULL |
| 47 | 7 | 0 | NULL |
| 48 | 8 | 0 | NULL |
| 49 | 9 | 0 | NULL |
| 50 | 9 | 0 | NULL |
| 51 | 9 | 0 | NULL |
| 52 | 9 | 0 | NULL |
| 53 | 9 | 0 | NULL |
| 54 | 9 | 0 | NULL |
| 55 | 9 | 0 | NULL |
| 56 | 9 | 0 | NULL |
| 57 | 9 | 0 | NULL |
| 58 | 9 | 0 | NULL |
| 59 | 8 | 0 | NULL |
| 60 | 8 | 0 | NULL |
| 61 | 8 | 0 | NULL |
| 62 | 8 | 0 | NULL |
| 63 | 8 | 0 | NULL |
| 64 | 7 | 0 | NULL |
| 65 | 8 | 0 | NULL |
| 66 | 9 | 0 | NULL |
| 67 | 9 | 0 | NULL |
| 68 | 9 | 0 | NULL |
| 69 | 9 | 0 | NULL |
| 70 | 9 | 0 | NULL |
| 71 | 9 | 0 | NULL |
| 72 | 9 | 0 | NULL |
| 73 | 9 | 0 | NULL |
| 74 | 9 | 0 | NULL |
| 75 | 9 | 0 | NULL |
| 76 | 9 | 0 | NULL |
| 77 | 9 | 0 | NULL |
| 78 | 9 | 0 | NULL |
| 79 | 9 | 0 | NULL |
| 80 | 9 | 0 | NULL |
| 81 | 9 | 0 | NULL |
| 82 | 9 | 0 | NULL |
| 83 | 9 | 0 | NULL |
| 84 | 9 | 0 | NULL |
| 85 | 9 | 0 | NULL |
| 86 | 9 | 0 | NULL |
| 87 | 9 | 0 | NULL |
| 88 | 9 | 0 | NULL |

*FIG. 9B-1*

| FIELD 0 LOOKUP_ARRAY STRUCTURE | | | |
|---|---|---|---|
| ARRAY INDEX | FIELD INDEX | NEXTFIELD INDEX | NEXT PROTOCOL |
| 89 | 9 | 0 | NULL |
| 90 | 9 | 0 | NULL |
| 91 | 9 | 0 | NULL |
| 92 | 8 | 0 | NULL |
| 93 | 8 | 0 | NULL |
| 94 | 8 | 0 | NULL |
| 95 | 8 | 0 | NULL |
| 96 | 9 | 0 | NULL |
| 97 | 8 | 0 | NULL |
| 98 | 9 | 0 | NULL |
| 99 | 9 | 0 | NULL |
| 100 | 9 | 0 | NULL |
| 101 | 9 | 0 | NULL |
| 102 | 9 | 0 | NULL |
| 103 | 9 | 0 | NULL |
| 104 | 9 | 0 | NULL |
| 105 | 9 | 0 | NULL |
| 106 | 9 | 0 | NULL |
| 107 | 9 | 0 | NULL |
| 108 | 9 | 0 | NULL |
| 109 | 9 | 0 | NULL |
| 110 | 9 | 0 | NULL |
| 111 | 9 | 0 | NULL |
| 112 | 9 | 0 | NULL |
| 113 | 9 | 0 | NULL |
| 114 | 9 | 0 | NULL |
| 115 | 9 | 0 | NULL |
| 116 | 9 | 0 | NULL |
| 117 | 9 | 0 | NULL |
| 118 | 9 | 0 | NULL |
| 119 | 9 | 0 | NULL |
| 120 | 9 | 0 | NULL |
| 121 | 9 | 0 | NULL |
| 122 | 9 | 0 | NULL |
| 123 | 9 | 0 | NULL |
| 124 | 8 | 0 | NULL |
| 125 | 8 | 0 | NULL |
| 126 | 8 | 0 | NULL |
| 127 | 8 | 0 | NULL |
| 128 | 2 | 0 | NULL |
| 129 | 0 | 0 | NULL |
| ⋮ | | | |
| 257 | 0 | 0 | NULL |

*FIG. 9B-2*

| TEST_LOOKUP STRUCTURE FOR SINGLE-BYTE CHARACTER FIELDS 1 THROUGH N | | | | | | |
|---|---|---|---|---|---|---|
| PROTOCOL | NEXT INDEX | MINIMUM | MAXIMUM | MASK | TRANSLATION | SHOW |
| FIGURE 9 | 0 | 0x0000 | 0xFFFF | ALL | "UNKNOWN" | FALSE |

*FIG. 9C*

| BASE PROTOCOL CONTROL RECORD ASCII CHARACTER SET AND WORDPERFECT SINGLE BYTE CONTROL CHARACTERS | | | | | |
|---|---|---|---|---|---|
| PROTOCOL NAME | NUMBITS | NUMFIELDS | CURFIELD | FIELDS | OPTIONS |
| BASEPROTOCOL | 80 | 11 | 0 | FIG 10A | [NONE] |

| BASE PROTOCOL CONTROL RECORD ASCII CHARACTER SET AND WORDPERFECT SINGLE BYTE AND EXAMPLE MULTI-BYTE CONTROL CHARACTERS | | | | | |
|---|---|---|---|---|---|
| PROTOCOL NAME | NUMBITS | NUMFIELDS | CURFIELD | FIELDS | OPTIONS |
| BASEPROTOCOL | 152 | 20 | 0 | FIG 10A | [NONE] |

*FIG. 10*

FIELDS FOR BASEPROTOCOL CONTROL RECORD ASCII CHARACTER SET AND WORDPERFECT SINGLE BYTE CONTROL CHARACTERS

| INDEX | FIELD NAME | BIT OFFSET | BIT LENGTH | LEFT SHIFT | RIGHT SHIFT | DEFAULT (HEX) | FRAME LENGTH | HEADER LENGTH | STATISTICS | LOOKUP STRUCTURE | FILTER STRUCTURE | FORMAT |
|---|---|---|---|---|---|---|---|---|---|---|---|---|
| 0 | FIELD 0 | 0 | 0 | 24 | 24 | - | 0 | 0 | [NONE] | FIG 10B | [NONE] | HEX |
| 1 | FIELD 1 | 8 | 8 | 24 | 24 | -1 | 0 | 0 | INCNTRL EODOC | FIG 10C | [NONE] | HEX |
| 2 | FIELD 2 | 16 | 8 | 24 | 24 | 0 | 0 | 0 | INCNTRL | FIG 10C | [NONE] | HEX |
| 3 | FIELD 3 | 24 | 8 | 24 | 24 | a | 0 | 0 | LF | FIG 10C | [NONE] | HEX |
| 4 | FIELD 4 | 32 | 8 | 24 | 24 | c | 0 | 0 | INLINE INSENT INPARA INSPACE INDOC EOWORD EOPAGE | FIG 10C | [NONE] | HEX |
| 5 | FIELD 5 | 40 | 8 | 24 | 24 | d | 0 | 0 | CR |  | [NONE] | HEX |
| 6 | FIELD 6 | 48 | 8 | 24 | 24 | 20 | 0 | 0 | ALLSPACE | FIG 10C | [NONE] | HEX |
| 7 | FIELD 7 | 56 | 8 | 24 | 24 | 21 | 0 | 0 | SENTENCE | FIG 10C | [NONE] | HEX |
| 8 | FIELD 8 | 64 | 8 | 24 | 24 | 22 | 0 | 0 | PUNCTUATION | FIG 10C | [NONE] | HEX |
| 9 | FIELD 9 | 72 | 8 | 24 | 24 | 30 | 0 | 0 | ALPHANUMERIC | FIG 10C | [NONE] | HEX |
| 10 | FIELD 10 | 80 | 8 | 24 | 24 | a9 | 0 | 0 | INCNTRL INDOC INLINE EOWORD EOSPACE INPAGE INPARA INSENT | FIG 10C | [NONE] | HEX |

FIELDS FOR BASEPROTOCOL CONTROL RECORD WORDPERFECT EXAMPLE MULTI-BYTE CONTROL CHARACTERS

| INDEX | FIELD NAME | BIT OFFSET | BIT LENGTH | LEFT SHIFT | RIGHT SHIFT | DEFAULT (HEX) | FRAME LENGTH | HEADER LENGTH | STATISTICS | LOOKUP STRUCTURE | FILTER STRUCTURE | FORMAT |
|---|---|---|---|---|---|---|---|---|---|---|---|---|
| 11 | FIELD 11 | 88 | 8 | 24 | 24 | c1 | 0 | 0 | INCNTRL INDOC INLINE EOWORD EOSPACE INPAGE INPARA INSENT | FIG 10C | [NONE] | HEX |
| 12 | FIELD 12 | 96 | 8 | 24 | 24 | c3 | 0 | 0 | INCNTRL INDOC INLINE EOWORD EOSPACE INPAGE INPARA INSENT | FIG 10C | [NONE] | HEX |
| 13 | FIELD 13 | 104 | 8 | 24 | 24 | c4 | 0 | 0 | INCNTRL INDOC INLINE EOWORD EOSPACE INPAGE INPARA INSENT | FIG 10C | [NONE] | HEX |
| 14 | FIELD 14 | 112 | 8 | 24 | 24 | d0 | 0 | 0 | INCNTRL INDOC INLINE EOWORD EOSPACE INPAGE INPARA INSENT | FIG 10C | [NONE] | HEX |

*FIG. 10A*

| 15 | FIELD 15 | 120 | 8 | 24 | 24 | d2 | 0 | 0 | INCNTRL INDOC INLINE EOWORD EOSPACE INPAGE INPARA INSENT | FIG 10C | [NONE] | HEX |
|----|----------|-----|---|----|----|----|---|---|------|---------|--------|-----|
| 16 | FIELD 16 | 128 | 8 | 24 | 24 | d3 | 0 | 0 | INCNTRL INDOC INLINE EOWORD EOSPACE INPAGE INPARA INSENT | FIG 10C | [NONE] | HEX |
| 17 | FIELD 17 | 136 | 8 | 24 | 24 | d9 | 0 | 0 | INCNTRL INDOC INLINE EOWORD EOSPACE INPAGE INPARA INSENT | FIG 10C | [NONE] | HEX |
| 18 | FIELD 18 | 144 | 8 | 24 | 24 | dc | 0 | 0 | INCNTRL INDOC INLINE EOWORD EOSPACE INPAGE INPARA INSENT | FIG 10C | [NONE] | HEX |
| 19 | FIELD 19 | 152 | 8 | 24 | 24 | ff | 0 | 0 | INCNTRL INDOC INLINE EOWORD EOSPACE INPAGE INPARA INSENT | FIG 10C | [NONE] | HEX |

*FIG. 10A-1*

| FIELD 0 LOOKUP_ARRAY STRUCTURE | | | |
|---|---|---|---|
| ARRAY INDEX | FIELD INDEX | NEXTFIELD INDEX | NEXT PROTOCOL |
| ⋮ | | | |
| 10 | 2 | 0 | NULL |
| ⋮ | | | |
| 96 | 8 | 0 | NULL |
| ⋮ | | | |
| 128 | 2 | 0 | NULL |
| 129 | 3 | 0 | NULL |
| 130 | 2 | 0 | NULL |
| 131 | 2 | 0 | NULL |
| 132 | 2 | 0 | NULL |
| 133 | 2 | 0 | NULL |
| 134 | 2 | 0 | NULL |
| 135 | 2 | 0 | NULL |
| 136 | 2 | 0 | NULL |
| 137 | 2 | 0 | NULL |
| 138 | 2 | 0 | NULL |
| 139 | 2 | 0 | NULL |
| 140 | 2 | 0 | NULL |
| 141 | 3 | 0 | NULL |
| 142 | 2 | 0 | NULL |
| 143 | 2 | 0 | NULL |
| 144 | 2 | 0 | NULL |
| 145 | 3 | 0 | NULL |
| 146 | 3 | 0 | NULL |
| 147 | 3 | 0 | NULL |
| 148 | 3 | 0 | NULL |
| 149 | 3 | 0 | NULL |
| 150 | 3 | 0 | NULL |
| 151 | 2 | 0 | NULL |
| 152 | 2 | 0 | NULL |
| 153 | 2 | 0 | NULL |
| 154 | 3 | 0 | NULL |
| 155 | 2 | 0 | NULL |
| 156 | 2 | 0 | NULL |
| 157 | 2 | 0 | NULL |
| 158 | 2 | 0 | NULL |
| 159 | 2 | 0 | NULL |
| 160 | 2 | 0 | NULL |
| 161 | 3 | 0 | NULL |
| 162 | 2 | 0 | NULL |

*FIG. 10B*

|     |     |     |      |
|-----|-----|-----|------|
| 163 | 2   | 0   | NULL |
| 164 | 2   | 0   | NULL |
| 165 | 2   | 0   | NULL |
| 166 | 2   | 0   | NULL |
| 167 | 2   | 0   | NULL |
| 168 | 2   | 0   | NULL |
| 169 | 2   | 0   | NULL |
| 170 | 7   | 0   | NULL |
| 171 | a   | 0   | NULL |
| 172 | a   | 0   | NULL |
| 173 | a   | 0   | NULL |
| 174 | a   | 0   | NULL |
| 175 | a   | 0   | NULL |
| 176 | 2   | 0   | NULL |
| 177 | 2   | 0   | NULL |
| 178 | 2   | 0   | NULL |
| 179 | 2   | 0   | NULL |
| 180 | 2   | 0   | NULL |
| 181 | 2   | 0   | NULL |
| 182 | 2   | 0   | NULL |
| 183 | 2   | 0   | NULL |
| 184 | 2   | 0   | NULL |
| 185 | 2   | 0   | NULL |
| 186 | 2   | 0   | NULL |
| 187 | 2   | 0   | NULL |
| 188 | 2   | 0   | NULL |
| 189 | 2   | 0   | NULL |
| 190 | 2   | 0   | NULL |
| 191 | 2   | 0   | NULL |
| 192 | 2   | 0   | NULL |
| 193 | 0   | 0   | NULL |
| ⋮   |     |     |      |
| 257 | 0   | 0   | NULL |

*FIG. 10B-1*

| TEST_LOOKUP STRUCTURE FOR SINGLE-BYTE AND MULTI-BYTE CHARACTER FIELDS 1 THROUGH N ||||||| 
| PROTOCOL | NEXT INDEX | MINIMUM | MAXIMUM | MASK | TRANSLATION | SHOW |
| FIGURE 10 | 0 | 0x0000 | 0xFFFF | ALL | "UNKNOWN" | FALSE |

*FIG. 10C*

| FIELD 0 LOOKUP_ARRAY STRUCTURE | | | |
|---|---|---|---|
| ARRAY INDEX (HEX) | FIELD INDEX | NEXTFIELD INDEX | NEXT PROTOCOL |
| c1 | 11 | 0 | CENTER_ALIGN_TAB_LEFT_MARGINRELEASE PROTOCOL |
| c3 | 12 | 0 | ATTRIBUTE_ON_PROTOCOL |
| c4 | 13 | 0 | ATTRIBUTE_OFF_PROTOCOL |
| d0 | 14 | 0 | PAGE FORMAT_CONTROL_PROTOCOL |
| d2 | 15 | 0 | DEFINE_TABLES PROTOCOL |
| d3 | 16 | 0 | SET_UNDERLINE_MODE PROTOCOL |
| d9 | 17 | 0 | LEADING_ADJUSTMENT PROTOCOL |
| dc | 18 | 0 | TABLE_END_OF_LINE_CODES PROTOCOL |
| ff | 19 | 0 | STANDARD_PREFIX PROTOCOL |

*FIG. 10D*

| STANDARD_PREFIX CONTROL RECORD | | | | | |
|---|---|---|---|---|---|
| PROTOCOL NAME | NEXT BITS | NUMFIELDS | CURFIELD | FIELDS | OPTIONS |
| STANDARD_PREFIX PROTOCOL | 128 | 3 | 0 | FIG 11A | |

*FIG. 11*

| INDEX | FIELD NAME | BIT OFFSET | BIT LENGTH | LEFT SHIFT | RIGHT SHIFT | DEFAULT (HEX) | FRAME LENGTH | HEADER LENGTH | LOOKUP STRUCTURE | FILTER STRUCTURE | FORMAT |
|---|---|---|---|---|---|---|---|---|---|---|---|
| 0 | FUNCTION | 0 | 0 | 24 | 24 | ff | 0 | 0 | FIG 11B | [NONE] | HEX |
| 1 | WORDPERFECT FILE ID | 8 | 24 | 8 | 8 | 575043 | 0 | 0 | [NONE] | [NONE] | HEX |
| 2 | TOTAL LENGTH OF PREFIX | 32 | 32 | 0 | 0 | 2f0 | 0 | 8 | [NONE] | [NONE] | HEX |

*FIG. 11A*

| LOOKUP STRUCTURE | | | | | | |
|---|---|---|---|---|---|---|
| PROTOCOL | NEXT INDEX | MINIMUM | MAXIMUM | MASK | TRANSLATION | SHOW |
| FIGURE 10 | 0 | 0x0000 | 0xFFFF | ALL | "UNKNOWN" | FALSE |

*FIG. 11B*

| CENTER_ALIGN_TAB_MARGIN_RELEASE PROTOCOL CONTROL RECORD | | | | | |
|---|---|---|---|---|---|
| PROTOCOL NAME | NUM BITS | NUMFIELDS | CURFIELD | FIELDS | OPTIONS |
| CENTER_ALIGN_TAB_LEFT_ MARGIN_RELEASE PROTOCOL | 72 | 6 | 0 | FIG 12A | [NONE] |

*FIG. 12*

| INDEX | FIELD NAME | BIT OFFSET | BIT LENGTH | LEFT SHIFT | RIGHT SHIFT | DEFAULT (HEX) | FRAME LENGTH | HEADER LENGTH | LOOKUP STRUCTURE | FILTER STRUCTURE | FORMAT |
|---|---|---|---|---|---|---|---|---|---|---|---|
| 0 | FUNCTION | 0 | 8 | 24 | 24 | c1 | 0 | 0 | FIG 11B | [NONE] | HEX |
| 1 | FLAGS | 8 | 8 | 24 | 24 | [NONE] | 0 | 0 | [NONE] | [NONE] | HEX |
| 2 | OLD COLUMN | 16 | 16 | 16 | 16 | [NONE] | 0 | 0 | [NONE] | [NONE] | HEX |
| 3 | ABS POSITION | 32 | 16 | 16 | 16 | [NONE] | 0 | 0 | [NONE] | [NONE] | HEX |
| 4 | START POSITION | 48 | 16 | 16 | 16 | [NONE] | 0 | 0 | [NONE] | [NONE] | HEX |
| 5 | END FUNCTION | 64 | 8 | 24 | 24 | c1 | 0 | 0 | [NONE] | [NONE] | HEX |

*FIG. 12A*

| ATTRIBUTE_ON_PROTOCOL CONTROL RECORD | | | | | |
|---|---|---|---|---|---|
| PROTOCOL NAME | NUM BITS | NUMFIELDS | CURFIELD | FIELDS | OPTIONS |
| ATTRIBUTE_ON PROTOCOL | 24 | 3 | 0 | FIG 13A | [NONE] |

*FIG. 13*

| INDEX | FIELD NAME | BIT OFFSET | BIT LENGTH | LEFT SHIFT | RIGHT SHIFT | DEFAULT (HEX) | FRAME LENGTH | HEADER LENGTH | LOOKUP STRUCTURE | FILTER STRUCTURE | FORMAT |
|---|---|---|---|---|---|---|---|---|---|---|---|
| 0 | FUNCTION | 0 | 0 | 24 | 24 | c3 | 0 | 0 | FIG 11B | [NONE] | HEX |
| 1 | ATTRIBUTE TYPE | 8 | 8 | 24 | 24 | [NONE] | 0 | 0 | [NONE] | [NONE] | HEX |
| 2 | END FUNCTION | 16 | 8 | 24 | 24 | c3 | 0 | 8 | [NONE] | [NONE] | HEX |

*FIG. 13A*

| ATTRIBUTE_OFF_PROTOCOL CONTROL RECORD | | | | | |
|---|---|---|---|---|---|
| PROTOCOL NAME | NUM BITS | NUMFIELDS | CURFIELD | FIELDS | OPTIONS |
| ATTRIBUTE_OFF PROTOCOL | 24 | 3 | 0 | FIG 13C | [NONE] |

*FIG. 13B*

| INDEX | FIELD NAME | BIT OFFSET | BIT LENGTH | LEFT SHIFT | RIGHT SHIFT | DEFAULT (HEX) | FRAME LENGTH | HEADER LENGTH | LOOKUP STRUCTURE | FILTER STRUCTURE | FORMAT |
|---|---|---|---|---|---|---|---|---|---|---|---|
| 0 | FUNCTION | 0 | 0 | 24 | 24 | c4 | 0 | 0 | FIG 11B | [NONE] | HEX |
| 1 | ATTRIBUTE TYPE | 8 | 8 | 24 | 24 | [NONE] | 0 | 0 | [NONE] | [NONE] | HEX |
| 2 | END FUNCTION | 16 | 8 | 24 | 24 | c4 | 0 | 8 | [NONE] | [NONE] | HEX |

*FIG. 13C*

| PAGE_FORMAT_PROTOCOL CONTROL RECORD | | | | | |
|---|---|---|---|---|---|
| PROTOCOL NAME | NUM BITS | NUMFIELDS | CURFIELD | FIELDS | OPTIONS |
| PAGE_FROMAT PROTOCOL | 16 | 2 | 0 | FIG 14A | [NONE] |

*FIG. 14*

| INDEX | FIELD NAME | BIT OFFSET | BIT LENGTH | LEFT SHIFT | RIGHT SHIFT | DEFAULT (HEX) | FRAME LENGTH | HEADER LENGTH | LOOKUP STRUCTURE | FILTER STRUCTURE | FORMAT |
|---|---|---|---|---|---|---|---|---|---|---|---|
| 0 | FUNCTION | 0 | 8 | 24 | 24 | D0 | 0 | 0 | [NONE] | [NONE] | HEX |
| 1 | SUB FUNCTION | 8 | 8 | 24 | 24 | 6 | 0 | 0 | FIG 14B | [NONE] | HEX |

*FIG. 14A*

| LOOKUP STRUCTURE | | | | | | |
|---|---|---|---|---|---|---|
| PROTOCOL | NEXT INDEX | MINIMUM | MAXIMUM | MASK | TRANSLATION | SHOW |
| FIGURE 14C | 2 | 0x0 | 0x0 | ALL | "SETLINECTRLHT" | TRUE |
| FIGURE 14E | 2 | 0x6 | 0x6 | ALL | "JUSTIFICATION" | TRUE |

*FIG. 14B*

| SET_LINE_HEIGHT CONTROL RECORD | | | | | |
|---|---|---|---|---|---|
| PROTOCOL NAME | NUM BITS | NUMFIELDS | CURFIELD | FIELDS | OPTIONS |
| SET_LINE_HEIGHT_PROTOCOL | 80 | 6 | 0 | FIG 14D | [NONE] |

*FIG. 14C*

| INDEX | FIELD NAME | BIT OFFSET | BIT LENGTH | LEFT SHIFT | RIGHT SHIFT | DEFAULT (HEX) | FRAME LENGTH | HEADER LENGTH | LOOKUP STRUCTURE | FILTER STRUCTURE | FORMAT |
|---|---|---|---|---|---|---|---|---|---|---|---|
| 0 | LENGTH | 0 | 16 | 16 | 16 | 8 | 0 | 8 | FIG 11C | [NONE] | HEX |
| 1 | OLD LINE HEIGHT | 16 | 16 | 16 | 16 | - | 0 | 0 | [NONE] | [NONE] | HEX |
| 2 | NEW LINE HEIGHT | 32 | 16 | 16 | 16 | - | 0 | 0 | [NONE] | [NONE] | HEX |
| 3 | LENGTH | 48 | 16 | 16 | 16 | 8 | 0 | 0 | [NONE] | [NONE] | HEX |
| 4 | END SUB FUNCTION | 64 | 8 | 24 | 24 | 0 | 0 | 0 | [NONE] | [NONE] | HEX |
| 5 | END FUNCTION | 72 | 8 | 24 | 24 | D0 | 0 | 0 | [NONE] | [NONE] | HEX |

*FIG. 14D*

| JUSTIFICATION CONTROL RECORD | | | | | |
|---|---|---|---|---|---|
| PROTOCOL NAME | NUM BITS | NUMFIELDS | CURFIELD | FIELDS | OPTIONS |
| JUSTIFICATION PROTOCOL | 64 | 6 | 0 | FIG 14F | [NONE] |

*FIG. 14E*

| INDEX | FIELD NAME | BIT OFFSET | BIT LENGTH | LEFT SHIFT | RIGHT SHIFT | DEFAULT (HEX) | FRAME LENGTH | HEADER LENGTH | LOOKUP STRUCTURE | FILTER STRUCTURE | FORMAT |
|---|---|---|---|---|---|---|---|---|---|---|---|
| 0 | LENGTH | 0 | 16 | 16 | 16 | 6 | 0 | 8 | FIG 11C | [NONE] | HEX |
| 1 | OLD JUSTIFICATION | 16 | 8 | 24 | 24 | - | 0 | 0 | [NONE] | [NONE] | HEX |
| 2 | NEW JUSTIFICATION | 24 | 8 | 24 | 24 | - | 0 | 0 | [NONE] | [NONE] | HEX |
| 3 | LENGTH | 32 | 16 | 16 | 16 | 6 | 0 | 0 | [NONE] | [NONE] | HEX |
| 4 | END SUB FUNCTION | 48 | 8 | 24 | 24 | 6 | 0 | 0 | [NONE] | [NONE] | HEX |
| 5 | END FUNCTION | 56 | 8 | 24 | 24 | D0 | 0 | 0 | [NONE] | [NONE] | HEX |

*FIG. 14F*

| DEFINE_TABLES_CONTROL RECORD | | | | | |
|---|---|---|---|---|---|
| PROTOCOL NAME | NUM BITS | NUMFIELDS | CURFIELD | FIELDS | OPTIONS |
| DEFINE_TABLES PROTOCOL | 32 | 3 | 0 | FIG 15A | [NONE] |

*FIG. 15*

| INDEX | FIELD NAME | BIT OFFSET | BIT LENGTH | LEFT SHIFT | RIGHT SHIFT | DEFAULT (HEX) | FRAME LENGTH | HEADER LENGTH | LOOKUP STRUCTURE | FILTER STRUCTURE | FORMAT |
|---|---|---|---|---|---|---|---|---|---|---|---|
| 0 | FUNCTION | 0 | 8 | 24 | 24 | ff | 0 | 0 | FIG 11C | [NONE] | HEX |
| 1 | SUBFUNCTION | 8 | 8 | 8 | 8 | 575043 | 0 | 0 | [NONE] | [NONE] | HEX |
| 2 | LENGTH | 16 | 16 | 16 | 16 | - | 0 | 8 | [NONE] | [NONE] | HEX |

FIG. 15A

| SET_UNDERLINE_MODE_CONTROL RECORD ||||||
|---|---|---|---|---|---|
| PROTOCOL NAME | NUM BITS | NUMFIELDS | CURFIELD | FIELDS | OPTIONS |
| SET_UNDERLINE_MODE PROTOCOL | 80 | 8 | 0 | FIG 16A | [NONE] |

FIG. 16

| INDEX | FIELD NAME | BIT OFFSET | BIT LENGTH | LEFT SHIFT | RIGHT SHIFT | DEFAULT (HEX) | FRAME LENGTH | HEADER LENGTH | LOOKUP STRUCTURE | FILTER STRUCTURE | FORMAT |
|---|---|---|---|---|---|---|---|---|---|---|---|
| 0 | FUNCTION | 0 | 8 | 24 | 24 | d3 | 0 | 0 | FIG 11C | [NONE] | HEX |
| 1 | SUB FUNCTION | 8 | 8 | 24 | 24 | 1 | 0 | 0 | [NONE] | [NONE] | HEX |
| 2 | LENGTH | 16 | 16 | 16 | 16 | 6 | 0 | 8 | [NONE] | [NONE] | HEX |
| 3 | OLD DEFINITION | 32 | 8 | 24 | 24 | - | 0 | 0 | [NONE] | [NONE] | HEX |
| 4 | NEW DEFINITION | 40 | 8 | 24 | 24 | - | 0 | 0 | [NONE] | [NONE] | HEX |
| 5 | LENGTH | 48 | 16 | 16 | 16 | 6 | 0 | 0 | [NONE] | [NONE] | HEX |
| 6 | END SUB FUNCTION | 64 | 8 | 24 | 24 | 1 | 0 | 0 | [NONE] | [NONE] | HEX |
| 7 | END FUNCTION | 72 | 8 | 24 | 24 | d3 | 0 | 0 | [NONE] | [NONE] | HEX |

FIG. 16A

| LEADING_ADJUSTMENT CONTROL RECORD ||||||
|---|---|---|---|---|---|
| PROTOCOL NAME | NUM BITS | NUMFIELDS | CURFIELD | FIELDS | OPTIONS |
| LEADING_ADJUSTMENT PROTOCOL | 128 | 8 | 0 | FIG 17A | [NONE] |

FIG. 17

| INDEX | FIELD NAME | BIT OFFSET | BIT LENGTH | LEFT SHIFT | RIGHT SHIFT | DEFAULT (HEX) | FRAME LENGTH | HEADER LENGTH | LOOKUP STRUCTURE | FILTER STRUCTURE | FORMAT |
|---|---|---|---|---|---|---|---|---|---|---|---|
| 0 | FUNCTION | 0 | 8 | 24 | 24 | d9 | 0 | 0 | FIG 11C | [NONE] | HEX |
| 1 | SUB FUNCTION | 8 | 8 | 24 | 24 | 5 | 0 | 0 | [NONE] | [NONE] | HEX |
| 2 | LENGTH | 16 | 16 | 16 | 16 | 12 | 0 | 8 | [NONE] | [NONE] | HEX |
| 3 | OLD srt_HRr | 32 | 32 | 0 | 0 | - | 0 | 0 | [NONE] | [NONE] | HEX |
| 4 | NEW srt_HRr | 64 | 32 | 0 | 0 | - | 0 | 0 | [NONE] | [NONE] | HEX |
| 5 | LENGTH | 96 | 16 | 16 | 16 | - | 0 | 0 | [NONE] | [NONE] | HEX |
| 6 | END SUB FUNCTION | 112 | 8 | 24 | 24 | 5 | 0 | 0 | [NONE] | [NONE] | HEX |
| 7 | END FUNCTION | 120 | 8 | 24 | 24 | d9 | 0 | 0 | [NONE] | [NONE] | HEX |

*FIG. 17A*

| PAGE_FORMAT_TABLE_END_OF_LINES_CODES_PROTOCOL CONTROL RECORD ||||||
|---|---|---|---|---|---|
| PROTOCOL NAME | NUM BITS | NUMFIELDS | CURFIELD | FIELDS | OPTIONS |
| TABLE END OF LINES CODE PROTOCOL | 16 | 2 | 0 | FIG 18A | [NONE] |

*FIG. 18*

| INDEX | FIELD NAME | BIT OFFSET | BIT LENGTH | LEFT SHIFT | RIGHT SHIFT | DEFAULT (HEX) | FRAME LENGTH | HEADER LENGTH | LOOKUP STRUCTURE | FILTER STRUCTURE | FORMAT |
|---|---|---|---|---|---|---|---|---|---|---|---|
| 0 | FUNCTION | 0 | 8 | 24 | 24 | dc | 0 | 0 | [NONE] | [NONE] | HEX |
| 1 | SUBFUNCTION | 8 | 8 | 24 | 24 | - | 0 | 0 | FIG 18B | [NONE] | HEX |

*FIG. 18A*

| LOOKUP STRUCTURE |||||||
|---|---|---|---|---|---|---|
| PROTOCOL | NEXT INDEX | MINIMUM | MAXIMUM | MASK | TRANSLATION | SHOW |
| FIGURE 18C | 2 | 0x0 | 0x0 | ALL | "BEGINCOLEOL" | TRUE |
| FIGURE 18E | 2 | 0x1 | 0x1 | ALL | "BEGINROWEOL" | TRUE |
| FIGURE 18G | 2 | 0x2 | 0x2 | ALL | "TABLEOFFEOL" | TRUE |

*FIG. 18B*

| BEGINNING_OF_COLUMN_AT_END_LINE CONTROL RECORD ||||||
|---|---|---|---|---|---|
| PROTOCOL NAME | NUM BITS | NUMFIELDS | CURFIELD | FIELDS | OPTIONS |
| BEGINNING_OF_COLUMN_AT_END_OF_LINE PROTOCOL | 136 | 12 | 0 | FIG 18C | [NONE] |

*FIG. 18C*

| INDEX | FIELD NAME | BIT OFFSET | BIT LENGTH | LEFT SHIFT | RIGHT SHIFT | DEFAULT (HEX) | FRAME LENGTH | HEADER LENGTH | LOOKUP STRUCTURE | FILTER STRUCTURE | FORMAT |
|---|---|---|---|---|---|---|---|---|---|---|---|
| 0 | LENGTH | 16 | 16 | 16 | 16 | - | 0 | 8 | [NONE] | [NONE] | HEX |
| 1 | FLAGS | 32 | 8 | 24 | 24 | - | 0 | 0 | [NONE] | [NONE] | HEX |
| 2 | COLUMN NO. | 40 | 8 | 24 | 24 | - | 0 | 0 | [NONE] | [NONE] | HEX |
| 3 | COLUMN SPANNING INFO | 48 | 8 | 24 | 24 | - | 0 | 0 | [NONE] | [NONE] | HEX |
| 4 | ROW SPANNING INFO | 56 | 8 | 24 | 24 | - | 0 | 0 | [NONE] | [NONE] | HEX |
| 5 | OLD FORMATTER | 64 | 16 | 16 | 16 | - | 0 | 0 | [NONE] | [NONE] | HEX |
| 6 | OLD SCREEN | 80 | 16 | 16 | 16 | - | 0 | 0 | [NONE] | [NONE] | HEX |
| 7 | CELL ATTRIBUTES | 96 | 16 | 16 | 16 | - | 0 | 0 | [NONE] | [NONE] | HEX |
| 8 | CELL JUSTIFICATION | 112 | 8 | 24 | 24 | - | 0 | 0 | [NONE] | [NONE] | HEX |
| 9 | LENGTH | 120 | 16 | 16 | 16 | - | 0 | 0 | [NONE] | [NONE] | HEX |
| 10 | END SUB FUNCTION | 136 | 8 | 24 | 24 | 0 | 0 | 0 | [NONE] | [NONE] | HEX |
| 11 | END FUNCTION | 144 | 8 | 24 | 24 | dc | 0 | 0 | [NONE] | [NONE] | HEX |

*FIG. 18D*

| BEGINNING_OF_ROW_AT_END_LINE CONTROL RECORD ||||||
|---|---|---|---|---|---|
| PROTOCOL NAME | NUM BITS | NUMFIELDS | CURFIELD | FIELDS | OPTIONS |
| BEGINNING_OF_ROW_AT_END_OF_LINE PROTOCOL | 16 | 1 | 0 | FIG 18F | [NONE] |

*FIG. 18E*

| INDEX | FIELD NAME | BIT OFFSET | BIT LENGTH | LEFT SHIFT | RIGHT SHIFT | DEFAULT (HEX) | FRAME LENGTH | HEADER LENGTH | LOOKUP STRUCTURE | FILTER STRUCTURE | FORMAT |
|---|---|---|---|---|---|---|---|---|---|---|---|
| 0 | LENGTH | 0 | 16 | 16 | 16 | - | 0 | 8 | [NONE] | [NONE] | HEX |

FIG. 18F

| TABLE_OFF_AT_END_OF_LINE_PROTOCOL CONTROL RECORD ||||||
|---|---|---|---|---|---|
| PROTOCOL NAME | NUM BITS | NUMFIELDS | CURFIELD | FIELDS | OPTIONS |
| TABLE_OFF_AT_END_OF_LINE_PROTOCOL | 16 | 1 | 0 | FIG 18H | [NONE] |

FIG. 18G

| INDEX | FIELD NAME | BIT OFFSET | BIT LENGTH | LEFT SHIFT | RIGHT SHIFT | DEFAULT (HEX) | FRAME LENGTH | HEADER LENGTH | LOOKUP STRUCTURE | FILTER STRUCTURE | FORMAT |
|---|---|---|---|---|---|---|---|---|---|---|---|
| 0 | LENGTH | 0 | 16 | 16 | 16 | - | 0 | 8 | [NONE] | [NONE] | HEX |

FIG. 18H

| FILTER CHANNEL CONTROL STRUCTURE |||
|---|---|---|
| SYSTEM FILTER STATUS | NUMBER OF FILTERS | POINTER TO FILTER CHANNELS |
| FILTER_FILE | 1 | FIG 19A |

FIG. 19

| FILTER CHANNELS ||||| 
|---|---|---|---|---|
| INDEX | NEXTCRITERIAINDEX | TOTALCRITERIA | CRITERIA POINTER | CHANNEL NAME |
| 0 | 0 | 2 | FIG 19B | EXAMPLE |

*FIG. 19A*

| FILTER CRITERIA ARRAY |||
|---|---|---|
| INDEX | CHANNEL POINTER | TEXT FILTER OBJECT |
| 0 | FIG 19A | FIG 19C |
| 1 | FIG 19A | FIG 19D |

*FIG. 19B*

| INDEX 0 FILTER CONDITION TEXT FILTER OBJECT STRUCTURE |||||||||
|---|---|---|---|---|---|---|---|---|
| INDEX | FOUND FLAG | MATCH FLAG | CHANNEL | MATCHBITS | MATCHMASK | MATCH CHAR | TOTAL CHAR | STRING TO MATCH |
| 0 | FALSE | TRUE | EXAMPLE | C_INWORD | C_INWORD | 0 | 16 | "DENVER TO: MAUI" |

*FIG. 19C*

| INDEX 1 FILTER CONDITION TEXT FILTER OBJECT STRUCTURE |||||||||
|---|---|---|---|---|---|---|---|---|
| INDEX | FOUND FLAG | MATCH FLAG | CHANNEL | MATCHBITS | MATCHMASK | MATCH CHAR | TOTAL CHAR | STRING TO MATCH |
| 1 | FALSE | TRUE | EXAMPLE | C_INWORD | C_INWORD | 0 | 8 | "ENGLAND" |

*FIG. 19D*

SYSTEMS AND METHODS FOR DATA PROCESSING USING A PROTOCOL PARSING ENGINE

This is a continuation-in-part of application U.S. Ser. No. 09/113,704, filed on Jul. 10, 1998, titled SYSTEM AND METHOD FOR GENERAL PURPOSE NETWORK ANALYSIS, and naming Peter D. Baker et al as inventors, issued as U.S. Pat. No. 6,266,700, which is itself a continuation of U.S. Ser. No. 09/080,325, filed on May 15, 1998, issued as U.S. Pat. No. 6,000,041, which is itself a continuation of U.S. Ser. No. 08/888,875, filed on Jul. 7, 1997, issued as U.S. Pat. No. 5,781,729, which is itself a continuation of U.S. Ser. No. 08/575,506, filed on Dec. 20, 1995, issued as U.S. Pat. No. 5,793,954. These applications are all hereby incorporated by reference, in their entirety.

COPYRIGHT NOTICE

A portion of the disclosure of this patent document contains material that is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

FIELD OF THE INVENTION

The present invention relates to a general-purpose data parsing and analysis system and, in particular, a common system and method for analyzing any data composed of interrelated data structures similar to the protocols found within network frames.

BACKGROUND OF THE INVENTION

Data search processors perform a number of functions such as data matching, filtering, statistics gathering, converting and bracket matching. Data search processors or tools are typically associated with a specific data editor and are limited to recognizing embedded control characters that are associated with the particular data editor. Data search tools that function independently, meaning that they are not associated with a specific data editor, are not currently able to recognize embedded control characters for any data editor. A discussion of a data editor independent search tool may be found in B. Kernighan, et al., "Regular Expressions," Dr. Dobb's Journal, April, 1999, p. 19–22, the contents of which are incorporated herein by reference.

Data parsing refers to the ability to categorize data into components based on the characteristics of the data values. A practical example of data parsing would consist of the following procedures: (1) efficiently searching for text words in a document that consisted of both text and graphics; (2) identifying the components of the document that are graphical; and (3) skipping over the graphical components rather than searching through them character by character as though they were text or control characters.

Filtering of data files is typically implemented using a value for comparison, and, in some cases, "wildcard" characters within the value. Filtering of data files typically comprises doing a search on the data file, and then taking an action based upon the search results. For example, a filter might search for all instances of a particular data expression, and then provide a count of the total number of instances found.

For multiple value filters, the result from each filter is logically combined together to obtain an overall result. Therefore, each additional result adds to the processing required to filter on that value. Conventional filtering does not typically include a provision to identify embedded graphic images so that the images may be either intentionally examined or skipped over in a data search.

A practical example of data filtering would be to search all components of a document for company proprietary information, and filter out the proprietary information, in order to prevent its unwanted disclosure. Such information might be embedded, or hidden, in the control characters of the data editor format.

Existing data search, filtering and statistical tools are either specific to a particular version of a particular data editor, for example the "Find" or "Word Count" functions typically found in popular word processors, or must parse through files character-by-character without being able to differentiate among data, document format control characters or graphic characters. Thus, the existing tools are either limited by their inability to work across various editors, or, for those tools that are not editor-dependent, their inability to efficiently parse files containing data, document control characters and graphic characters.

Although CPU's available today can execute hundreds of millions or even billions of instructions per second, to achieve the necessary processing rates for most filtering, vendors often must provide dedicated hardware assistance and/or front-end processors with hand-coded assembly language routines. This solution typically requires hardware and/or software modifications whenever changes are made to the number of supported features or editors.

In a conventional data search engine, a string of characters is specified, and the engine searches for the string of characters in the data editor file(s). For an ASCII character set file, the file may contain:

a. alphanumeric characters, such as a–z, A–Z, 0–9;
b. delimiters, such as punctuation characters and spaces;
c. graphics, such as bit maps;
d. control character sequences, such as a sequence of characters that will cause the data editor to show words underlined or in bold print, or change the size of the font; and
e. "junk strings" of characters, such as control character sequences appearing consecutively with different values for the same control or duplicate control character strings, that may be generated by automatic conversions performed on a file to change it from one data editor format to another, for instance a conversion from Word document format to Rich Text Format.

Conventional data search engines cannot be configured to: a) recognize or identify values as i) elements for the control syntax of a data, spreadsheet or other kind of editor, or ii) part of a graphic image; or b) to modify the use of a value by specifying the characteristics associated with the value.

Thus, it is desirable to have a configurable search, filter, statistics, and conversion capability, with common control logic that: a) is applicable to many different data editors or character sets, b) provides field based operations, and c) can be implemented in either hardware or software. By using common control logic, the system can be reconfigured to support the variety of existing data editors, document formats and character sets and to support future data editors, document formats, and character sets without the need for hardware or software modifications. Moreover, the added ability to provide filtering and to collect statistics in hardware may significantly improve performance.

SUMMARY OF THE INVENTION

The present invention is directed to improved systems and methods for parsing, searching, filtering, gathering statistics, and converting data files generated by any data editor, using character sets and editor controls definitions that can be programmably defined. A single logic control module, implemented in either hardware or software, is used to perform a number of data manipulation functions, such as parsing, filtering, statistics gathering, and data conversion. The module is based on one or more programmably configurable protocol descriptions that may be stored in and retrieved from an associated memory.

By using common control logic, meaning a single logic control module, and programmably configurable character-set characteristics and data editor control protocol descriptions, changes can be made to existing data editor control protocol descriptions and support for new data editor control protocol descriptions can be added to a system entirely through user reconfiguration, without the need for hardware or software system modifications. Thus, those skilled in the art will appreciate that a data file manipulation system in accordance with the present invention may be configured and reconfigured in a highly efficient and cost effective manner to implement numerous data manipulation functions, such as parsing, and to accommodate substantial data editor modifications, such as the use of different editors, editor versions, or editor formats, without requiring substantial system changes.

In a preferred embodiment, the system employs a CPU or other hardware-implemented method as a processing unit for analyzing files in response to selectively programmed parsing, filtering, statistics gathering, and display requests. The embodiment may be incorporated in a device, including a CPU and a plurality of input devices, storage devices, and output devices wherein files are received from the input devices, stored in the storage devices, processed by the CPU based upon one or more programmably configurable protocol descriptions also stored in the storage devices, and displayed on the output devices. The protocol descriptions may take the form of one or more protocol descriptions for each supported data editor control defined therein.

A preferred embodiment of the logic control module includes logic for:
  a) extracting field values from a particular file and making parsing decisions based upon field values and information in protocol descriptions;
  b) filtering a subset of files or data from the input or storage devices that satisfies a filter criteria based upon information stored in a protocol description;
  c) filtering a subset of files or data from the input or storage devices that satisfies a filter criteria based upon information stored in a Data-Filter-Object criteria;
  d) filtering files or data that satisfy a filter criteria which includes several filter criteria joined together by Boolean operators, wherein the system creates an intermediate filter result for each criteria representing a filter/don't filter decision for each field;
  e) analyzing a filter request by breaking the request into its component criteria to determine whether the result from evaluating particular filter request criteria, when combined with results from earlier criteria, can be used to filter a particular file or data;
  f) collecting statistics based upon extracted field values that satisfy a statistics criteria based upon information stored in a protocol description;
  g) determining the next protocol description structure required to continue analyzing a file;
  h) determining a file length, individual protocol header lengths, and embedded lengths from extracted field values in a file;
  i) determining display formats based on information contained in protocol descriptions;
  j) evaluating individual field values and making parsing decisions based on the values; and
  k) converting files by altering field contents based on information contained in protocol descriptions.

The system gains a distinct advantage in size and maintainability over conventional data search/analysis/filter devices by implementing analysis capabilities for each data editor, data editor character, and data editor embedded control set, using common control logic. Furthermore, the system gains a distinct advantage in speed and efficiency over conventional data analysis devices when the control logic is implemented in hardware or a front-end processor, without requiring additional hardware and/or software development when data editors or data editor versions change.

Accordingly, it is the object of the present invention to provide improved systems, methods and machine implemented processes for data file analysis;
  a) wherein the elements of the character set and the elements of the data editor controls that exist in the file are determined, also referred to herein as parsing, using a common control logic combined with configurable protocol descriptions and configurable character sets;
  b) wherein the control logic may be implemented in hardware as well as software;
  c) wherein each supported analysis capability is configurable even when the control logic is implemented in hardware;
  d) that determine if a particular data file includes a field that satisfies a particular filter criterion;
  e) that determine if a particular data file includes a field that satisfies a particular statistics gathering criterion; and
  f) that convert data files from the format and characteristics of one data editor's selected protocol descriptions to those of another data editor.

BRIEF DESCRIPTION OF THE DRAWINGS

FIG. 1 is a block diagram of an embodiment of a data file parsing and analysis system.

FIG. 2 is a diagram representing a set of data records of a typical data file contained in the data files of the embodiment of FIG. 1.

FIG. 3 is a diagram representing an embodiment of the data records of a protocol description.

FIG. 9 is a diagram representing an embodiment of the control record of the BaseProtocol description for the ASCII data character set which may be utilized in a data analysis system.

FIG. 9A is a diagram representing the ten defined field sub-records of the ASCII BaseProtocol description structure of the embodiment of FIG. 9.

FIGS. 9B and 9C are diagrams representing the lookup structures of the embodiment of FIG. 9A, fields 0 and 1 through 9 respectively.

FIG. 10 is a diagram representing an embodiment of the control record of the BaseProtocol description for the character set for the WORDPERFECT Version 5.1 for WINDOWS text editor that may be utilized in a data analysis system. (WORDPERFECT is a registered trademark of Corel Corporation of Ontario, Canada and WINDOWS is a registered trademark of Microsoft Corporation of Redmond, Wash.)

FIG. 10A is a diagram representing the field sub-records of the BaseProtocol description structure of the embodiment of FIG. 10.

FIG. 10B is a diagram representing the lookup structures of the embodiment of FIG. 10A, field 0, before the initialization processing of any multi-byte character protocol descriptions.

FIGS. 10C and 10D are diagrams representing the lookup structures of the embodiments of FIG. 10A fields 0 and 1 through 19 respectively after the initialization processing of the exemplary multi-byte character protocol descriptions.

FIGS. 11, 12, 13, 13B, 14, 14C, 14E, 15, 16, 17, 18, 18C, 18E, and 18G are diagrams representing embodiments of the control record of various multi-byte control character protocol descriptions for the character set for the WORDPERFECT Version 5.1 for WINDOWS text editor that may be utilized in a data analysis system.

FIGS. 11A, 12A, 13A, 13C, 14A, 14D, 14F, 15A, 16A, 17A, 18A, 18D, 18F, and 18H are diagrams representing the defined field sub-records of the protocol description structures of the embodiments of FIGS. 11, 12, 13, 13B, 14, 14C, 14E, 15, 16, 17, 18, 18C, 18E, and 18G, respectively.

FIG. 1B is a diagram representing the lookup structure of the embodiments of FIGS. 11A, 12A, 13A, 13C, 14D, 14F, 15A, 16A, 17A, 18D, 18F, and 18H, respectively.

FIG. 14B is a diagram representing the lookup structure of the embodiment of FIG. 14A.

FIG. 18B is a diagram representing the lookup structure of the embodiment of FIG. 18A.

FIGS. 19, 19A, 19B, 19C and 19D are diagrams of embodiments of data records of a filter express control and associated data filter object structures.

DETAILED DESCRIPTION

Figure 4:
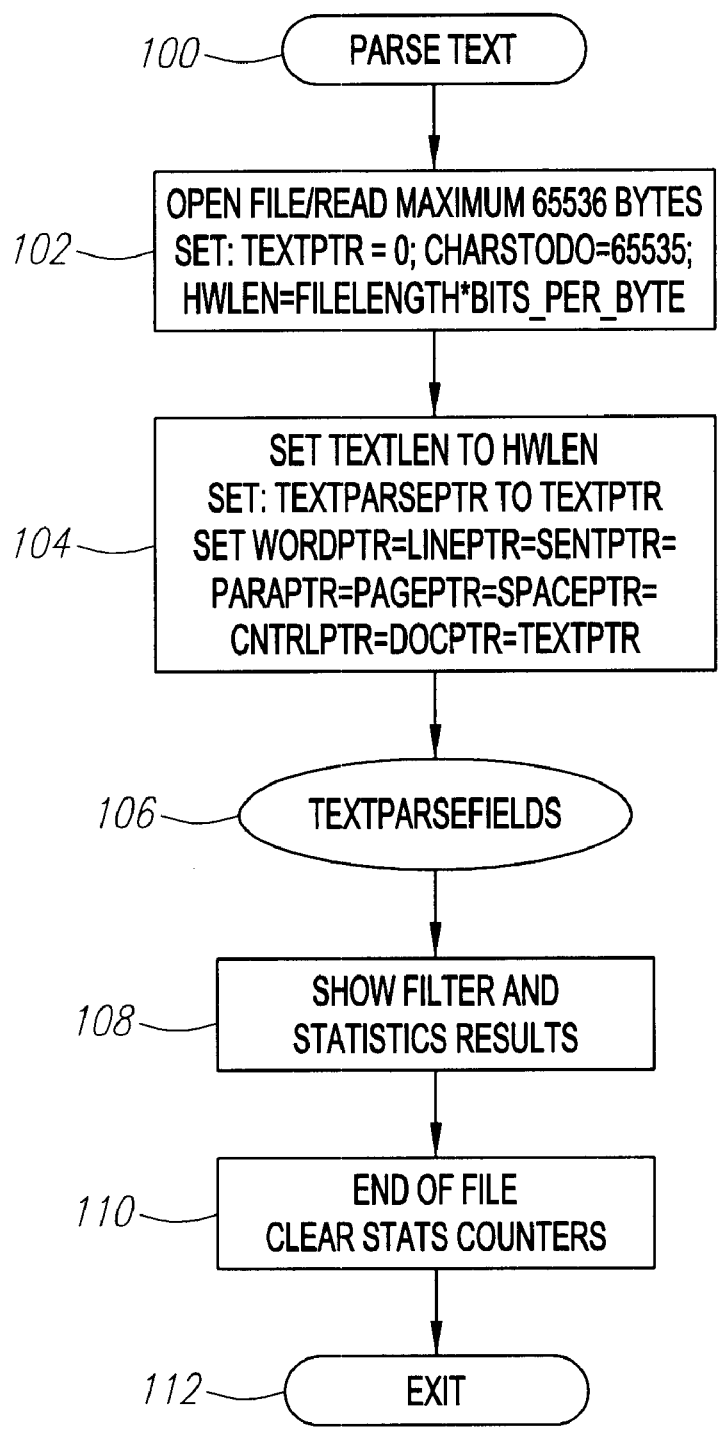
FIG. 4 is a flow chart illustrating an embodiment of a top-level data file parsing control logic.

For purposes of discussion, protocol headers typically associated with network data frames may be regarded as data/control structures within data editor files. Regardless of the transfer media, data transfers between computer devices rely on protocols to perform specific functions to route and control the data transfers. Protocols as a group have a set of characteristics that can be used to describe the protocols. Protocols also have one or more fields, and the fields may have values that are used to determine:

a) length of the protocol—there is at least one length field, unless the protocol is fixed length;

b) length of the frame—there is a field that indicates the length of the frame, measured in units from a fixed position in the frame's protocol stack, unless the protocol has no protocol length field, whereupon the frame length is determined from another protocol in the stack;

c) a field that contains an indicator of the next protocol in the stack, unless the next protocol in the stack never varies;

d) a checksum field that uses an algorithm to compute the checksum of the bytes in the frame from a fixed position in the frame's protocol stack; and e) address fields, which are fields that indicate a source and destination address.

The data parsing and analysis system views data, such as a document or a file, as though it were a data frame. Thus for the purpose of searching, filtering, converting from one format to another, bracket matching, or collecting statistics, the document may be parsed as a stack of programmably defined protocols, just as if the document were a data frame on a computer network.

System Architecture

Referring now to FIG. 1, an embodiment of a data parsing and analysis system 10 includes input devices 12, data storage devices 14, a logic control module 16 for facilitating the input, storage, retrieval, and analysis of data files, and output devices 18 for displaying or printing the results of the analyses.

Each data storage device 14 of the embodiment of FIG. 1 includes a data file 20 having at least one protocol header record, wherein the protocol header record contains data stored in a plurality of predefined fields. Each data storage device 14 also includes a protocol description 22. Each protocol description 22 includes a protocol control record and at least one field sub-record, which together describe a subset of a protocol and include rules for analysis of the data protocol subset.

The logic control module 16 is capable of retrieving a subset of data from input devices 12 or data files 20 which satisfies one or more criteria based upon extracted field values and filtering criteria contained in one or more of the protocol descriptions 22. The logic control module 16 also includes logic for determining file and protocol header lengths, gathering statistics, determining the next protocol, filtering, and controlling data file manipulation based upon the programmably configurable protocol description.

In certain embodiments, a personal computer or other electronic data storage device, such as an IBM PC or compatible, APPLE MACINTOSH, or any UNIX, or XENIX workstation, or similar system is used in the data analysis system. (APPLE and MACINTOSH are registered trademarks of Apple Computer, Inc. of Cupertino, Calif. UNIX is a registered trademark of Unix System Laboratories, Inc. of Basking Ridge, N.J. XENIX is a registered trademark of Microsoft Corporation of Redmond, Wash.) In such embodiments, the data input devices 12 include commercially available data input devices, such as keyboards, mice, and trackballs. The data storage devices 14 include commercially available data storage devices such as RAM, ROM, EPROM, or various sized fixed disk drives. The data output devices 18 include commercially available computer I/O devices, such as conventional CRT displays or printers. In certain embodiments, the logic control module 16 is a computer program written in any language suitable for systems programming. In other embodiments, the logic control module 16 is implemented in hardware. In a preferred embodiment, the data logic control module 16 is implemented via the programming files set forth in the attached microfiche Appendix, which is incorporated herein in its entirety. However, those skilled in the art will appreciate that the logic control module 16 could also be implemented in dedicated hardware using, for example, one or more application specific integrated circuits ("ASICs") or one or more field programmable gate arrays ("FPGAs").

A preferred embodiment of the data parsing and analysis system 10 is a personal computer, workstation or conventional data manipulation device having a 32-bit or larger bus and register set, a math co-processor, at least one megabyte of available RAM, and for personal computer and workstation applications, a fixed disk having at least 10 megabytes of available storage space. As shown in the microfiche Appendix, in a preferred embodiment, the logic control module 16 is programmed in the C++ programming language, with abstract data types defined for statistics gathering capabilities, next protocol determination capabilities, filtering capabilities, display capabilities, and protocol control and field records.

Referring now to FIG. 2, a data file 20 described in accordance with an embodiment of the invention includes a plurality of protocol header records 21. Each protocol header record 21 contains data organized into a plurality of predefined fields. Each field includes a collection of one or more contiguous bits of data and includes a set of allowable values for that field. For example, a particular protocol header record 21 might include a 6-bit header length field and a set of allowable values that limit the protocol header length to values between 20 and 60 inclusive, thereby excluding values less than 20 and values between 61 and 64.

The number of possible contiguous bit fields for a protocol header of length N bits where N is greater than 1 can be expressed by the following formula:

$$\text{Number of Possible Fields} = \sum_{i=1}^{N} i$$

It will be appreciated by those skilled in the art that any possible organization of fields for any possible protocol specification can be used in the data analysis system 10.

Referring now to FIG. 3, a protocol description 22 in accordance with an embodiment of the invention includes a protocol control record 23 and a plurality of field sub-records 24. Table 1 shows the data type definitions that are used in Tables 2 through 8. Tables 2 through 8 show the data structures used in a preferred embodiment of a protocol control record 23 and its attendant sub-records. Table 2 shows a preferred embodiment of a protocol control record 23 that defines the overall structure of a data editor protocol and references other information relating to the data editor protocol.

TABLE 1

GENERAL PURPOSE TYPE DEFINITIONS (typedefs) FOR DATA

| typedef | unsigned char | U8; |
|---|---|---|
| typedef | char | S8; |
| typedef | unsigned short | U16; |
| typedef | signed short | S16; |
| typedef | unsigned long | U32; |
| typedef | signed long | S32; |
| typedef | unsigned __int64 | U64; |
| typedef | __int64 | S64; |

TABLE 2

PROTOCOL CONTROL RECORD STRUCTURE structure protocol
{
| U32 | name length; | // Length of protocol name in bytes |
|---|---|---|

TABLE 2-continued

PROTOCOL CONTROL RECORD STRUCTURE

| char | *protocol_name; | // Protocol name in ASCII |
|---|---|---|
| char | *fname; | // File name in ASCII |
| U32 | cur_field; | // Index of last field displayed |
| U32 | out_flag; | // Protocol has been output 'flag' |
| U32 | dbW; | // Display bit width (i.e., #bits per line |
| U64 | occurrences; | // count of instances encountered in parsing |
| U64 | totalbits; | // count of bits encountered in parsing |
| U32 | num_bits; | // # of bits in fixed portion ofprotocol header |
| U32 | num_fields; | // # of fields used to describe protocol header |
| field | *fs; | // Fields for fixed portion of protocol header |
| protocol | *opts; | // Pointer to protocol for parsing options |
| U32 | include; | // Filter at protocol level |
| U32 | iso_layer; | // 1=BaseProtocol, 2=BaseProtocol lookup |
| field | *csum; | // Pointer to protocol checksum field if any |
| field | *flfield; | // Pointer to protocol header length field if any |
| field | *hlfield; | // Pointer to protocol frame length field if any |
| U32 | pswap; | // flag indicating all fields are swapped |

Table 3 shows a preferred embodiment for the organization of the field sub-records referenced by the following item in Table 2:

field *fs; //Fields for fixed portion of protocol header

TABLE 3

FIELD SUB-RECORDS STRUCTURE structure field
{
| U32 | fplenf; | // flag indicating value is length of file from offset |
|---|---|---|
| | | // 0 = not a length field |
| | | // 1 = length relative to start of protocol |
| | | // 2 = length relative to start of current field |
| | | // 3 = length relative to start of next field |
| | | // 4 = length relative to start of file |
| U32 | fplenm; | // 0: not a length of protocol header field |
| | | // not 0: multiplier in bits for value in this length field |
| U32 | ffmt; | // Field output display format |
| U32 | flflag; | // multiplier in bits for value in header length field |
| U32 | fmult; | // multiply value by this amount before display |
| protocol | *opt; | // Pointer to protocol for parsing option |
| U32 | fdspfield; | // display this field on output |
| char | *fname; | // user defined field name |
| U32 | fdwoff; | // field offset in bytes |
| field | *hlfield; | // Pointer to field with length for option |
| field | *mult_fld; | //Pointer to field with multiplier for length for option |
| U16 | mult_idx; | //field index of mult_fld in this protocol |
| U8 | fshl; | // Number of bits to shift left |
| U8 | fshr; | // Number of bits to shift right |
| U16 | fblen; | // field length in bits |
| U16 | hl_idx | // Field index of hlfield in this protocol |
| Checksum | *ptr2csum; | // pointer to checksum class for current protocol |
| criteria | *ptr2flt; | // Pointer to Filter Criteria class for this field |
| lookup | *ptr2np; | // Pointer to derived lookup class (next_protocol) |
| stats | *ptr2stats; | // Pointer to derived statistics class |
| vary | *ptr2vary; | // Pointer to Vary field value class |
| U32 | DefaultVal; | // Default value for constructing transmit frames |
| U32 | GetMask; | |
| U32 | fldlen_offs; | // flag indicating value is length from offset |
| | | // 0 = not a length field |
| | | // 1 = length relative to start of protocol |
| | | // 2 = length relative to start of current field |
| | | // 3 = length relative to start of next field |

};

Table 4 shows a preferred embodiment for the organization of the statistics records referenced in Table 3 above as:

stats *ptr2stats; //Pointer to derived statistics class

TABLE 4

STATISTICS STRUCTURE/CLASS RECORD

```
structure text_stats
{
static U64   TotalChars;          // Total number of characters parsed
static U64   TotalWords;          // Total number of words parsed
static U64   TotalLines;          // Total number of lines parsed
static U64   TotalSents;          // Total number of sentences parsed
static U64   TotalParas;          // Total number of paragraphs parsed
static U64   TotalPages;          // Total number of pages parsed
static U64   TotalSpaces;         // Total number of spaces parsed
static U64   TotalCntrls;         // Total number of controls parsed
static U64   TotalDocs;           // Total number of documents parsed
static U64   *Histogram;          // [256] or [65536] for ASCII
                                  //   or UNICODE
                                  //(CUintArray)
static U64   *WordSizeHistogram;
static U64   *LineSizeHistogram;
static U64   *SentSizeHistogram;
static U64   *ParaSizeHistogram;
static U64   *PageSizeHistogram;
static U64   *SpaceSizeHistogram;
static U64   *CntrlSizeHistogram;
static U64   *DocSizeHistogram;
static S8    *LastPtr;
static U32   InWord;              // Used for BOOLEAN status in
                                  //   parsing
static U32   InLine;              // Used for BOOLEAN status in
                                  //   parsing
static U32   InSent;              // Used for BOOLEAN status in
                                  //   parsing
static U32   InPara;              // Used for BOOLEAN status in
                                  //   parsing
static U32   InPage;              // Used for BOOLEAN status in
                                  //   parsing
static U32   InSpace;             // Used for BOOLEAN status in
                                  //   parsing
static U32   InCntrl;             // Used for BOOLEAN status in
                                  //   parsing
static U32   InDoc;               // Used for BOOLEAN status in
                                  //   parsing
static U32   TblSz;               // Table size
static U32   *pctbl;              // [256] or [65536] for ASCII
                                  //   or UNICODE
                                  // (CUintArray)
static U32   ctbl[257] or [65537]; // TblSz+1
```

Table 5 shows a preferred embodiment for the organization of the next_protocol lookup records referenced in Table 3 as:

lookup *ptr2np; //Pointer to derived lookup class (next_protocol)

TABLE 5

LOOKUP ARRAY STRUCTURE RECORD

```
structure lookup_array
{
U32            size;              // Array size in entries
static verify  v;
U32            *field_idxs;       // Field to Process
U32            fieldi[size+2];    // Field to Process Index
U32            *field_nxts;       // Next Field after Field to Process
U32            fieldn[size+2];    // Next Field to Process Index
field          **field_ptrs;      // Field to Process pointer
field          *fields[size+2];   // Field to Process pointers array
protocol       **proto_ptrs;      // Next Protocol pointer
protocol       *protos[size+2];   // Next Protocol pointers array
};
```

Table 5A shows a preferred embodiment for the organization of the lookup structure referenced in Table 5 as:

static verify v;

TABLE 5A

LOOKUP STRUCTURE RECORD

```
structure lookup_text   // the verify structure
{
protocol  *prot;    // pointer to Next Protocol description
U32       nxtidx;   // index of next field in this protocol to parse
U32       minval;   // minimum acceptable value for this range
U32       maxval;   // maximum acceptable value for this range
U32       okbits;   // selects even only, odd only or all values in this
                    //   range
U32       show;     // flag for display
char      *xlat;    // pointer to associated human language
                    //   equivalent
};
```

Lookup structures and lookup_array structures can be used for determining the next field to use, the next protocol control record to use, terminating protocol processing on illegal values, branching decisions for variable length headers or overlapping fields, and converting numeric values to mnemonic or written language equivalents. This ability to specify branches on field values allows specification and dynamic parsing of protocols with multiple overlapping structures.

Table 6 shows a preferred embodiment for the organization of the vary field value records referenced in Table 3 as:

vary *ptr2vary; //Pointer to Vary field value class

TABLE 6

VARY OBJECT STRUCTURE RECORD

```
structure varyobj
{
U32   doff;      // Offset of field to vary from start of current protocol
                 //   header
U32   mask;      // Mask for extracting bits from
                 //   EXTRACT_BITSIZE-bit value
U32   notmask;   // Mask for clearing bits from EXTRACT_BITSIZE-
                 //   bit value
U32   operand;   // Value to apply to field contents (Relative to field
                 //   bits)
U32   minvalue;  // Minimum allowable value for field (Relative to field
                 //   bits)
U32   maxvalue;  // Maximum allowable value for field (Relative to field
                 //   bits)
void  *Ptr;      // Pointer for use by derived classes (pointer only)
};
```

Table 7 shows a preferred embodiment for the organization of the filter criteria records referenced in Table 3 as:

criteria *ptr2flt; //Pointer to Filter Criteria class for this field

TABLE 7

TEXT FILTER OBJECT STRUCTURE

```
structure TextFilterObject
{
U32    *StrjngObj;   // String to match in data file
U32    TotalChar;    // String length
U32    MatchChar;    // Index of next char to match
                     //   in string
U32    *MatchBits;   // Required Start/End of
                     //   Object/Category Bits
U32    *MatchMask;   // Start/End of Object/Cate-
                     //   gory Bits to Isolate
```

TABLE 7-continued

TEXT FILTER OBJECT STRUCTURE

| | | |
|---|---|---|
| U32 | LastBits; | // temporary item used in Match routine |
| text_channel | *ChPtr; | // Pointer to Associated Filter Class |
| U32 | MatchFlag; | // Flag to indicate whether filter is satisfied by matching or not matching the StringObj |
| U32 | FoundFlag; | // Flag indicating whether StringObj has been found in current search |
| U32 | Index; | // Zero-based index of this criteria within the channel, −1 if any order |
| U32 | num; | // number of found cases |
| U32 | force; | // index to force start_end_into |
| OrderedPtrArray<U32> | *start_ptr; | // for displaying found results |
| OrderedPtrArray<U32> | *end_ptr; | // for displaying found results |
| }; | | |

Table 8 shows a preferred embodiment for the organization of the filter channel records referenced in the Filter Criteria record above as:

text_channel *ChPtr; //Pointer to Associated Filter Class

TABLE 8

FILTER CHANNEL STRUCTURE RECORD

| | | |
|---|---|---|
| U32 | NextCriteriaIndex; | // Index of next channel index that must be satisfied, −1 if//any order |
| OrderedPtrArray<TextFilterObject> | *Criteria; | // Pointer to array of Filter Objects //(filter criteria) |
| char | *ChannelName; | // Pointer to name of channel |
| U64 | FramesAccepted; | // Number of matches found for this channel |
| U64 | FramesBitsAccepted; | // Number of bits in matches found for this channel |
| char | *FiltFileName; | // Filter File Name |
| U32 | rcv_channel_idx; | // Index in RxChannelList of the Receive channel for this // filter channel |
| }; | | |

Each configured filter consists of one or more filter criteria (hereinafter also referred to as Filter Objects). The filter criteria may be organized into Text Filter Object records. The Filter Object records may refer to String Objects, Match Bits and Match Mask, a Match Flag, a Found Flag and an Index that together allow the filter criteria to determine from a data field value the current state of the filter expression at each criterion. These states may include MATCH_FOUND, meaning that this criterion is satisfied, and NOT_FOUND, meaning that the criterion is not yet satisfied.

The criteria associated with the filter channel are applied to the data file characters until either all criteria are satisfied, or all characters in the data file have been searched. It will be appreciated by those skilled in the art that the method of the present invention permits multiple filtering requirements to be applied in any programmably specified sequence or combination of the Boolean operators AND, OR, and NOT.

In Tables 2 through 8 the records of the protocol description and associated field, statistics, lookup, vary and filter records are shown as they appear when resident in memory. In a preferred embodiment, each of these protocol description records with its associated field, statistics, lookup, vary and filter record information is also written to a protocol-specific protocol description file (PDF).

In a preferred embodiment, the following sequence of data is written to a PDF: For the Protocol Control Record 23:
 a) The length of the of the protocol name including a NULL terminator (name_length),
 b) the name of the protocol (*protocol_name),
 c) the index of the field currently referenced (cur_field),
 d) the display bit width (dbW),
 e) the total bit length of the protocol header (num_bits),
 f) the number of fields used to define the protocol description (num_fields),
 g) for each of the field sub-records that describe the protocol header (*fs), a call is made to write the field related data (This sequence is described below.)
 h) the include protocol flag (include),
 i) the iso_layer flag (iso_layer),
 j) the flag indicating whether the protocol fields are byte swapped (pswap),
 k) if the pointer to the option control record (*opts) is NULL, zero,
 l) if the pointer to the option control record (*opts) is not NULL, meaning that there are options,
  1) the length of the protocol option name including the NULL terminator (name_length),
  2) the option name (*protocol_name),
  3) the rest of the option's protocol control record.
For Each Field Sub-Record 24:
 a) the flag indicating if the value is the actual length of the data being parsed (fplenf),
 b) the flag indicating if the value is the actual length of the protocol header (fplenm),
 c) the number indicating the display type (ffmt),
 d) the multiplier to apply to the value in the protocol header length field (flflag),
 e) the multiplier to apply to the value prior to display (fmult),
 f) the field option name length if any, or zero if there is no option (*opt),
 g) the option name if any,
 h) the flag indicating that the field is to be displayed (fdspfield),
 i) the length of the field name including the NULL terminator (strlen(*fname)+1), or zero,
 j) the field name, if any (*fname),
 k) the byte offset from the start of the protocol header (fdwoff),
 l) the embedded length field index within the field record (hl_idx), or zero,
 m) the number of bits to left shift the 32-bit field (fshl),
 n) the number of bits to right shift the 32-bit field (fshr),
 o) the length of the field in bits (fblen),
 p) the header length existence flag: zero if *hlfield is NULL, one if *hlfield is not NULL,
 q) the header length multiplier existence flag: zero if *mult_fld is NULL, one if *mult_fld is not NULL,
 r) the type of check summing, if any (*ptr2csum),
 s) if the pointer to the lookup structure/class (*ptr2np) is NULL, zero
 t) if the pointer to the lookup structure/class (*ptr2np) is not NULL,z a call is made to write the lookup type, the number of lookups, and the lookup values, u) if the pointer to the statistics structure/class (*ptr2stats) is NULL, zero, v) if the pointer to the statistics structure/class (*ptr2stats) is not NULL, a call is made to write the number of statistics and each of their statistics type, the pointer to vary field (*ptr2vary) and pointer to filter (*ptr2flt) are handled similarly, w) the default value for the field (DefaultVal), x) the flag indicating if the value is a length of the protocol or a field of the protocol (fldlen_offs).

Each character in a character set may be identified as having one or more characteristics, for purposes of searching, statistics gathering, and for the Text Parsing state machine. Table 9 shows the possible characteristics a character may have, in accordance with a preferred embodiment of the invention.

TABLE 9

Characteristics of Characters

| Identifier | Characteristic |
|---|---|
| C_INWORD | Character is in a word |
| C_EOWORD | Character is at the end of a word |
| C_INLINE | Character is in a line (of data) |
| C_EOLINE | Character is at the end of a line (of data) |
| C_INSENT | Character is in a sentence |
| C_EOSENT | Character is at the end of a sentence |
| C_INPARA | Character is in a paragraph |
| C_EOPARA | Character is at the end of a paragraph |
| C_INPAGE | Character is in a page |
| C_EOPAGE | Character is at the end of a page |
| C_INSPACE | Character is in a space |
| C_EOSPACE | Character is at the end of a space |
| C_INCNTRL | Character is in a control |
| C_EOCNTRL | Character is at the end of a control |
| C_INDOC | Character is in a document |
| C_EODOC. | Character is at the end of a document |

The characteristics listed in Table 9 are given defined values as shown below in Table 10 together with references for those characteristics for the ASCII character set, where applicable.

TABLE 10

Defined Values for Characteristics

```
enum CharTypes
{
c_INWORD   = 0x0001,  // characters 0–9, A–Z, a–z
C_EOWORD   = 0x0002,  // spaces, punctuation
C_INLINE   = 0x0004,  // 0x20 - 0x7E in Table 12 below
C_EOLINE   = 0x0008,  // tab, carriage return, new line, vertical
                      //   tab or form feed
C_INSENT   = 0x0010,  // 0x20 - 0x7E in Table 12 below
C_EOSENT   = 0x0020,  // . ! ? followed by space
C_INPARA   = 0x0040,  // 0x20 - 0x7E in Table 12 below
C_EOPARA   = 0x0080,  // not defined in the ASCII character set
C_INPAGE   = 0x0100,  // 0x20 - 0x7E in Table 12 below
C_EOPAGE   = 0x0200,  // form feed
C_INSPACE  = 0x0400,  // blank, horizontal tab, carriage return,
                      //   line feed, vertical tab, form feed
C_EOSPACE  = 0x0800,  // 0x21 - 0x7E in Table 12 below
C_INCNTRL  = 0x1000,
C_EOCNTRL  = 0x2000,
C_INDOC    = 0x4000,  // 0x00 - 0x7F in Table 12 below
C_EODOC    = 0x8000,  // end of file (EOF
};
```

Common Control Logic

Turning now to FIGS. 4–8A, the flow charts refer to several variables, which are defined in Table 11 below. These variables are used to keep track of the current control logic state of an embodiment of the present invention:

TABLE 11

| | |
|---|---|
| TextPtr | Pointer to start of file being parsed |
| HwLen | Bit length of file as reported by operating system |
| TextLen | Bit length of file as reported by operating system |
| charstodo | Number of bytes left to be parsed in cbfr |
| cbfr | 65536 byte buffer into which the file being parsed is read in 65536 byte pieces |
| cptr | Pointer to the current character position in cbfr |
| BaseProtocol | Pointer to the protocol created for the character set characteristics |
| LocalProtocol | Pointer to protocol description control record returned by text_value_ok control logic |
| nextfield | Pointer to field in BaseProtocol returned by text_value_ok control logic |
| TextParsePtr | Pointer to current cbfr parsing position |
| RxParsePtr | Pointer to current cbfr parsing position for embedded variable length field parsing |
| chtbl | array of character set size plus 2, for storing the character set characteristics values for a character set |

In a preferred embodiment, initializing the system includes determining the presence of at least one character set definition file. These character set definition files, in the form of text files with the name extension '.txtf', contain characteristics information for the character set to be used in parsing the data file. In a preferred embodiment, a character set definition file may be used to construct a BaseProtocol definition for the data parsing control logic. In a preferred embodiment, these character set definition files may be formatted in the following sequence:

a) a 3-byte field, containing the length of the file name in bytes;

b) a variable length field, the length specified in a) above, containing the file name;

c) a 1-byte field, indicating the byte width of the characters in the character set;

d) a 6-byte field, indicating the number of lines of character definitions in the file;

e) a 4-byte field, indicating the character length of the character definition lines in the file.

As an example, at the front of an exemplary data-definition file that is a character definition file defining the ASCII character set, the following string:

008text.txt10001290090 indicates a) eight characters (008) is the length of the file name;

b) 'text.txt' (text.txt) is the file name;

c) one byte (1) is the width of each character;

d) 129 character definition lines (000129) are contained in the file;

e) 90 bytes (0090) is the length of each character definition line in the file.

The character definition lines for this ASCII example are shown in Table 12. The characteristics of a character are expressed as the sum of the individual characteristics associated with the character. For example, the 'EOF' character of Line 1 of Table 12 has a characteristics value of 0x9000, derived by adding together the hexadecimal values of the two individual characteristics C_INCNTRL (0x1000) and C_EODOC (0x8000), as defined in Table 10. In each line of Table 12, the characteristics values are followed by the hexadecimal value of the character and the English-language character equivalent, if any, which may be used for display purposes.

TABLE 12

Characteristics of ASCII characters /* hexadecimal ASCII values*/

| | | |
|---|---|---|
| | C_INCNTRL+C_EODOC, | /* −1 EOF */ |
| | C_INCNTRL, | /* 00 (NUL) */ |
| | C_INCNTRL, | /* 01 (SOH) */ |
| | C_INCNTRL, | /* 02 (STX) */ |
| | C_INCNTRL, | /* 03 (ETX) */ |
| | C_INCNTRL, | /* 04 (EOT) */ |
| | C_INCNTRL, | /* 05 (ENQ) */ |
| | C_INCNTRL, | /* 06 (ACK) */ |
| | C_INCNTRL, | /* 07 (BEL) */ |
| | C_INCNTRL, | /* 08 (BS) */ |
| C_EOWORD+C_INLINE+C_INSENT+C_INPARA+C_INPAGE+C_INSPACE+ | C_INCNTRL+C_INDOC, | /* 09 (HT) */ |
| C_EOWORD+C_INLINE+C_INSENT+C_INPARA+C_INPAGE+C_INSPACE+ | C_INCNTRL+C_INDOC, | /* 0A (LF) */ |
| C_EOWORD+C_INLINE+C_INSENT+C_INPARA+C_INPAGE+C_INSPACE+ | C_INCNTRL+C_INDOC, | /* 0B (VT) */ |
| C_EOWORD+C_INLINE+C_INSENT+C_INPARA+C_EOPAGE+C_INSPACE+ | C_INCNTRL+C_INDOC, | /* 0C (FF) */ |
| C_EOWORD+C_EOLINE+C_INSENT+C_INPARA+C_INPAGE+C_INSPACE+ | C_INCNTRL+C_INDOC, | /* 0D (CR) */ |
| | C_INCNTRL, | /* 0E (SI) */ |
| | C_INCNTRL, | /* 0F (SO) */ |
| | C_INCNTRL, | /* 10 (DLE) */ |
| | C_INCNTRL, | /* 11 (DC1) */ |
| | C_INCNTRL, | /* 12 (DC2) */ |
| | C_INCNTRL, | /* 13 (DC3) */ |
| | C_INCNTRL, | /* 14 (DC4) */ |
| | C_INCNTRL, | /* 15 (NAK) */ |
| | C_INCNTRL, | /* 16 (SYN) */ |
| | C_INCNTRL, | /* 17 (ETB) */ |
| | C_INCNTRL, | /* 18 (CAN) */ |
| | C_INCNTRL, | /* 19 (EM) */ |
| | C_INCNTRL, | /* 1A (SUB) */ |
| | C_INCNTRL, | /* 1B (ESC) */ |
| | C_INCNTRL, | /* 1C (FS) */ |
| | C_INCNTRL, | /* 1D (GS) */ |
| | C_INCNTRL, | /* 1E (RS) */ |
| | C_INCNTRL, | /* 1F (US) */ |
| C_EOWORD+C_INLINE+C_INSENT+C_INPARA+C_INPAGE+C_INSPACE+C_EOCNTRL+C_INDOC, | | /* 20 SPACE */ |
| C_EOWORD+C_INLINE+C_EOSENT+C_INPARA+C_INPAGE+C_EOSPACE+C_EOCNTRL+C_INDOC, | | /* 21 ! */ |
| C_EOWORD+C_INLINE+C_INSENT+C_INPARA+C_INPAGE+C_EOSPACE+C_EOCNTRL+C_INDOC, | | /* 22 " */ |
| C_EOWORD+C_INLINE+C_INSENT+C_INPARA+C_INPAGE+C_EOSPACE+C_EOCNTRL+C_INDOC, | | /* 23 # */ |
| C_EOWORD+C_INLINE+C_INSENT+C_INPARA+C_INPAGE+C_EOSPACE+C_EOCNTRL+C_INDOC, | | /* 24 $ */ |
| C_EOWORD+C_INLINE+C_INSENT+C_INPARA+C_INPAGE+C_EOSPACE+C_EOCNTRL+C_INDOC, | | /* 25 % */ |
| C_EOWORD+C_INLINE+C_INSENT+C_INPARA+C_INPAGE+C_EOSPACE+C_EOCNTRL+C_INDOC, | | /* 26 & */ |
| C_EOWORD+C_INLINE+C_INSENT+C_INPARA+C_INPAGE+C_EOSPACE+C_EOCNTRL+C_INDOC, | | /* 27 ' */ |
| C_EOWORD+C_INLINE+C_INSENT+C_INPARA+C_INPAGE+C_EOSPACE+C_EOCNTRL+C_INDOC, | | /* 28 ( */ |
| C_EOWORD+C_INLINE+C_INSENT+C_INPARA+C_INPAGE+C_EOSPACE+C_EOCNTRL+C_INDOC, | | /* 29 ) */ |
| C_EOWORD+C_INLINE+C_INSENT+C_INPARA+C_INPAGE+C_EOSPACE+C_EOCNTRL+C_INDOC, | | /* 2A * */ |
| C_EOWORD+C_INLINE+C_INSENT+C_INPARA+C_INPAGE+C_EOSPACE+C_EOCNTRL+C_INDOC, | | /* 2B + */ |
| C_EOWORD+C_INLINE+C_INSENT+C_INPARA+C_INPAGE+C_EOSPACE+C_EOCNTRL+C_INDOC, | | /* 2C , */ |
| C_EOWORD+C_INLINE+C_INSENT+C_INPARA+C_INPAGE+C_EOSPACE+C_EOCNTRL+C_INDOC, | | /* 2D − */ |
| C_EOWORD+C_INLINE+C_EOSENT+C_INPARA+C_INPAGE+C_EOSPACE+C_EOCNTRL+C_INDOC, | | /* 2E . */ |
| C_EOWORD+C_INLINE+C_INSENT+C_INPARA+C_INPAGE+C_EOSPACE+C_EOCNTRL+C_INDOC, | | /* 2F / */ |
| C_INWORD+C_INLINE+C_INSENT+C_INPARA+C_INPAGE+C_EOSPACE+C_EOCNTRL+C_INDOC, | | /* 30 0 */ |
| C_INWORD+C_INLINE+C_INSENT+C_INPARA+C_INPAGE+C_EOSPACE+C_EOCNTRL+C_INDOC, | | /* 31 1 */ |
| C_INWORD+C_INLINE+C_INSENT+C_INPARA+C_INPAGE+C_EOSPACE+C_EOCNTRL+C_INDOC, | | /* 32 2 */ |
| C_INWORD+C_INLINE+C_INSENT+C_INPARA+C_INPAGE+C_EOSPACE+C_EOCNTRL+C_INDOC, | | /* 33 3 */ |
| C_INWORD+C_INLINE+C_INSENT+C_INPARA+C_INPAGE+C_EOSPACE+C_EOCNTRL+C_INDOC, | | /* 34 4 */ |
| C_INWORD+C_INLINE+C_INSENT+C_INPARA+C_INPAGE+C_EOSPACE+C_EOCNTRL+C_INDOC, | | /* 35 5 */ |
| C_INWORD+C_INLINE+C_INSENT+C_INPARA+C_INPAGE+C_EOSPACE+C_EOCNTRL+C_INDOC, | | /* 36 6 */ |
| C_INWORD+C_INLINE+C_INSENT+C_INPARA+C_INPAGE+C_EOSPACE+C_EOCNTRL+C_INDOC, | | /* 37 7 */ |
| C_INWORD+C_INLINE+C_INSENT+C_INPARA+C_INPAGE+C_EOSPACE+C_EOCNTRL+C_INDOC, | | /* 38 8 */ |
| C_INWORD+C_INLINE+C_INSENT+C_INPARA+C_INPAGE+C_EOSPACE+C_EOCNTRL+C_INDOC, | | /* 39 9 */ |
| C_EOWORD+C_INLINE+C_INSENT+C_INPARA+C_INPAGE+C_EOSPACE+C_EOCNTRL+C_INDOC, | | /* 3A : */ |
| C_EOWORD+C_INLINE+C_INSENT+C_INPARA+C_INPAGE+C_EOSPACE+C_EOCNTRL+C_INDOC, | | /* 3B ; */ |
| C_EOWORD+C_INLINE+C_INSENT+C_INPARA+C_INPAGE+C_EOSPACE+C_EOCNTRL+C_INDOC, | | /* 3C < */ |
| C_EOWORD+C_INLINE+C_INSENT+C_INPARA+C_INPAGE+C_EOSPACE+C_EOCNTRL+C_INDOC, | | /* 3D = */ |
| C_EOWORD+C_INLINE+C_INSENT+C_INPARA+C_INPAGE+C_EOSPACE+C_EOCNTRL+C_INDOC, | | /* 3E > */ |
| C_EOWORD+C_INLINE+C_EOSENT+C_INPARA+C_INPAGE+C_EOSPACE+C_EOCNTRL+C_INDOC, | | /* 3F ? */ |
| C_EOWORD+C_INLINE+C_INSENT+C_INPARA+C_INPAGE+C_EOSPACE+C_EOCNTRL+C_INDOC, | | /* 40 @ */ |
| C_INWORD+C_INLINE+C_INSENT+C_INPARA+C_INPAGE+C_EOSPACE+C_EOCNTRL+C_INDOC, | | /* 41 A */ |
| C_INWORD+C_INLINE+C_INSENT+C_INPARA+C_INPAGE+C_EOSPACE+C_EOCNTRL+C_INDOC, | | /* 42 B */ |
| C_INWORD+C_INLINE+C_INSENT+C_INPARA+C_INPAGE+C_EOSPACE+C_EOCNTRL+C_INDOC, | | /* 43 C */ |
| C_INWORD+C_INLINE+C_INSENT+C_INPARA+C_INPAGE+C_EOSPACE+C_EOCNTRL+C_INDOC, | | /* 44 D */ |
| C_INWORD+C_INLINE+C_INSENT+C_INPARA+C_INPAGE+C_EOSPACE+C_EOCNTRL+C_INDOC, | | /* 45 E */ |
| C_INWORD+C_INLINE+C_INSENT+C_INPARA+C_INPAGE+C_EOSPACE+C_EOCNTRL+C_INDOC, | | /* 46 F */ |
| C_INWORD+C_INLINE+C_INSENT+C_INPARA+C_INPAGE+C_EOSPACE+C_EOCNTRL+C_INDOC, | | /* 47 G */ |
| C_INWORD+C_INLINE+C_INSENT+C_INPARA+C_INPAGE+C_EOSPACE+C_EOCNTRL+C_INDOC, | | /* 48 H */ |
| C_INWORD+C_INLINE+C_INSENT+C_INPARA+C_INPAGE+C_EOSPACE+C_EOCNTRL+C_INDOC, | | /* 49 I */ |
| C_INWORD+C_INLINE+C_INSENT+C_INPARA+C_INPAGE+C_EOSPACE+C_EOCNTRL+C_INDOC, | | /* 4A J */ |
| C_INWORD+C_INLINE+C_INSENT+C_INPARA+C_INPAGE+C_EOSPACE+C_EOCNTRL+C_INDOC, | | /* 4B K */ |

TABLE 12-continued

Characteristics of ASCII characters /* hexadecimal ASCII values*/

| | | |
|---|---|---|
| C_INWORD+C_INLINE+C_INSENT+C_INPARA+C_INPAGE+C_EOSPACE+C_EOCNTRL+C_INDOC, | /* 4C L | */ |
| C_INWORD+C_INLINE+C_INSENT+C_INPARA+C_INPAGE+C_EOSPACE+C_EOCNTRL+C_INDOC, | /* 4D M | */ |
| C_INWORD+C_INLINE+C_INSENT+C_INPARA+C_INPAGE+C_EOSPACE+C_EOCNTRL+C_INDOC, | /* 4E N | */ |
| C_INWORD+C_INLINE+C_INSENT+C_INPARA+C_INPAGE+C_EOSPACE+C_EOCNTRL+C_INDOC, | /* 4F O | */ |
| C_INWORD+C_INLINE+C_INSENT+C_INPARA+C_INPAGE+C_EOSPACE+C_EOCNTRL+C_INDOC, | /* 50 P | */ |
| C_INWORD+C_INLINE+C_INSENT+C_INPARA+C_INPAGE+C_EOSPACE+C_EOCNTRL+C_INDOC, | /* 51 Q | */ |
| C_INWORD+C_INLINE+C_INSENT+C_INPARA+C_INPAGE+C_EOSPACE+C_EOCNTRL+C_INDOC, | /* 52 R | */ |
| C_INWORD+C_INLINE+C_INSENT+C_INPARA+C_INPAGE+C_EOSPACE+C_EOCNTRL+C_INDOC, | /* 53 S | */ |
| C_INWORD+C_INLINE+C_INSENT+C_INPARA+C_INPAGE+C_EOSPACE+C_EOCNTRL+C_INDOC, | /* 54 T | */ |
| C_INWORD+C_INLINE+C_INSENT+C_INPARA+C_INPAGE+C_EOSPACE+C_EOCNTRL+C_INDOC, | /* 55 U | */ |
| C_INWORD+C_INLINE+C_INSENT+C_INPARA+C_INPAGE+C_EOSPACE+C_EOCNTRL+C_INDOC, | /* 56 V | */ |
| C_INWORD+C_INLINE+C_INSENT+C_INPARA+C_INPAGE+C_EOSPACE+C_EOCNTRL+C_INDOC, | /* 57 W | */ |
| C_INWORD+C_INLINE+C_INSENT+C_INPARA+C_INPAGE+C_EOSPACE+C_EOCNTRL+C_INDOC, | /* 58 X | */ |
| C_INWORD+C_INLINE+C_INSENT+C_INPARA+C_INPAGE+C_EOSPACE+C_EOCNTRL+C_INDOC, | /* 59 Y | */ |
| C_INWORD+C_INLINE+C_INSENT+C_INPARA+C_INPAGE+C_EOSPACE+C_EOCNTRL+C_INDOC, | /* 5A Z | */ |
| C_EOWORD+C_INLINE+C_INSENT+C_INPARA+C_INPAGE+C_EOSPACE+C_EOCNTRL+C_INDOC, | /* 5B [ | */ |
| C_EOWORD+C_INLINE+C_INSENT+C_INPARA+C_INPAGE+C_EOSPACE+C_EOCNTRL+C_INDOC, | /* 5C \ | */ |
| C_EOWORD+C_INLINE+C_INSENT+C_INPARA+C_INPAGE+C_EOSPACE+C_EOCNTRL+C_INDOC, | /* 5D ] | */ |
| C_EOWORD+C_INLINE+C_INSENT+C_INPARA+C_INPAGE+C_EOSPACE+C_EOCNTRL+C_INDOC, | /* 5E  | */ |
| C_EOWORD+C_INLINE+C_INSENT+C_INPARA+C_INPAGE+C_EOSPACE+C_EOCNTRL+C_INDOC, | /* 5F _ | */ |
| C_EOWORD+C_INLINE+C_INSENT+C_INPARA+C_INPAGE+C_EOSPACE+C_EOCNTRL+C_INDOC, | /* 60 ` | */ |
| C_INWORD+C_INLINE+C_INSENT+C_INPARA+C_INPAGE+C_EOSPACE+C_EOCNTRL+C_INDOC, | /* 61 a | */ |
| C_INWORD+C_INLINE+C_INSENT+C_INPARA+C_INPAGE+C_EOSPACE+C_EOCNTRL+C_INDOC, | /* 62 b | */ |
| C_INWORD+C_INLINE+C_INSENT+C_INPARA+C_INPAGE+C_EOSPACE+C_EOCNTRL+C_INDOC, | /* 63 c | */ |
| C_INWORD+C_INLINE+C_INSENT+C_INPARA+C_INPAGE+C_EOSPACE+C_EOCNTRL+C_INDOC, | /* 64 d | */ |
| C_INWORD+C_INLINE+C_INSENT+C_INPARA+C_INPAGE+C_EOSPACE+C_EOCNTRL+C_INDOC, | /* 65 e | */ |
| C_INWORD+C_INLINE+C_INSENT+C_INPARA+C_INPAGE+C_EOSPACE+C_EOCNTRL+C_INDOC, | /* 66 f | */ |
| C_INWORD+C_INLINE+C_INSENT+C_INPARA+C_INPAGE+C_EOSPACE+C_EOCNTRL+C_INDOC, | /* 67 g | */ |
| C_INWORD+C_INLINE+C_INSENT+C_INPARA+C_INPAGE+C_EOSPACE+C_EOCNTRL+C_INDOC, | /* 68 h | */ |
| C_INWORD+C_INLINE+C_INSENT+C_INPARA+C_INPAGE+C_EOSPACE+C_EOCNTRL+C_INDOC, | /* 69 i | */ |
| C_INWORD+C_INLINE+C_INSENT+C_INPAAAC+C_INPAGE+C_EOSPACE+C_EOCNTRL+C_INDOC, | /* 6A j | */ |
| C_INWORD+C_INLINE+C_INSENT+C_INPARA+C_INPAGE+C_EOSPACE+C_EOCNTRL+C_INDOC, | /* 6B k | */ |
| C_INWORD+C_INLINE+C_INSENT+C_INPARA+C_INPAGE+C_EOSPACE+C_EOCNTRL+C_INDOC, | /* 6C l | */ |
| C_INWORD+C_INLINE+C_INSENT+C_INPARA+C_INPAGE+C_EOSPACE+C_EOCNTRL+C_INDOC, | /* 6D m | */ |
| C_INWORD+C_INLINE+C_INSENT+C_INPARA+C_INPAGE+C_EOSPACE+C_EOCNTRL+C_INDOC, | /* 6E n | */ |
| C_INWORD+C_INLINE+C_INSENT+C_INPARA+C_INPAGE+C_EOSPACE+C_EOCNTRL+C_INDOC, | /* 6F o | */ |
| C_INWORD+C_INLINE+C_INSENT+C_INPARA+C_INPAGE+C_EOSPACE+C_EOCNTRL+C_INDOC, | /* 70 p | */ |
| C_INWORD+C_INLINE+C_INSENT+C_INPARA+C_INPAGE+C_EOSPACE+C_EOCNTRL+C_INDOC, | /* 71 q | */ |
| C_INWORD+C_INLINE+C_INSENT+C_INPARA+C_INPAGE+C_EOSPACE+C_EOCNTRL+C_INDOC, | /* 72 r | */ |
| C_INWORD+C_INLINE+C_INSENT+C_INPARA+C_INPAGE+C_EOSPACE+C_EOCNTRL+C_INDOC, | /* 73 s | */ |
| C_INWORD+C_INLINE+C_INSENT+C_INPARA+C_INPAGE+C_EOSPACE+C_EOCNTRL+C_INDOC, | /* 74 t | */ |
| C_INWORD+C_INLINE+C_INSENT+C_INPARA+C_INPAGE+C_EOSPACE+C_EOCNTRL+C_INDOC, | /* 75 u | */ |
| C_INWORD+C_INLINE+C_INSENT+C_INPARA+C_INPAGE+C_EOSPACE+C_EOCNTRL+C_INDOC, | /* 76 v | */ |
| C_INWORD+C_INLINE+C_INSENT+C_INPARA+C_INPAGE+C_EOSPACE+C_EOCNTRL+C_INDOC, | /* 77 w | */ |
| C_INWORD+C_INLINE+C_INSENT+C_INPARA+C_INPAGE+C_EOSPACE+C_EOCNTRL+C_INDOC, | /* 78 x | */ |
| C_INWORD+C_INLINE+C_INSENT+C_INPARA+C_INPAGE+C_EOSPACE+C_EOCNTRL+C_INDOC, | /* 79 y | */ |
| C_INWORD+C_INLINE+C_INSENT+C_INPARA+C_INPAGE+C_EOSPACE+C_EOCNTRL+C_INDOC, | /* 7A z | */ |
| C_EOWORD+C_INLINE+C_INSENT+C_INPARA+C_INPAGE+C_EOSPACE+C_EOCNTRL+C_INDOC, | /* 7B { | */ |
| C_EOWORD+C_INLINE+C_INSENT+C_INPARA+C_INPAGE+C_EOSPACE+C_EOCNTRL+C_INDOC, | /* 7C \| | */ |
| C_EOWORD+C_INLINE+C_INSENT+C_INPARA+C_INPAGE+C_EOSPACE+C_EOCNTRL+C_INDOC, | /* 7D } | */ |
| C_EOWORD+C_INLINE+C_INSENT+C_INPARA+C_INPAGE+C_EOSPACE+C_EOCNTRL+C_INDOC, | /* 7E ~ | */ |
| C_INCNTRL, | /* 7F (DEL) | */ |

System Initialization Logic

In a preferred embodiment, the character definition file may be used to construct for the character set a base protocol (BaseProtocol) definition that may be used by the data parsing control logic. Initially the characteristics from the character definition file may be read into a character table array (chtbl) of size equal to the maximum hexadecimal value that can be expressed in a character of the byte size defined, plus two. For example, for a one-byte character set such as ASCII, the array size would be 255(decimal) (the maximum hexadecimal value expressible in a one-byte character)+2, which equals 257(decimal). In a preferred embodiment, each line in a character definition file may be used to construct the value for the entry in the array associated with the line's position in the file. From the exemplary data-definition file shown above as Table 12 for the ASCII character set, the first character definition line

C_INCNTRL+C_EODOC, /* −1EOF */ would cause the value C_INCNTRL+C_EODOC (or 0x1000+0x8000 using the values defined in Table 10) to be put into the first position in the character table array, chtbl[0]. The 124th character definition line C_INWORD+C_INLINE+C_INSENT+C_INPARA+C_INPAGE+C_EOSPACE+C_EOCNTRL+C_INDOC, /*7A z*/ would cause the value C_INWORD+C_INLINE +C_INSENT+C_INPARA+C_INPAGE+C_EOSPACE+ C_EOCNTRL+C_INDOC (or 0x0001+0x0004+0x0010+ 0x0040+0x0100+0x0800+0x2000+0x4000 using the values defined in Table 10) to be put into the $124^{th}$ position in the character table array, chtbl[123].

Figure 8:
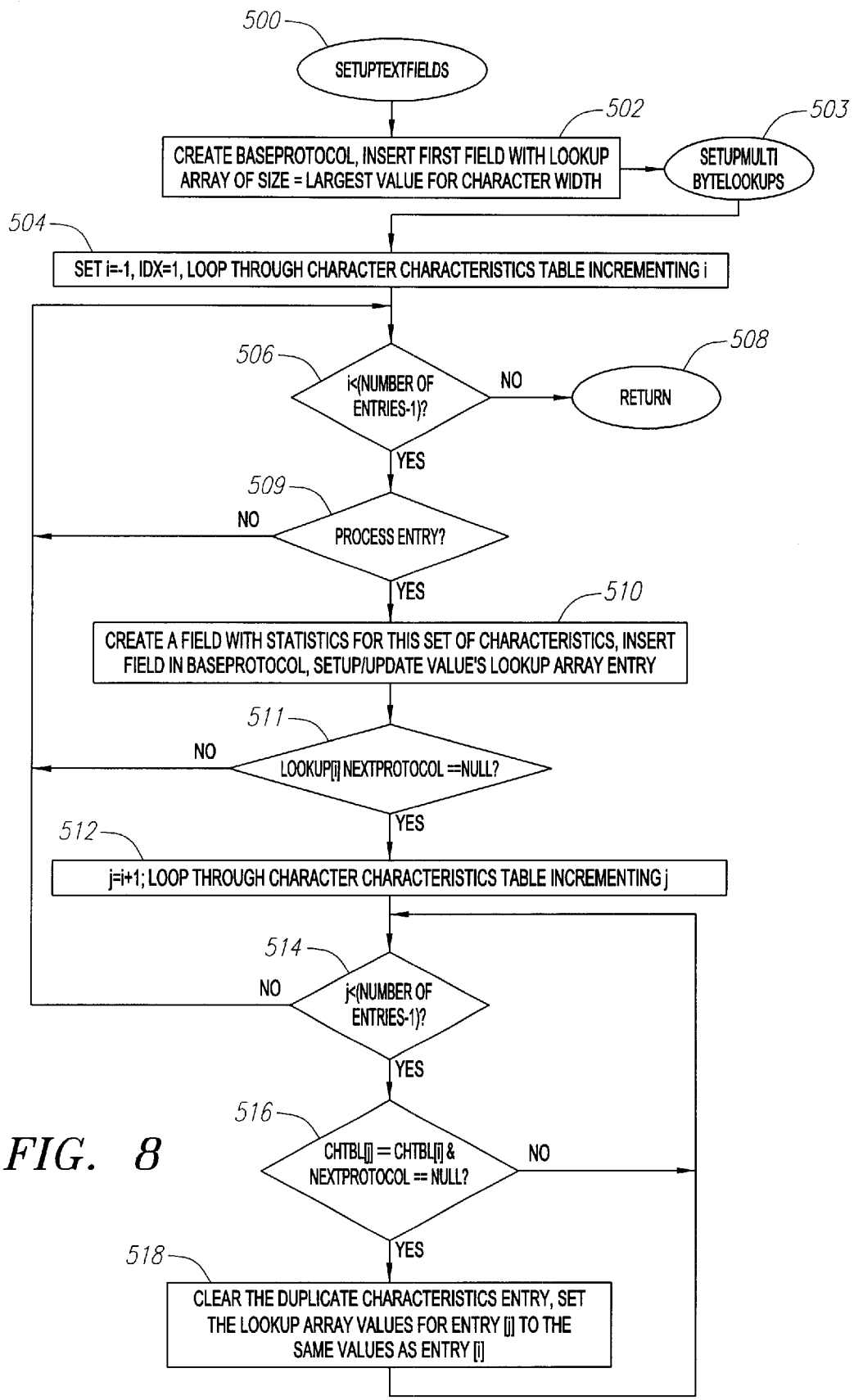
FIG. 8 is a flow chart illustrating an embodiment of the initial set up of the BaseProtocol used by the data parsing logic.
Figure 8A:
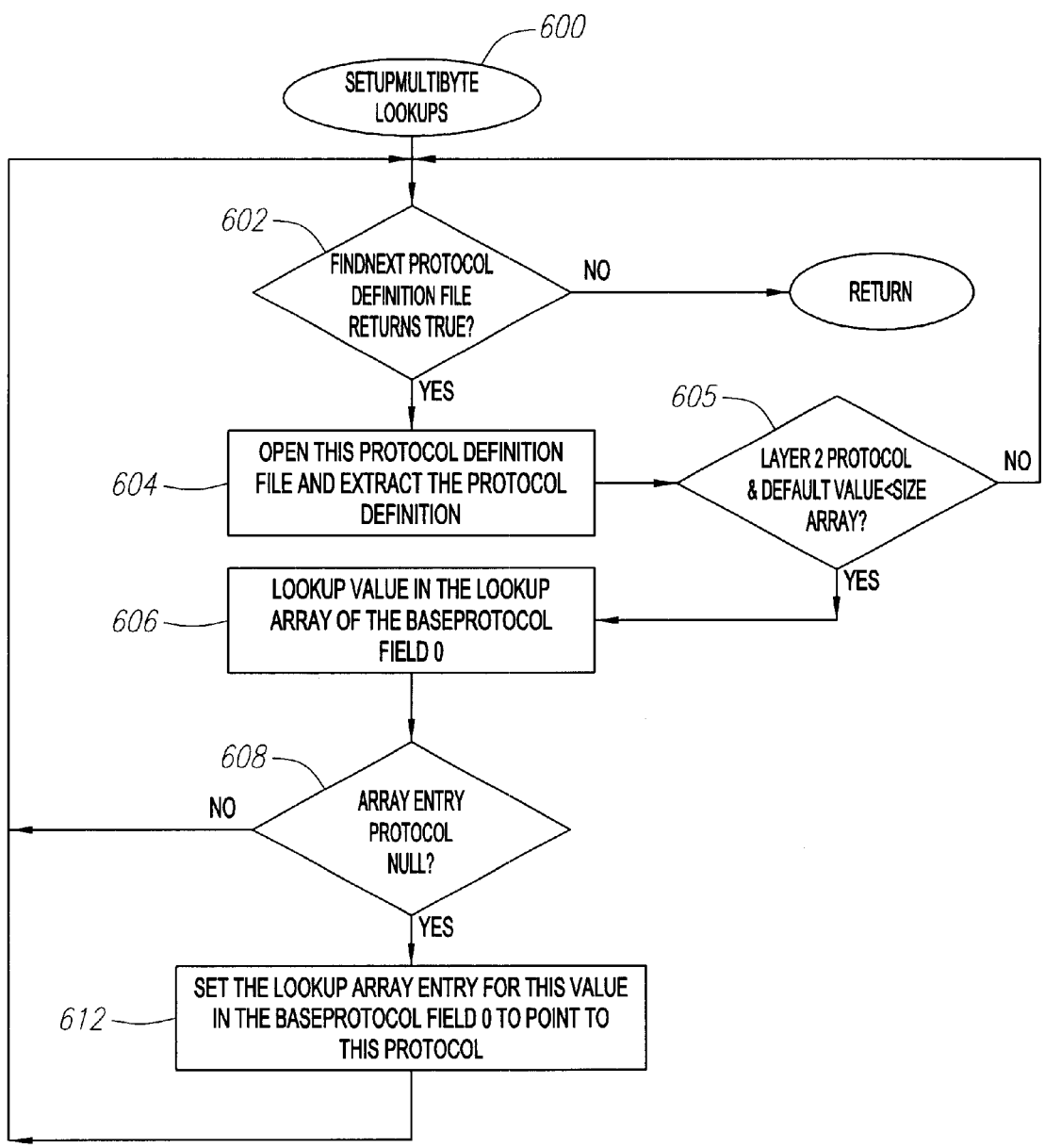
FIG. 8A is a flow chart illustrating an embodiment of the initial set up of the multi-byte protocols used by the data parsing logic.

The flow charts shown in FIGS. 8 and 8A are a preferred embodiment of the BaseProtocol Setup 500 and Multi-Byte Control Character Lookup 600 logic used to initialize the system. The components of the control logic are described in detail below.

In a preferred embodiment, the BaseProtocol record of Table 2 has a field 0 (first field) sub-record, as defined in Table 3, that is the size in bytes of a single character in the character set defined in the character definition. Field 0 has associated with it a lookup array record, as discussed in Table 5, that determines the next field in the BaseProtocol to process, by examining the values read from the data file being parsed. For the purpose of gathering statistics, additional field records, as defined in Table 3, are created, such that there is a field record for each of the characteristics groups (aggregates) defined for the character set.

Referring now to FIG. 8, the BaseProtocol Setup commences at step 500. At step 502, a lookup_array Control Record, with a size equal to the maximum value that can be expressed in a character of the defined byte size, plus two, is allocated. For a one-byte character set, such as ASCII, the lookup array size is 257 decimal. A Protocol Control Record, as defined in Table 2, is created and titled "BaseProtocol." A Field Sub-Record, as defined in Table 3, is created and titled "field 0." A Lookup Array, with a size equal to the number of characters in the character definition, is associated with the field sub-record and field 0 is inserted in BaseProtocol. The BaseProtocol's iso_layer is set to indicate that it is the BaseProtocol. At step 503, the lookup_array entries for any Multi-Byte Control Character Protocols are set up.

Referring now to FIG. 8A, in a preferred embodiment the BaseProtocol setup logic enters the Multi-Byte Control Character Protocol setup logic at step 600. The initialization of the system proceeds to step 602 for determination of the presence of PDF files and, if PDF files are found, to steps 604–612 for the extraction of the protocol and associated control record information from all of the PDF files found. If no PDF files are found, the process is complete and control returns to the BaseProtocol setup logic, at step 603. Assuming at least one PDF file is found, then at step 602 the number of PDF files is determined and a Protocol List is constructed. The Protocol List is a sorted vector of protocol records, the vector being at least the size of the number of PDF files found. The name of each protocol record found is inserted in the Protocol List.

The multi-byte control character setup logic then processes the protocol definition files, at steps 602–612. At step 602, the logic gets the next PDF file to be processed. If all PDF files have been processed, the process is complete and control is returned to the BaseProtocol setup logic, at step 603.

If there are PDF files to still be processed, then the logic proceeds to step 604, where the PDF file is written to memory in the sequence described above. If the protocol being processed has its isolayer flag set to the value two (2), indicating that the protocol is a look-up protocol, then in step 605 the default value field is read from field sub-record zero (field 0) of the protocol definition file being processed. If this value is greater than or equal to the size of the look-up array record associated with field 0, then the protocol is invalid and the logic returns to step 602 to process the next protocol. Otherwise, the logic proceeds to step 606.

At step 606, the default value obtained above is used as an index to look up the entry in the Lookup Array Record (Table 5) of field 0 of the BaseProtocol that corresponds to the protocol being processed. The logic then examines the protocol pointer stored in the Lookup Array Record entry associated with the protocol being processed, at step 608. If the protocol pointer is NULL, then in step 612, the protocol pointer is set to point to the protocol being processed, thus setting the protocol as the next protocol (proto_ptrs in Table 5) for the default value lookup_array entry. The process then returns to step 602** to process the next protocol If the protocol pointer is not NULL, then more than one multi-byte protocol has been defined for the default value found in field record zero of the definition, so the instant multi-byte protocol will be ignored.

As discussed above, once all PDF files are processed, the Multi-Byte Lookup logic is complete, and at step 603 control returns to the BaseProtocol setup logic.

Returning again to FIG. 8 at the completion of Setup-MultiByteLookups processing, the loop control variables are initialized at step 504, using i as the index for the chtbl array entries and idx as the index for the next field index. At step 506, if i is equal to or greater than the number of entries in chtbl, the setup of the single byte character fields is complete, and processing control returns, at step 508, to the main processing routine. If at step 506 i is less than the number of entries in chtbl, then control passes to step 509 where the entry is checked to see if it has already been processed. If the chtbl entry at position i has not been flagged as processed, a field control record (Table 3), indexed as field sub-record [i], is created at step 510 and the Statistics Class Record(s) (Table 4) for the characteristics represented by the value at chtbl[i] are set for the field record's statistics pointer (*ptr2stats). The field record is inserted into the "BaseProtocol" Protocol Control Record (Table 2) field pointer, the next index values in the lookup structure for this new field are set to point to field sub-record[0], and the field sub-record[0] lookup array entry at position i is set to indicate this new field as the next field to process when this lookup array entry is accessed during the parsing process.

At step 511, if the field sub-record[0] lookup_array entry at position i has a NULL NextProtocol pointer, then the chtbl entry is a single-byte character that can be grouped with other single-byte characters that have the same characteristics. The chtbl entries beyond the current entry (i) are examined for entries that are not associated with a multi-byte control protocol definition and that have characteristics that are the same as the current entry's characteristics. If the field sub-record [0] lookup_array entry for i is not NULL, then the entry is a multi-byte control, which cannot be combined with other chtbl entries, so the logic returns to step 506 to get the next chtbl entry. A loop control variable j is set to j=i+1 at step 512. Steps 514–518 group single byte characters having duplicate characteristics. If at step 514j is less than the number of entries minus one and if at step 516 the chtbl[j] entry characteristic value is equal to the current characteristic value (chtbl[i]) and the field sub-record[0] lookup_array entry at position j has a NULL protocol pointer, then at step 518 the entry chtbl[j] is set to negative one (indicating that it has been processed), and for the entry in the field[0] lookup_array at position j, the field-to-process items (field_ptrs and field_idxs) are set to point to the field sub-record[i].

If in step 514j is greater than or equal to the number of entries minus one, then there are no more chtbl entries beyond the current entry i, so the logic returns to step 506. If, in step 516, chtbl[j] is not equal to chtbl[i], then the entries do not have the same characteristics, and the logic returns to step 514 to test the next chtbl entry. If in step 516 the lookup_array entry at position j is not NULL, then chtbl[j] is a multi-byte control and cannot be grouped with chtbl[i], and the logic returns to step 514 to test the next chtbl entry.

For the exemplary case where the characteristics are those of the ASCII character set (Table 12), and no protocol definitions are present for multi-byte controls, the initialization processing of a preferred embodiment, discussed above, produces the protocol record shown in FIG. 9 for the BaseProtocol, with the ten field sub-records shown in FIG. 9A. The character set characteristic counters that will be incremented for each of the ten fields are listed in the FIG. 9A column labeled Statistics. Some of the values listed in the Statistics column are defined below in Table 12A, and are derived by adding together the values in Table 10 for each individual characteristic possessed by the members of that field. The other values listed in the Statistics column are defined in Table 10.

TABLE 12A

| | |
|---|---|
| LF | 0x5556 |
| CR | 0x555C |
| ALLSPACE | 0x6556 |
| SENTENCE | 0x6966 |
| PUNCTUATION | 0x6956 |
| ALPHANUMERIC | 0x6955 |

The lookup_array structure generated for the Field 0 field sub-record is shown in FIG. 9B. The column labeled Field Index indicates the field sub-record in the BaseProtocol that is associated with each lookup_array entry (for the purpose of statistics gathering). The text_lookup structure generated for each of the Field 1 through 9 records is shown in FIG. 9C, where the Next Index represents the next field to be processed, and points to Field 0 of the BaseProtocol (FIGS. 9 and 9A).

It will be appreciated by those skilled in the art that the system of the present invention 1) may be utilized with any file structure which is composed of a series of data structures with well-defined rules for determining subsequent data structures, each data structure having predefined fields of one or more contiguous bits; and 2) is particularly efficient where operations must be performed on a subset of fields in a data file.

Although the maximum allowable field bit width of a preferred embodiment is defined as 32 bits, to be compatible with a 32-bit architecture, it will be appreciated by those skilled in the art that the system of the present invention may be utilized with whatever field size is most convenient and efficient for each application.

Parsing and Filtering Control Logic

The WORDPERFECT Version 5.1 for WINDOWS text editor may be used as a text editor example to illustrate the use of a character set definition for a text editor for the text parsing control logic in accordance with an embodiment of the invention.

By using the initialization processing of the preferred embodiment discussed above, as applied to a data-definition file constructed by replacing the lines of the file of Table 12 with the lines of the file of Table 13 that bear the same hexadecimal values, the exemplary BaseProtocol characteristics described above in FIGS. 9, 9A and 9B for the ASCII character set may be modified, for the values shown in Table 13 below, to accommodate the WORDPERFECT single-byte control characters.

TABLE 13

Characteristics of WordPerfect characters/hexadecimal values

| | | |
|---|---|---|
| | C_INCNTRL, | /* 01 Reserved */ |
| | C_INCNTRL, | /* 02 Page no.print */ |
| | C_INCNTRL, | /* 03 Console entry print */ |
| | C_INCNTRL, | /* 04 Current date print */ |
| | C_INCNTRL, | /* 05 EOR */ |
| | C_INCNTRL, | /* 06 Field no. */ |
| | C_INCNTRL, | /* 07 Activate macro */ |
| | C_INCNTRL, | /* 08 Reserved */ |
| | C_INCNTRL, | /* 09 Reserved */ |
| C_EOWORD+C_INLINE+C_INSENT+C_INPARA+C_INPAGE+C_INSPACE+ | C_INCNTRL+C_INDOC, | /* 0A Hard return */ |
| C_EOWORD+C_INLINE+C_INSENT+C_INPARA+C_INPAGE+C_INSPACE+ | C_INCNTRL+C_INDOC, | /* 0B Soft page */ |
| C_EOWORD+C_INLINE+C_INSENT+C_INPARA+C_EOPAGE+C_INSPACE+ | C_INCNTRL+C_INDOC, | /* 0C Hard page */ |
| C_EOWORD+C_EOLINE+C_INSENT+C_INPARA+C_INPAGE+C_INSPACE+ | C_INCNTRL+C_INDOC, | /* 0D Soft return */ |
| | C_INCNTRL, | /* 0E Fetch next rec. */ |
| | C_INCNTRL, | /* 0F Screen msg delimiter */ |
| | C_INCNTRL, | /* 10 Fetch primary file */ |
| | C_INCNTRL, | /* 11 Merge code */ |
| | C_INCNTRL, | /* 12 Merge code */ |
| | C_INCNTRL, | /* 13 Merge code */ |
| | C_INCNTRL, | /* 14 Merge code */ |
| | C_INCNTRL, | /* 15 Merge code */ |
| | C_INCNTRL, | /* 16 Merge code */ |
| | C_INCNTRL, | /* 17 Reserved */ |
| | C_INCNTRL, | /* 18 Reserved */ |
| | C_INCNTRL, | /* 19 Reserved */ |
| | C_INCNTRL, | /* 1A Reserved */ |
| | C_INCNTRL, | /* 1B Reserved */ |
| | C_INCNTRL, | /* 1C Reserved */ |
| | C_INCNTRL, | /* 1D Reserved */ |
| | C_INCNTRL, | /* 1E Reserved */ |
| | C_INCNTRL, | /* 1F Reserved */ |
| C_EOWORD+C_INLINE+C_INSENT+C_INPARA+C_INPAGE+C_INSPACE+ | C_INCNTRL+C_INDOC, | /* 80 Temporary */ |
| | C_INCNTRL, | /* 81 Right justification ON */ |
| | C_INCNTRL, | /* 82 Right Justification OFF */ |
| | C_INCNTRL, | /* 83 End cntr/align */ |
| | C_INCNTRL, | /* 84 Reserved */ |

TABLE 13-continued

Characteristics of WordPerfect characters/hexadecimal values

| | | |
|---|---|---|
| | C_INCNTRL, | /* 85 Temporary */ |
| | C_INCNTRL, | /* 86 Center page top to bottom */ |
| | C_INCNTRL, | /* 87 Columns ON */ |
| | C_INCNTRL, | /* 88 Columns OFF */ |
| | C_INCNTRL, | /* 89 Reserved */ |
| | C_INCNTRL, | /* 8a Widow/orph ON */ |
| | C_INCNTRL, | /* 8b Widow/orph OFF */ |
| C_EOWORD+C_INLINE+C_INSENT+C_INPARA+C_INPAGE+C_INSPACE+ | C_INCNTRL+C_INDOC, | /* 8c hard return + soft page */ |
| | C_INCNTRL, | /* 8d Ft./endnote no. */ |
| | C_INCNTRL, | /* 8e Fig. no. */ |
| | C_INCNTRL, | /* 8f Reserved */ |
| C_EOWORD+C_INLINE+C_INSENT+C_INPARA+C_INPAGE+C_INSPACE+ | C_INCNTRL+C_INDOC, | /* 90 DSRT */ |
| C_EOWORD+C_INLINE+C_INSENT+C_INPARA+C_INPAGE+C_INSPACE+ | C_INCNTRL+C_INDOC, | /* 91 DSPG */ |
| C_EOWORD+C_INLINE+C_INSENT+C_INPARA+C_INPAGE+C_INSPACE+ | C_INCNTRL+C_INDOC, | /* 92 deleteable end of page */ |
| C_EOWORD+C_INLINE+C_INSENT+C_INPARA+C_INPAGE+C_INSPACE+ | C_INCNTRL+C_INDOC, | /* 93 soft-ret/space */ |
| C_EOWORD+C_INLINE+C_INSENT+C_INPARA+C_INPAGE+C_INSPACE+ | C_INCNTRL+C_INDOC, | /* 94 soft-hyphen */ |
| C_EOWORD+C_INLINE+C_INSENT+C_INPARA+C_INPAGE+C_INSPACE+ | C_INCNTRL+C_INDOC, | /* 95 soft page */ |
| | C_INCNTRL, | /* 96 Block ON */ |
| | C_INCNTRL, | /* 97 Block OFF */ |
| | C_INCNTRL, | /* 98 TOC page no. placeholder */ |
| C_EOWORD+C_INLINE+C_INSENT+C_INPARA+C_INPAGE+C_INSPACE+ | C_INCNTRL+C_INDOC, | /* 99 Dormant hard return */ |
| | C_INCNTRL, | /* 9a Cancel hyphenation */ |
| C_EOWORD+C_INLINE+C_INSENT+C_INPARA+C_INPAGE+C_INSPACE+ | C_INCNTRL+C_INDOC, | /* 9b End of generated data (TOC) */ |
| | C_INCNTRL, | /* 9c Reserved */ |
| | C_INCNTRL, | /* 9d Reserved */ |
| | C_INCNTRL, | /* 9e Hyphenat. OFF */ |
| | C_INCNTRL, | /* 9f Hyphenation ON */ |
| C_EOWORD+C_INLINE+C_INSENT+C_INPARA+C_INPAGE+C_INSPACE+ | C_INCNTRL+C_INDOC, | /* a0 Hard space */ |
| | C_INCNTRL, | /* a1 Do subtotal */ |
| | C_INCNTRL, | /* a2 Subtotal entry */ |
| | C_INCNTRL, | /* a3 Do total */ |
| | C_INCNTRL, | /* a4 Total entry */ |
| | C_INCNTRL, | /* a5 Do grand total */ |
| | C_INCNTRL, | /* a6 Calc column */ |
| | C_INCNTRL, | /* a7 Math ON */ |
| | C_INCNTRL, | /* a8 Math OFF */ |
| C_EOWORD+C_INLINE+C_INSENT+C_INPARA+C_INPAGE+C_EOSPACE+ | C_INCNTRL+C_INDOC, | /* a9 Hard-hyphen in line */ |
| C_EOWORD+C_INLINE+C_INSENT+C_INPARA+C_INPAGE+C_EOSPACE+ | C_INCNTRL+C_INDOC, | /* aa Hard-hyphen end-of-line */ |
| C_EOWORD+C_INLINE+C_INSENT+C_INPARA+C_INPAGE+C_EOSPACE+ | C_INCNTRL+C_INDOC, | /* ab Hard-hyphen end-of-page */ |
| C_EOWORD+C_INLINE+C_INSENT+C_INPARA+C_INPAGE+C_EOSPACE+ | C_INCNTRL+C_INDOC, | /* ac Soft-hyphen in line */ |
| C_EOWORD+C_INLINE+C_INSENT+C_INPARA+C_INPAGE+C_EOSPACE+ | C_INCNTRL+C_INDOC, | /* ad Soft-hyphen end-of-line */ |
| C_EOWORD+C_INLINE+C_INSENT+C_INPARA+C_INPAGE+C_EOSPACE+ | C_INCNTRL+C_INDOC, | /* ae Soft-hyphen end-of-page */ |
| | C_INCNTRL, | /* af Columns OFF end-of-line */ |
| | C_INCNTRL, | /* b0 Columns OFF end-of-page */ |
| | C_INCNTRL, | /* b1 Math negate */ |
| | C_INCNTRL, | /* b2 Outline OFF */ |
| | C_INCNTRL, | /* b3 Reserved */ |
| | C_INCNTRL, | /* b4 Reserved */ |
| | C_INCNTRL, | /* b5 Reserved */ |
| | C_INCNTRL, | /* b6 Reserved */ |
| | C_INCNTRL, | /* b7 Reserved */ |
| | C_INCNTRL, | /* b8 Reserved */ |
| | C_INCNTRL, | /* b9 Reserved */ |
| | C_INCNTRL, | /* ba Reserved */ |
| | C_INCNTRL, | /* bb Reserved */ |
| | C_INCNTRL, | /* bc Reserved */ |
| | C_INCNTRL, | /* bd Reserved */ |
| | C_INCNTRL, | /* be Reserved */ |
| | C_INCNTRL, | /* bf Reserved */ |

For the exemplary case where the characteristics are those of the WORDPERFECT character set (Table 13), and no protocol definitions are present for multi-byte controls, the initialization processing of a preferred embodiment, as discussed above, produces the protocol record shown in FIG. 10 for the BaseProtocol, with the first eleven field sub-records shown in FIG. 10A. The statistics records configured for each of the ten fields are listed in the FIG. 10A column labeled Statistics. The values listed in the Statistics column are defined in Table 12A, and are derived by adding together the values in Table 10 for each individual characteristic possessed by the members of that field.

The lookup_array structure generated for the Field 0 field sub-record is the same as that for the ASCII character set shown in FIG. 9B, with the exception of entries 10, 96, and 129 through 192, as shown in FIG. 10B. The column labeled Field Index indicates the Field Sub-Record in the BaseProtocol that is associated with each lookup_array entry (for the purpose of statistics gathering). The text_lookup structure generated for each of the field records beyond entry zero is shown in FIG. 10C, where the Next Index represents the next field to be processed and points to Field 0 of the BaseProtocol (FIGS. 10 and 10A).

Twelve simple protocol descriptions based on WORDPERFECT multiple byte control characters are provided herein to assist in the description of an embodiment of the system of the present invention. In a preferred embodiment of the invention, the twelve protocol descriptions are read and processed by the multi-byte lookup setup logic, as shown in FIG. 8A and discussed above. The multi-byte lookup setup logic will add a field to the BaseProtocol of FIG. 10 for each of the ten character values that indicated the presence of one or more multi-byte controls (FIGS. 10 and 10A), and the lookup_array for the Field 0 field sub-record will be modified during initialization to include entries that reference these protocols. These modified entries in the lookup_array are shown in FIG. 10D. The protocols defined are shown in FIGS. 11 through 18H. The WORDPERFECT control characters that the protocols are based on are described in Tables 14 through 24 below.

The first control, shown in Table 14, is a simplified description of the WORDPERFECT standard prefix. The associated protocol definition is shown in FIGS. 11, 11A and 11B.

TABLE 14

Abbreviated WORDPERFECT Standard Prefix

| Identifier | 1 character | 0xFF |
|---|---|---|
| WORDPERFECT File ID | 3 characters | "WPC" |
| Total length of prefix headers | 4 characters | variable value |

The WORDPERFECT standard prefix described above specifies only three of the nine fields actually in the prefix. The exemplary case will use the total length of all prefix headers to skip over the characters in the file that are in the WORDPERFECT document prefix, rather than search through the prefix file headers character by character. It will be appreciated by those skilled in the art that this capability of an embodiment of the present invention to recognize and skip such control information when searching for data in a file provides a significant advantage over standard editor-independent search tools. Additionally, it will be appreciated by those skilled in the art that the full specification of protocol definitions and associated optional protocols of the standard prefix and the variable length additional prefixes, or any of the other multi-byte control characters, permits searching and statistics gathering to be performed on these control characters.

The three controls shown in Tables 15 through 17 are examples of WORDPERFECT fixed length multi-byte control characters. The associated protocol definitions are shown in FIGS. 12, 13, and 13B. The associated field sub-records are shown in FIGS. 12A, 13A and 13C.

TABLE 15

Center_Align_Tab_Left_Margin_Release Control

| Begin function | 1 byte | 0xC1 |
|---|---|---|
| Flags | 1 byte | variable value |
| Old current column number | 2 bytes | variable value |
| Absolute center/align/tab position | 2 bytes | variable value |
| Starting column position | 2 bytes | variable value |
| End function code | 1 byte | 0xC1 |

TABLE 16

Attribute ON Control

| Begin function | 1 byte | 0xC3 |
|---|---|---|
| Attribute type | 1 byte | variable value |
| End function | 1 byte | 0xC3 |

TABLE 17

Attribute OFF Control

| Begin function | 1 byte | 0xC4 |
|---|---|---|
| Attribute type | 1 byte | variable value |
| End function | 1 byte | 0xC4 |

The eight controls shown in Tables 18 through 25 are examples of WORDPERFECT fixed and variable length multi-byte control characters with length fields. The associated protocol definitions are shown in FIGS. 14 through 19.

The exemplary variable length multi-byte controls include two controls whose first character is hexadecimal 0xD0, shown in Tables 18 and 19, and three controls whose first character is hexadecimal 0xDC, shown in Tables 23–25. In a preferred embodiment, the protocols defined below in Tables 26 and 27 accommodate the controls with duplicate first characters. Both of these protocols consist of two fields (FIGS. 14A and 18A), the second field having a lookup structure to determine the next protocol. FIG. 14B shows the lookup structure entries for Page_Format_Control protocols, and FIG. 18B shows the lookup structure entries for Table_End_of_Line_Codes protocols.

TABLE 18

Set Line Height Control

| Begin function | 1 byte | 0xD0 |
|---|---|---|
| Begin subfunction | 1 byte | 0 |
| Length word | 2 bytes | 8 |
| Old line height (wpu) | 2 bytes | variable value |
| New line height (wpu) | 2 bytes | variable value |
| Length word | 2 bytes | 8 |
| End subfunction code | 1 byte | 0 |
| End function code | 1 byte | 0xD0 |

TABLE 19

Justification Control

| | | |
|---|---|---|
| Begin function | 1 byte | 0xD0 |
| Begin subfunction | 1 byte | 6 |
| Length word | 2 bytes | 6 |
| Old justification mode | 1 byte | variable value |
| New justification mode | 1 byte | variable value |
| Length word | 2 bytes | 6 |
| End subfunction code | 1 byte | 6 |
| End function code | 1 byte | 0xD0 |

TABLE 20

Define Tables Control

| | | |
|---|---|---|
| Begin function | 1 byte | 0xD2 |
| Begin subfunction | 1 byte | 0x0B |
| Length word | 2 bytes | variable value |
| Table Flags | 1 byte | variable value |
| Shading percent (0–100) | 1 byte | variable value |
| Number of columns (max32) | 2 bytes | variable value |
| Table number | 2 bytes | variable value |
| Left edge of table (wpu) | 2 bytes | variable value |
| Left gutter space (wpu) | 2 bytes | variable value |
| Right gutter space (wpu) | 2 bytes | variable value |
| Top gutter space (wpu) | 2 bytes | variable value |
| Bottom gutter space (wpu) | 2 bytes | variable value |
| First row after header | 2 bytes | variable value |
| Formatter lines (wpu) | 2 bytes | variable value |
| First table page number | 2 bytes | variable value |
| Left edge offset | 2 bytes | variable value |
| Column widths | 2 bytes per column | variable value |
| Column attributes | 2 bytes per column | variable value |
| Column alignments | 2 bytes per column | variable value |
| New Table Flags | 1 bytes | variable value |
| New Shading percent (0–100) | 1 bytes | variable value |
| New No. of columns (max32) | 2 bytes | variable value |
| New Table number | 2 bytes | variable value |
| New Left edge of table (wpu) | 2 bytes | variable value |
| New Left gutter space (wpu) | 2 bytes | variable value |
| New Right gutter space (wpu) | 2 bytes | variable value |
| New Top gutter space (wpu) | 2 bytes | variable value |
| New Bottom gutter space (wpu) | 2 bytes | variable value |
| New First row after header | 2 bytes | variable value |
| New Formatter lines (wpu) | 2 bytes | variable value |
| New First table page number | 2 bytes | variable value |
| New Left edge offset | 2 bytes | variable value |
| New Column widths | 2 bytes per column | variable value |
| New Column attributes | 2 bytes per column | variable value |
| New Column alignments | 2 bytes per column | variable value |
| NULL data | 2 bytes | 0000 |
| Length word | 2 bytes | variable value |
| End subfunction code | 1 byte | 0x0B |
| End function code | 1 byte | 0xD2 |

TABLE 21

Set Underline Mode Control

| | | |
|---|---|---|
| Begin function | 1 byte | 0xD3 |
| Begin subfunction | 1 byte | 0x01 |
| Length word | 2 bytes | 6 |
| Old definition | 1 byte | variable value |
| New definition | 1 byte | variable value |
| Length word | 2 bytes | 6 |
| End subfunction code | 1 byte | 0x01 |
| End function code | 1 byte | 0xD3 |

TABLE 22

Leading Adjustment Control

| | | |
|---|---|---|
| Begin function | 1 byte | 0xD9 |
| Begin subfunction | 1 byte | 0x05 |
| Length word | 2 bytes | 12 |
| Old [srt] and [HRr] | 4 byte | variable value |
| New [srt] and [HRr] | 4 byte | variable value |
| Length word | 2 bytes | 12 |
| End subfunction code | 1 byte | 0x05 |
| End function code | 1 byte | 0xD9 |

TABLE 23

Beginning of Column (Cell) At End of Line Control

| | | |
|---|---|---|
| Begin function | 1 byte | 0xDC |
| Begin subfunction | 1 byte | 0x00 |
| Length word | 2 bytes | variable value |
| Flags | 1 byte | variable value |
| Column number | 1 byte | variable value |
| Column spanning information | 1 byte | variable value |
| Row spanning information | 1 byte | variable value |
| Old max no. formatter lines | 2 bytes | variable value |
| Old max no screen lines | 2 bytes | variable value |
| Cell attributes | 2 bytes | variable value |
| Cell justification | 1 byte | variable value |
| <optional fields present based on the 2 byte function length> | | |
| Length word | 2 bytes | variable value |
| End subfunction code | 1 byte | 0x00 |
| End function code | 1 byte | 0xDC |

TABLE 23A

Beginning of Column At End of Line Option Control

| | | |
|---|---|---|
| Subgroup code | 1 byte | variable value |
| Subgroup | 255 byte max | variable value |

TABLE 24

Beginning of Row at End of Line Control

| | | |
|---|---|---|
| Begin function | 1 byte | 0xDC |
| Begin subfunction | 1 byte | 0x01 |
| Length word | 2 bytes | variable value |
| Old row height flags | 1 byte | variable value |
| Old row height (wpu) | 2 bytes | variable value |
| Old border information length | 1 byte | variable value |
| Old border information | variable length | variable value |
| Cell border style: | variable length | variable value |
| New row height flags | one byte | variable value |
| New row height (wpu) | two bytes | variable value |
| New border information length | 1 byte | variable value |
| New border information | variable length | variable value |
| Old no. formatter lines | two bytes | variable value |
| Length word | 2 bytes | variable value |
| End subfunction code | 1 byte | 0x01 |
| End function code | 1 byte | 0xDC |

TABLE 25

Table Off at End of Line Control

| | | |
|---|---|---|
| Begin function | 1 byte | 0xDC |
| Begin subfunction | 1 byte | 0x02 |
| Length word | 2 bytes | variable value |
| Flags | 1 byte | variable value |
| Old row height (wpu) | 2 bytes | variable value |
| Old no. bytes border info | 1 byte | variable value |
| Old border info for row | variable length | variable value |

TABLE 25-continued

Table Off at End of Line Control

| | | |
|---|---|---|
| Old no of rows | 2 bytes | variable value |
| Old no of formatter lines | 2 bytes | variable value |
| Old size of header rows (wpu) | 2 bytes | variable value |
| Old number of columns | 1 byte | variable value |
| Length word | 2 bytes | variable value |
| End subfunction code | 1 byte | 0x02 |
| End function code | 1 byte | 0xDC |

TABLE 26

Page__Format__Controls Protocol Specification

| | | |
|---|---|---|
| Begin function | 1 byte | 0xD0 |
| Begin subfunction | 1 byte | variable value |

TABLE 27

Table__End__of__Line__Codes__Controls Protocol Specification

| | | |
|---|---|---|
| Begin function | 1 byte | 0xDC |
| Begin subfunction | 1 byte | variable value |

A short data file consistent with the WORDPERFECT Version 5.1 for WINDOWS text editor is provided as an example to assist in describing the parsing and filtering control logic. The exemplary file is shown in two forms: Example 1 below shows the file as it would appear as a formatted document. Example 2 below is the contents of the file shown as hexadecimal bytes. The left column of Example 2 shows values of 000000 through 0007c0 in increments of 10 hexadecimal that indicate the sequential byte position of each line of hexadecimal characters. The large central column is the hexadecimal bytes of the example file, listed sixteen characters to a line. The right column shows the ASCII character equivalent of all the hexadecimal values that represent printable characters.

EXAMPLE 1

| Country | Gross Sales | Units Sold |
|---|---|---|
| England | $1,250,000.00 | 10,000 |
| Iceland | $490,000.00 | 7,000 |
| Norway | $1,215,000.00 | 9,000 |

Denver to: Mazatlan $750 Round Trip

7 Days Accomodations

Surfside Inn

Denver to: Maui $789 Round Trip

10 Days Accomodations

Tolofa Plaza

Denver to: Jamaica $1100 Round Trip

6 Days Accomodations

Caribbean Count

Example 2

```
byteindex  ←──────── file data as hexadecimal bytes ────────→  ←─── ASCII ───→

000000   FF  57  50  43  F0  02  00  00-01  0A  00  01  00  00  00  00    WPC = ☻     ☻☺  ☻
000010   FB  FF  05  00  32  00  10  01-00  00  06  00  08  00  00  00    √ ♣2 ►☻    ♠ ◘
000020   42  00  00  00  07  00  16  00-00  00  4A  00  00  00  0F  00    B   •  ■        ]  ☼
000030   56  00  00  00  60  00  00  00-0C  00  5A  00  00  00  B6  00    V            ♀ Z    ¶
000040   00  00  18  00  7C  00  78  00-00  00  54  69  6D  65  73  20      ↑ |   x      Times
000050   4E  65  77  20  52  6F  6D  61-6E  20  20  28  54  54  29  00    New Roman    (TT)
000060   00  00  00  00  00  00  00  00-00  00  00  00  00  00  00  00
000070   00  00  00  00  01  01  01  F4-01  43  00  F4  1A  5C  12  1A           ☻☻☻ ƒ☻C  ƒ → \ ↕ →
000080   09  00  00  00  10  20  50  8E-00  1C  36  51  11  03  10  F4         ►   PÄ  L6Q ◄♥► ƒ
000090   01  50  00  00  00  00  00  00-00  00  00  00  00  00  00  00    ☻P
0000A0   00  00  00  00  00  00  00  00-00  00  00  00  00  00  00  00
0000B0   00  00  00  00  00  00  00  00-00  00  00  00  00  00  00  00
0000C0   00  00  00  00  00  00  00  00-00  00  00  00  00  00  00  00
0000D0   00  00  00  00  00  00  00  00-00  00  00  00  00  00  00  00
0000E0   00  00  00  00  00  00  00  00-00  00  00  00  00  00  00  00
0000F0   00  00  00  00  00  00  00  00-00  00  00  00  00  00  00  00
000100   00  00  00  00  00  00  00  00-00  00  00  00  00  00  00  00
000110   FB  FF  05  00  32  00  52  02-00  00  03  00  3F  00  00  00    √ ♣ 2  R☻       ♥   ?
000120   42  01  00  00  01  00  C9  00-00  00  81  01  00  00  15  00    B☻  ☻ F       ü☻     §
000130   06  00  00  00  4A  02  00  00-08  00  02  00  00  00  50  02    ♠    J☻   ◘   ☻     P☻
000140   00  00  D9  07  14  00  FF  F4-E9  DE  70  68  6F  65  6E  69      ┘ ¶    ƒe |phoeni
000150   78  00  03  00  01  00  14  00-07  D9  D1  01  23  00  00  58    X♥  ☻   ¶  ·┘┬☻# X
000160   02  50  00  F4  1A  5C  12  1A-09  00  00  00  10  20  50  8E    ☻P  ƒ→ \ ↕ →    ►   PÄ
000170   00  1C  36  51  11  03  10  00-02  02  58  02  50  23  00  01       L6Q ◄♥►      ☻☻X☻P# ☻
```

Example 2

| | | | | | | | | | | | | | | | | |
|---|---|---|---|---|---|---|---|---|---|---|---|---|---|---|---|---|
| 000180 | D1 | 20 | 20 | 20 | 20 | 20 | 20 | 20-20 | 20 | 20 | 20 | 20 | 20 | 20 | 20 | ┬ |
| 000190 | 20 | 20 | 20 | 20 | 20 | 20 | 20 | 20-20 | 20 | 00 | 20 | 20 | 20 | 20 | 20 | |
| 0001A0 | 20 | 20 | 20 | 20 | 20 | 20 | 20 | 20-20 | 20 | 20 | 20 | 20 | 20 | 20 | 20 | |
| 0001B0 | 20 | 20 | 20 | 20 | 20 | 20 | 20 | 20-20 | 20 | 20 | 20 | 20 | 20 | 20 | 20 | |
| 0001C0 | 20 | 20 | 20 | 20 | 20 | 20 | 20 | 20-20 | 20 | 20 | 20 | 20 | 20 | 20 | 20 | |
| 0001D0 | 20 | 20 | 20 | 20 | 20 | 20 | 20 | 20-20 | 20 | 20 | 20 | 20 | 20 | 20 | 20 | |
| 0001E0 | 20 | 20 | 20 | 20 | 20 | 20 | 20 | 20-20 | 20 | 20 | 20 | 20 | 20 | 20 | 20 | |
| 0001F0 | 20 | 20 | 20 | 00 | 00 | 4E | 42 | 20-4E | 65 | 74 | 77 | 6F | 72 | 6B | 73 | NB Networks |
| 000200 | 20 | 20 | 20 | 20 | 20 | 20 | 20 | 20-43 | 6F | 6D | 70 | 61 | 6E | 79 | 20 | Company |
| 000210 | 50 | 72 | 69 | 76 | 61 | 74 | 65 | 00-4E | 42 | 20 | 4E | 65 | 74 | 77 | 6F | Private NB Netwo |
| 000220 | 72 | 6B | 73 | 20 | 20 | 20 | 20 | 20-20 | 20 | 20 | 43 | 6F | 6D | 70 | 61 | rks Compa |
| 000230 | 6E | 79 | 20 | 50 | 72 | 69 | 76 | 61-74 | 65 | 00 | 00 | 00 | 00 | FF | D0 | ny Private ⊥ |
| 000240 | 07 | 01 | 11 | 14 | 0A | 00 | 00 | 00-00 | FF | 01 | 00 | 04 | 00 | 00 | 00 | •☻◄¶☐ ☻ ♦ |
| 000250 | 00 | 00 | FB | FF | 05 | 00 | 32 | 00-00 | 00 | 00 | 00 | 01 | 01 | 6C | 00 | √ ♣ 2 ☻☻⌐ |
| 000260 | 00 | 00 | 00 | 84 | 02 | 00 | 00 | 00-00 | 00 | 00 | 00 | 00 | 00 | 00 | 00 | ä ☻ |
| 000270 | 00 | 00 | 00 | 00 | 00 | 00 | 00 | 00-00 | 00 | 00 | 00 | 00 | 00 | 00 | 00 | |
| 000280 | 00 | 00 | 00 | 00 | 44 | 65 | 66 | 61-75 | 6C | 74 | 20 | 50 | 61 | 72 | 61 | Default Para |
| 000290 | 67 | 72 | 61 | 70 | 68 | 20 | 46 | 6F-00 | 01 | 44 | 65 | 66 | 61 | 75 | 6C | graph Fo ☻Defaul |
| 0002A0 | 74 | 20 | 50 | 61 | 72 | 61 | 67 | 72-61 | 70 | 68 | 20 | 46 | 6F | 6E | 74 | t Paragraph Font |
| 0002B0 | 00 | 00 | 00 | 00 | 00 | 00 | 00 | 00-00 | 00 | 00 | 00 | 00 | 00 | 00 | 00 | |
| 0002C0 | 00 | 00 | 00 | 00 | 00 | 00 | 00 | 00-00 | 00 | 00 | 00 | 00 | 00 | 00 | 00 | |
| 0002D0 | 00 | 01 | 0A | 00 | 00 | 00 | 0A | 00-00 | 00 | 00 | 00 | D3 | 01 | 06 | 00 | ☻☻ ☐♠ |
| 0002E0 | 00 | 03 | 06 | 00 | 01 | D3 | D3 | 01-06 | 00 | 03 | 00 | 06 | 00 | 01 | D3 | ♥♠ ☻⊥⊥☻♠♥♠☻⊥ |
| 0002F0 | D0 | 06 | 06 | 00 | 01 | 00 | 06 | 00-06 | D0 | D3 | 01 | 06 | 00 | 00 | 03 | ⊥♠♠♠♠♠⊥⊥☻♠ ♥ |
| | | | | | | | | | | | | | | | | |
| 000300 | 06 | 00 | 01 | D3 | 0A | D2 | 0B | 54-00 | 00 | 00 | 03 | 00 | 00 | 00 | B0 | ♠☻⊥☐♂T ♥ |
| 000310 | 04 | 64 | 00 | 64 | 00 | 00 | 00 | 00-00 | 01 | 00 | 00 | 00 | 00 | 00 | 00 | ♦d d ☻ |
| 000320 | 00 | 9E | 07 | 9E | 07 | 9E | 07 | 00-00 | 00 | 00 | 00 | 00 | 40 | 40 | 40 | R₅•R₅•R₅• @@@ |
| 000330 | 00 | 00 | 03 | 00 | 00 | 00 | B0 | 04-64 | 00 | 64 | 00 | 00 | 00 | 00 | 00 | ♥ ☐♦d d |
| 000340 | 01 | 00 | 00 | 00 | 00 | 00 | 00 | 00-9E | 07 | 9E | 07 | 9E | 07 | 00 | 00 | ☻ R₅•R₅•R₅• |
| 000350 | 00 | 00 | 00 | 00 | 40 | 40 | 40 | 00-00 | 54 | 00 | 0B | D2 | DC | 01 | 1A | @@@ T ♂π☐☻→ |
| 000360 | 00 | 03 | 00 | 00 | 86 | 09 | 01 | 09-01 | 09 | 09 | 03 | 00 | 00 | 86 | 09 | ♥ å ☻ ♥ å |
| 000370 | 00 | 09 | 00 | 09 | 08 | 00 | 00 | 1A-00 | 01 | DC | DC | 00 | 0F | 00 | 13 | ☐→ ☻☐ ☼ !! |
| 000380 | 00 | 01 | 01 | 00 | 00 | 00 | 00 | 00-00 | 00 | 0F | 00 | 00 | DC | D0 | 00 | ☻☻ ☼ |
| 000390 | 08 | 00 | 00 | 00 | 64 | 00 | 08 | 00-00 | D0 | 0A | D0 | 00 | 08 | 00 | 64 | ☐ d ☐ ☐ d |
| 0003A0 | 00 | 00 | 00 | 08 | 00 | 00 | D0 | D0-06 | 06 | 00 | 00 | 02 | 06 | 00 | 06 | ☐ ⊥⊥♠♠ ☻♠ |
| 0003B0 | D0 | C3 | 0C | C3 | 43 | 6F | 75 | 6E-74 | 72 | 79 | DC | 00 | 0F | 00 | 13 | ⊥ ├♀┤Country☐ ☼ !! |
| 0003C0 | 01 | 01 | 01 | 00 | 00 | 00 | 00 | 00-00 | 00 | 0F | 00 | 00 | DC | D0 | 00 | ☻☻☻ ☼ |
| 0003D0 | 08 | 00 | 00 | 00 | 64 | 00 | 08 | 00-00 | D0 | 0A | D0 | 00 | 08 | 00 | 64 | ☐ d ☐ ☐ d |
| 0003E0 | 00 | 00 | 00 | 08 | 00 | 00 | D0 | D0-06 | 06 | 00 | 00 | 02 | 06 | 00 | 06 | ☐ ⊥⊥♠♠ ☻♠ |
| 0003F0 | D0 | 47 | 72 | 6F | 73 | 73 | 20 | 53-61 | 6C | 65 | 73 | DC | 00 | 0F | 00 | ⊥Gross Sales☐ ☼ |
| 000400 | 13 | 02 | 01 | 01 | 00 | 00 | 00 | 00-00 | 00 | 00 | 00 | 00 | DC | D0 | !! ☻☻☻ ☼ |
| 000410 | 00 | 08 | 00 | 00 | 00 | 64 | 00 | 08-00 | 00 | D0 | 0A | D0 | 00 | 08 | 00 | d ☐ ⊥☐ |
| 000420 | 64 | 00 | 00 | 00 | 08 | 00 | 00 | D0-D0 | 06 | 06 | 00 | 00 | 02 | 06 | 00 | d ☐ ⊥⊥♠♠ ☻♠ |
| 000430 | 06 | D0 | 55 | 6E | 69 | 74 | 73 | 20-53 | 6F | 6C | 64 | C4 | 0C | C4 | DC | ♠⊥Units sold ♀─ |
| 000440 | 01 | 1A | 00 | 03 | 00 | 00 | 86 | 09-01 | 09 | 01 | 09 | 09 | 03 | 00 | 00 | ☻→ ♥ å ☻ ♥ |
| 000450 | 86 | 09 | 00 | 09 | 00 | 09 | 08 | 00-00 | 1A | 00 | 01 | DC | DC | 00 | 0F | å ☐ → ☻☐ ☼ |
| 000460 | 00 | 13 | 00 | 01 | 01 | 00 | 00 | 00-00 | 00 | 00 | 00 | 0F | 00 | 00 | DC | !! ☻☻ ☼ |
| 000470 | D0 | 00 | 08 | 00 | 00 | 00 | 64 | 00-80 | 00 | 00 | D0 | 0A | D0 | 00 | 08 | ⊥ ☐ d ☐ ⊥☐ |
| | | | | | | | | | | | | | | | | |
| 000480 | 00 | 64 | 00 | 00 | 00 | 08 | 00 | 00-D0 | 45 | 6E | 67 | 6C | 61 | 6E | 64 | d ☐ ⊥England |
| 000490 | DC | 00 | 0F | 00 | 13 | 01 | 01 | 01-00 | 00 | 00 | 00 | 00 | 00 | 00 | 0F | ☐ ☼ !!☻☻☻ ☼ |
| 0004A0 | 00 | 00 | DC | D0 | 00 | 08 | 00 | 00-00 | 64 | 00 | 08 | 00 | 00 | D0 | 0A | ☐⊥ ☐ d ☐ ⊥ |
| 0004B0 | D0 | 00 | 00 | 00 | 64 | 00 | 00 | 00-08 | 00 | 00 | D0 | D0 | 06 | 06 | 00 | ☐ d ☐ ⊥⊥♠♠ |
| 0004C0 | 00 | 03 | 06 | 00 | 06 | D0 | 24 | 31-2C | 32 | 35 | 30 | 2C | 30 | 30 | 30 | ♥♠ ♠⊥$1,250,000 |
| 0004D0 | 2E | 30 | 30 | DC | 00 | 0F | 00 | 13-02 | 01 | 01 | 00 | 00 | 00 | 00 | 00 | .00☐ ☼ !! ☻☻☻ |
| 0004E0 | 00 | 00 | 0F | 00 | 00 | DC | D0 | 00-08 | 00 | 00 | 00 | 64 | 00 | 08 | 00 | ☼ ☐⊥ ☐ d ☐ |
| 0004F0 | 00 | D0 | 0A | D0 | 00 | 00 | 00 | 64-00 | 00 | 00 | 08 | 00 | 00 | D0 | 0A | ⊥☐ d ☐ ⊥ |
| 000500 | 06 | 06 | 00 | 00 | 03 | 06 | 00 | 06-D0 | 31 | 30 | 2C | 30 | 30 | 30 | DC | ♠♠ ♥♠ ♠⊥10,000☐ |
| 000510 | 01 | 1A | 00 | 03 | 00 | 00 | 86 | 09-01 | 09 | 01 | 09 | 09 | 03 | 00 | 00 | ☻→ ♥ å ☻ ♥ |
| 000520 | 86 | 09 | 00 | 09 | 00 | 09 | 08 | 00-00 | 1A | 00 | 01 | DC | DC | 00 | 0F | å ☐ → ☻☐ ☼ |
| 000530 | 00 | 13 | 00 | 01 | 01 | 00 | 00 | 00-00 | 00 | 00 | 00 | 0F | 00 | 00 | DC | !! ☻☻ ☼ |
| 000540 | D0 | 00 | 08 | 00 | 00 | 00 | 64 | 00-08 | 00 | 00 | D0 | 0A | D0 | 00 | 08 | ⊥ ☐ d ☐ ⊥☐ |
| 000550 | 00 | 64 | 00 | 00 | 00 | 08 | 00 | 00-D0 | 49 | 63 | 65 | 6C | 61 | 6E | 64 | d ☐ ⊥Iceland |
| 000560 | DC | 00 | 0F | 00 | 13 | 01 | 01 | 01-00 | 00 | 00 | 00 | 00 | 00 | 00 | 0F | ☐ ☼ !!☻☻☻ ☼ |
| 000570 | 00 | 00 | DC | D0 | 00 | 08 | 00 | 00-00 | 64 | 00 | 08 | 00 | 00 | D0 | 0A | ☐⊥ ☐ d ☐ ⊥ |
| 000580 | D0 | 00 | 00 | 00 | 64 | 00 | 00 | 00-08 | 00 | 00 | D0 | D0 | 06 | 06 | 00 | ☐ d ☐ ⊥⊥♠♠ |
| 000590 | 00 | 03 | 06 | 00 | 06 | D0 | 24 | 34-39 | 30 | 2C | 30 | 30 | 30 | 2E | 30 | ♥♠ ♠⊥$490,000.0 |
| 0005A0 | 30 | DC | 00 | 0F | 00 | 13 | 02 | 01-01 | 00 | 00 | 00 | 00 | 00 | 00 | 00 | 0☐ ☼ !!☻☻☻ |
| 0005B0 | 0F | 00 | 00 | DC | D0 | 00 | 08 | 00-00 | 00 | 64 | 00 | 08 | 00 | 00 | D0 | ☼ ☐⊥ ☐ d ☐ ⊥ |
| 0005C0 | 0A | D0 | 00 | 00 | 00 | 08 | 00 | 00-00 | 08 | 00 | 00 | D0 | D0 | 06 | 06 | ☐ ☐ ⊥⊥♠♠ |
| 0005D0 | 00 | 00 | 03 | 06 | 00 | 06 | D0 | 37-2C | 30 | 30 | 30 | DC | 01 | 1A | 00 | ♥♠ ♠⊥$7,000☐ ☻→ |
| 0005E0 | 03 | 00 | 00 | 86 | 09 | 01 | 09 | 01-09 | 09 | 03 | 00 | 00 | 86 | 09 | 01 | ♥ å ☻ ♥ å ☻ |
| 0005F0 | 09 | 01 | 09 | 09 | 00 | 00 | 1A | 00-01 | DC | DC | 00 | 0F | 00 | 13 | 00 | ☻ → ☻☐ ☼ !! |

-continued

Example 2

```
000600  01 01 00 00 00 00 00 00-00 0F 00 00 DC D0 00 08   ⊕⊕        ☼  ⊥ ▫
000610  00 00 00 64 00 08 00 00-D0 0A D0 00 08 00 64 00       d ▫    ⊥⊞⊥    d
000620  00 00 08 00 00 D0 4E 6F-72 77 61 79 DC 00 0F 00       ▫   ⊥Norway  ▫  ☼
000630  13 01 01 01 00 00 00 00-00 00 00 0F 00 00 DC D0   !!⊕⊕⊕         ☼     ⊥
000640  00 08 00 00 00 64 00 08-00 00 D0 0A D0 00 08 00     ▫      d ▫  ⊥⊞⊥     ▫
000650  64 00 00 00 08 00 00 00-D0-D0 06 06 00 00 03 06  d  ▫   ⊥⊥▲▲    ♥▲
000660  06 D0 24 31 2C 32 31 35-2C 30 30 30 2E 30 30 DC   ▲⊥  $1,215,000.00▪
000670  00 0F 00 13 02 01 01 00-00 00 00 00 00 00 0F 00     ☼   !!⊕⊕⊕         ☼
000680  00 DC D0 00 08 00 00 00-64 00 08 00 00 D0 0A D0     ⊥ ▫       d ▫  ⊥⊞⊥
000690  00 08 00 64 00 00 00 00-08-00 00 D0 D0 06 06 00       d ▫    ⊥⊥▲▲
0006A0  03 06 00 06 D0 39 2C 30-30 30 DC 02 11 00 00 00   ♥▲  ▲⊥ 9,000▪ ⊕◄
0006B0  00 00 00 00 00 00 00 00-00 00 11 00 02 DC D9            ◄ ⊕▪⊥
0006C0  05 0C 00 00 00 00 00 00-00 2E 00 0C 00 05 D9 0A   ♣♀         ♀ ♣⊥▫
0006D0  D9 05 0C 00 00 00 00 2E-00 00 00 00 00 05 D9       J♣♀         ♀ ♣♀
0006E0  0A 44 65 6E 76 65 72 20-74 6F 3A C1 02 00 00 00    ▫ Denver to:  ⊥⊕
0006F0  00 00 00 C1 4D 61 7A 61-74 6C 61 6E 0A 24 37 35         ⊥Mazatlan ▫ $75
000700  30 20 52 6F 75 6E 64 20-54 72 69 70 0A 37 20 44   0 Round  Trip   ▫ 7 D
000710  61 79 73 20 41 63 63 6F-6D 6F 64 61 74 69 6F 6E   ays  Accomodation
000720  73 0A 53 75 72 66 73 69-64 65 20 49 6E 6E 0A 0A   s ▫ Surfside Inn ▫▫
000730  44 65 6E 76 65 72 20 74-6F 3A C1 02 00 00 00 00   Denver to:  ⊥⊕
000740  00 00 C1 4D 61 75 69 0A-24 37 38 39 20 52 6F 75       ⊥Maui ▫ $789 Rou
000750  6E 64 20 54 72 69 70 20-0A 31 30 20 44 61 79 73   nd Trip ▫ 10 Days
000760  41 63 63 6F 6D 6F 64 61-74 69 6F 6E 73 0A 54 6F   Accomodations ▫ To
000770  6C 6F 66 61 20 20 50 6C-61 7A 61 0A 0A 44 65 6E   lofa   Plaza ▫▫ Denv
000780  65 72 20 74 6F 3A C1 02-00 00 00 00 00 00 C1 4A   er to: ⊥⊕         ⊥J
000790  61 6D 61 69 63 61 0A 24-31 31 30 30 20 52 6F 75   amaica ▫ $1100 Rou
0007A0  6E 64 20 54 72 69 70 20-0A 36 20 44 61 79 73 20   nd Trip ▫ 6 Days A
0007B0  63 63 6F 6D 6F 64 61 74-69 6F 6E 73 0A 61 61 72   ccomodations ▫ Car
0007C0  69 62 62 65 61 6E 20 43-6F 75 72 74 0A           ibbean Court ▫
```

Figure 5:
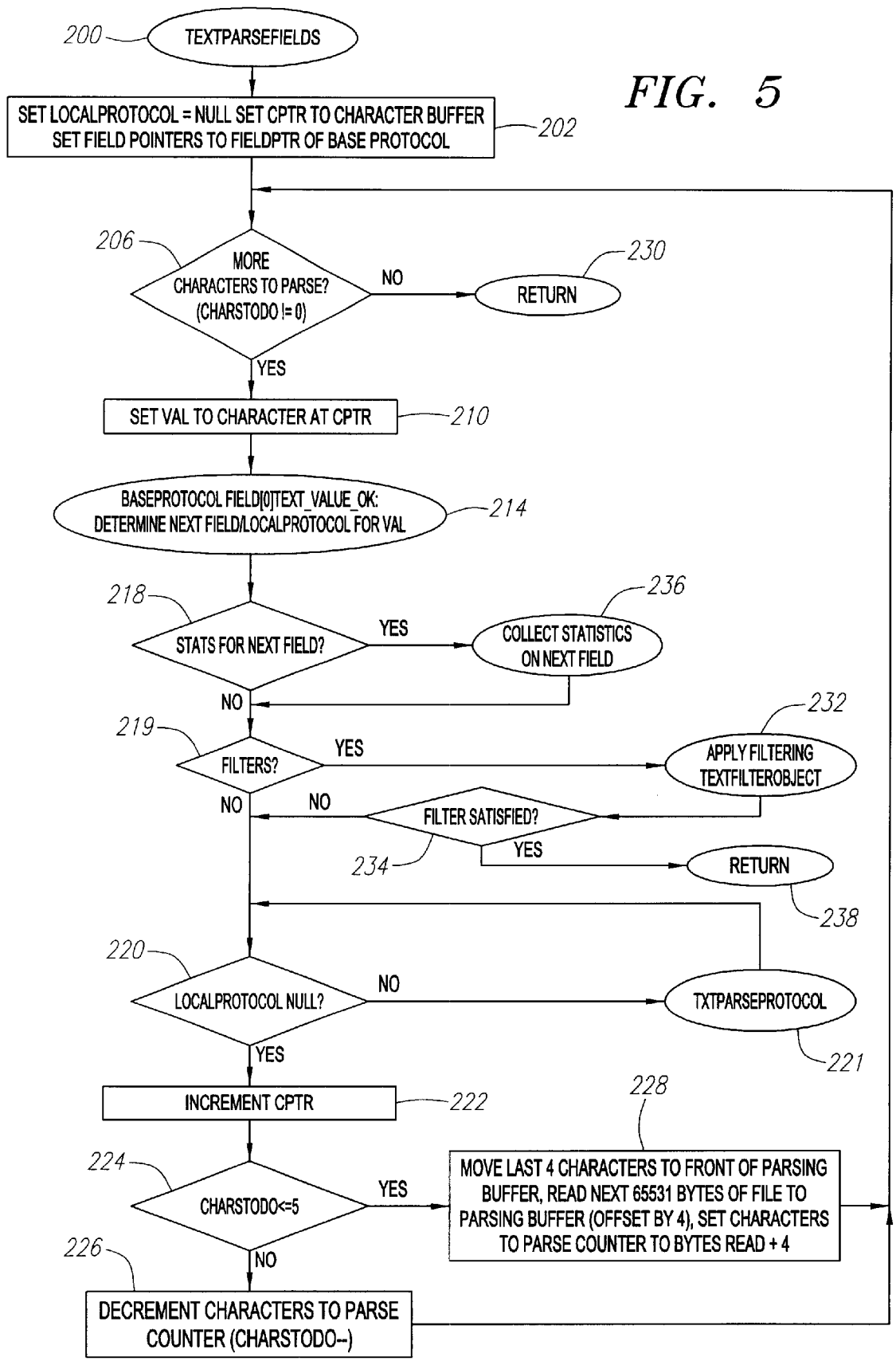
FIG. 5 is a flow chart illustrating an embodiment of a field parsing control logic.
Figure 6:
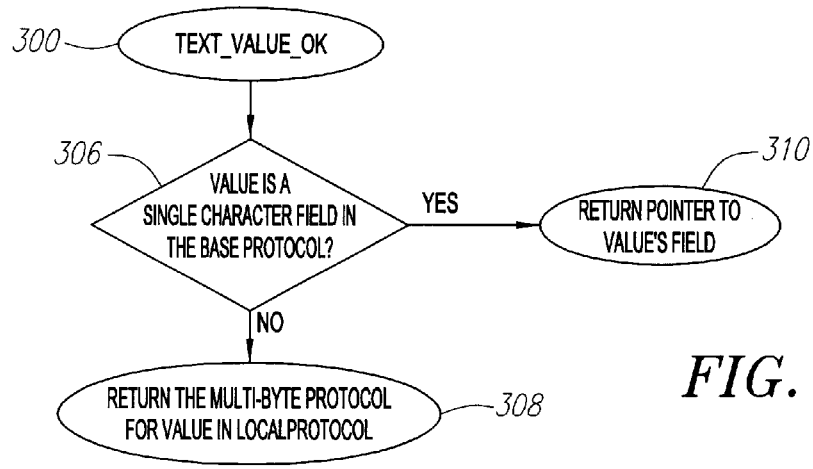
FIG. 6 is a flow chart illustrating an embodiment of the next protocol and next field branch determination control logic.

A flow chart is provided for each of the control logic components in an embodiment of the invention. The flow chart shown in FIG. 4 outlines the ParseText control logic in accordance with an embodiment of the present invention and shows the main program control. The flow chart shown in FIG. 5 is an outline of the TextParseFields control logic in accordance with an embodiment of the present invention and shows how decisions are made and operations performed on extracted field values. The flow chart shown in FIG. 6 is an outline of the text_value_ok control logic of an embodiment of the present invention that shows how branching and next protocol determination decisions are made with extracted field values. The flow chart shown in FIG. 7 outlines the TextFilterObject Match control logic in accordance with an embodiment of the present invention and shows how programmably specified character strings are located in data files. These embodiments of components of the control logic of the present invention are described in detail below.

Although a preferred embodiment is designed to handle a maximum character field width of 32 bits, it will be appreciated by those skilled in the art that the system may be designed to handle any required character field width, and is particularly efficient where the character field width matches the underlying hardware architecture.

Referring to FIG. 4, an embodiment of the invention begins with main program control logic. This logic is entered at step 100. At step 102, the data file to be parsed is opened, and the necessary file-related variables are initialized at step 104. The data file is then parsed at step 106, with control passing to the TextParseFields control logic. When the data file is finished being parsed by the TextParseFields control logic, control is passed back to the ParseText logic.

At step 108, any statistics information that was collected by the TextParseFields control logic is displayed. If the TextParseFields control logic did any filtering of the data file (for example if a search was conducted), then the filtering results are also displayed at step 108. In the final step 110 the data file is closed and all the variables used during the parsing process are cleared. The main program control logic then terminates at step 112 and the method of an embodiment of the invention comes to an end.

Turning to FIG. 5, the TextParseFields control logic is entered at step 200, from step 106 of the main program control logic. At step 202, several variables used in the control logic are initialized. At step 206, the control logic checks to see if there are any more characters in the data file that have not yet been parsed. If the file has been fully parsed, then the TextParseFields control logic returns, at step 230, to the ParseText control logic step 106. If there are more characters to parse, then at step 210, the character value for the next character to be parsed is retrieved from the data file. The character value is passed to the text_value_ok control logic at step 214. The text_value_ok control logic returns the field sub-record of the BaseProtocol that is associated with the character value. If the character value is the first character of a multi-byte control character, then the text_value_ok control logic also returns a pointer to the protocol associated with the multi-byte control character.

The field pointer returned from text_value_ok, at step 214, will be for the BaseProtocol field created in the system initialization processing for statistics gathering for that value. A check is made at step 218 to see if statistics are configured for the field being processed. If statistics are configured, they are then collected at step 236. Once statistics have been collected, or if statistics were not enabled for the current character, then at step 219, the control logic checks to see if any filter channels are enabled for the parsing operation being performed.

If there are one or more filter channels enabled, then control passes to the TextFilterObject control logic at step 232. When the TextFilterObject control logic returns control back to the TextParseFields control logic, at step 234, the return value from the TextFilterObject is checked to see if the filter criteria were all satisfied. If the filter criteria were all satisfied, then processing of the file is complete and, at step 238, the TextParseFields control logic terminates and control is passed back to the main program control logic.

If the filter criteria were not all satisfied or if there were no filter criteria, then at step 220 the protocol pointer returned from text_value_ok is checked to see if the current character is the start of a multi-byte control character. If the current character is part of a multi-byte control character, then at step 221 the multi-byte control character protocol is parsed, using the ParseProtocol and ParseField logic described in FIGS. 12 and 13 of U.S. Pat. No. 5,793,954, which is hereby incorporated herein in its entirety. When the processing of the protocol and its options (if any) is completed, the next protocol in the protocol stack associated with the multi-byte control character is returned. The protocols in the protocol stack are processed until LocalProtocol=NULL is returned by step 221, signifying the end of the protocol stack.

At step 222, once any multi-byte control characters have been processed and the counter of characters remaining has been decremented accordingly, the next character to be parsed is retrieved, skipping over any characters that are part of an already-processed multi-byte control character. At step 224, the logic checks the number of characters left to be parsed. If this number is less than five, then at step 228 the next part of the data file (if more parts exist) is read into the parsing buffer and the counter of characters remaining to be processed is incremented accordingly. Otherwise, at step 226, the counter of remaining characters is lowered by one. In either case, control passes back to step 206 to get the next character to be parsed.

Turning to FIG. 6, the text_value_ok control logic is entered at step 300, from step 214 of FIG. 5. At step 306, the logic determines if the character passed into the control logic is a single character field value, or is instead the start of a multi-byte control character. If the character is a single character, then a pointer to the character's BaseProtocol field sub-record is returned at step 310. If the character is the start of a multi-byte control character, then a pointer to the character's associated multi-byte control character protocol is returned at step 308, in addition to the BaseProtocol field sub-record. Control is then returned to step 214 of FIG. 5.

Referring now to the TextFilterObject control logic shown in FIG. 7, and using the filter expression shown below as an example of data search criteria:

Find "Denver to: Maui" AND "England" in this order, ignore embedded characters

We can divide the expression into two distinct filter criteria:

(0) if there is a string that matches "Denver to: Maui" AND (1) if there is a string that matches "England"

FIG. 19A shows an example of an embodiment of a Filter channel structure for the search expression shown above and refers to the two Filter Criteria Records of FIG. 19B that implement the two filter criteria shown above and refer respectively to FIGS. 19C, and 19D that implement the two criteria as TextFilterObject structures.

Figure 7:
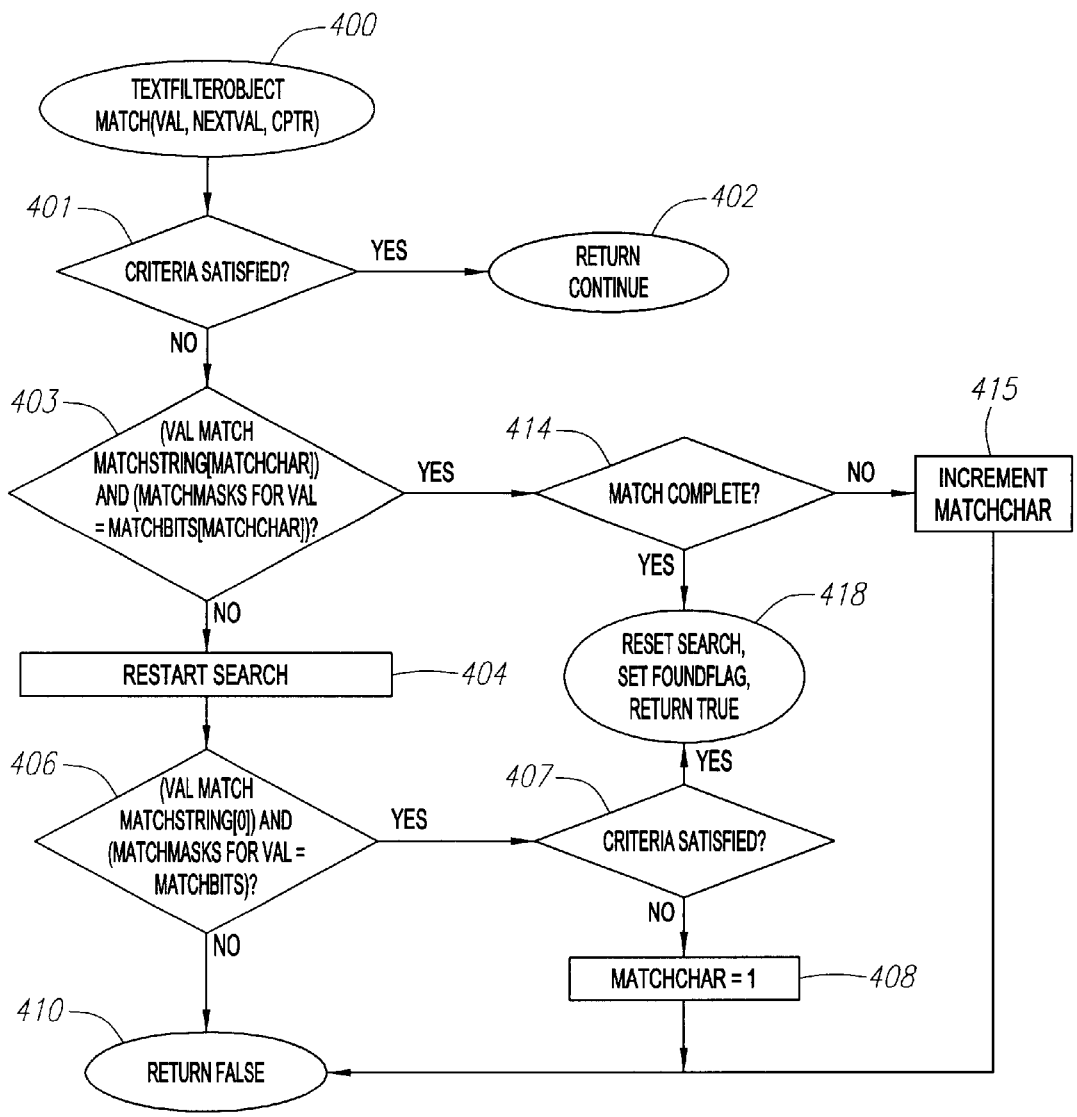
FIG. 7 is a flow chart illustrating an embodiment of the field filtering control logic.

Referring now to FIG. 7, after the TextFilterObject control logic is entered 400, the FoundFlag (FIG. 19C) of the current "NextCriteriaIndex" (FIG. 19A) filter criteria record of an active filter channel (FIG. 19B) is checked at step 401 to see if the criteria have already been satisfied for the filter expression.

Continuing to refer to FIG. 7, at step 401 if the FoundFlag is already set this filter criterion does not need to be evaluated, because prior results have already satisfied the filter criterion. In such a case, a status of CONTINUE is returned at step 402 to the TextParseFields control logic.

If the FoundFlag is not set, at step 403 the current value is compared with the filter criterion's current match character and the MatchMask for the current match character is compared for equality with the match character's MatchBits. If these two comparison conditions are both satisfied, then the current value is a match for the current match character. That is, there is at least a partial match between the filter criterion and the data file characters.

If these conditions are satisfied, a check is made at step 414 to determine if there is a complete match between the filter criterion and the data file characters. If the match is complete, at step 418 the search for this filter criterion is reset, the FoundFlag for the TextFilterObject is set, and the return value is TRUE. The control then passes back to step 232 of FIG. 5. If the match for this filter criterion is not complete, at step 415 the search is continued with the current match character incremented, and at step 410 a value of FALSE is returned.

If the conditions in step 403 are not satisfied, then there is no match between the current value and the current match character, and at step 404 the search is restarted and at step 406 the current value is compared with the filter criterion's first match character and the MatchMask for the first match character is compared with MatchMask for the current value.

If the conditions in step 406 are satisfied, a check is made in step 407 to determine if the filter criterion match is complete. If the match is complete, at step 418 the search for this filter criterion is reset, the FoundFlag for the TextFilterObject is set, and the value TRUE is returned. Control then passes back to step 232 of FIG. 5. If the match for this filter criterion is not complete, at step 408 the MatchChar index is set to one (the second match character of the filter criterion) and at step 410 the value FALSE is returned. Control then passes back to step 232 of FIG. 5.

In an embodiment of the invention, the filtering logic discussed in FIG. 7 returns a found/not found status for a single filter criterion. At step 234 of FIG. 6, the found/not found statuses for all completed filter criteria are combined. All filter criteria contained within a single filter channel (FIG. 19A) are treated as members of a conjunctive filter; thus the found/not found statuses for such filter criteria will be logically AND'ed together to determine the found/not found status of the filter channel itself.

Once all filter channels have been successfully resolved and each filter channel has a single found/not found status, then the filter channels are treated as members of a disjunctive filter. Thus the found/not found statuses of the filter channels will be logically OR'ed together to derive the final result of the data file search.

Referring to the example criteria above, criterion (0) cannot be used to determine the final result of the filter expression above because it is contained in the same filter channel as criterion (1), and therefore must be logically AND'ed with criterion (1). The next criterion index variable (FIG. 19A), being set to a value other than negative one, indicates that the criteria must be satisfied in order. If criterion (1) is satisfied when criterion (0) is not satisfied, then since the AND-ing of criterion (0) with criterion (1) will return FALSE, the FoundFlag of criterion (1) will be set to FALSE, meaning that the search, as a whole, failed.

It should be noted that the embodiment of the invention discussed above will collect statistics on any fields evaluated prior to the completion of the filter channel's TextFilterObject processing, which may not be desirable in some instances. Those skilled in the art will appreciate that other embodiments of the invention may be implemented as sequential parsing loops, so that filtering decisions may be made prior to the application of statistics or other field operations. The specific ordering of filtering, statistics gathering, and other operations on the characters of the data file is a design choice, not critical to the invention.

Those skilled in the art will appreciate that the system of the present invention offers significant advantages over traditional filtering methods by allowing filtering criteria to be specified for any subset of characters in any character set and data editor, by allowing criteria to be applied to each character and its characteristics in the character set, and by providing a simple method for easily specifying multi-byte control characters.

Although it is not shown in FIG. 5, it will be appreciated by those skilled in the art that any active filter channel with criteria that were not applied during parsing of the file may be used as a final filter determination as shown in FIG. 4, at step 108. Thus, the existence of any unapplied criteria means that the entire data file was parsed and the unapplied criteria were not found. Therefore, at step 108, the filter will have failed to find a match. Additionally, the NextCriterialndex of the filter channel structure shown in Table 8 may be used in conjunction with the Index of the TextFilterObject structure of Table 7 if the filter criteria are to be found in a specified order within the file. Turning to FIG. 5, in an embodiment of the invention the point in the TextParseFields control loop at which the TextFilterObject processing is invoked may be varied or made conditional, such that TextFilterObject logic may be applied to embedded multi-byte control character protocols in addition to or in place of the filtering capabilities described in FIG. 15 of U.S. Pat. No. 5,793,954.

High Level Control Flow Example

The following is an example of how the various control logic modules work with each other to accomplish an embodiment of the methods of the invention. Using the exemplary file "Example (2)" shown above and referring back to FIG. 4, at step 102 the system receives the file name, opens the file, obtains its length, reads characters from the file into the character buffer (cbfr), and sets the character buffer index to the first character in cbfr. The length of file Example (2) is 1997 decimal bytes (0x7cd hexadecimal). The number of characters to parse (charstodo) is set to 0x7cd, 0x7cd bytes are read into cbfr.

Referring to FIG. 5, the TextParseFields routine is entered at step 200 with LocalProtocol set to NULL, and cptr (the pointer to the current data character buffer (cbfr) character to evaluate) set to cbfr. The field pointer is set to the field pointer of the BaseProtocol.

The TextParseFields control logic parses the characters in a particular file by using the character values obtained in accordance with information specified in associated protocol descriptions. The TextParseFields control logic is applied for each character in the file that is not processed by the ParseProtocol and ParseField logic described in U.S. Pat. No. 5,793,954 and incorporated in the TextParseFields control logic at step 221 (see FIGS. 12 and 13 of U.S. Pat. No. 5,793,954). Applying the TextParseFields control logic to the exemplary file "Example (2)" shown above, a preferred embodiment of the data analysis system 10 of the present invention applies the TextParseFields control logic with the protocol description for the BaseProtocol shown in FIGS. 10, 10A, 10B, 10C, and 10D, and identifies the protocol descriptions for the multi-byte control characters shown in Tables 14 through 25 when invoking the ParseProtocol and ParseField logic described in U.S. Pat. No. 5,793,954.

After applicable protocols have been parsed, the TextParsePtr is incremented at step 222, a check of the remaining characters in the character buffer is made at step 224, and the next portion of the file being parsed is read to the character buffer at step 228, if necessary. The count of characters left to parse is decremented at step 226, and returning to step 206 a determination of whether all characters have been parsed is made. If every character in the current file has been parsed, processing control is returned at step 230 to the main process ParseText at step 108 in FIG. 4, final cleanup is performed at step 110 and the system finishes execution at step 112.

The statistics entry of the field sub-record (FIG. 10A) may be used to indicate categories of statistics to be maintained for each character or character type. Details about mechanics for statistics collection are not critical to the invention. Those skilled in the art will appreciate that the addition of various classes of statistics such as field counters, summing of field contents, and arrays of counters/sums based on field contents may be used in accordance with an embodiment of the present invention.

Those skilled in the art will appreciate that embodiments of the system of the present invention may be augmented to support virtually any field-based operations, through modifications of the TextParseFields control logic loop (FIG. 5, steps 206–226). For example, converting one data editor control character set into another data editor control character set may be accomplished by defining the desired data editor control conversion as a series of replacement values associated with each single- or multi-byte control character of the source data editor control character set.

Referring now to FIG. 4, an embodiment of the ParseText control logic of the present invention, data files are viewed as being composed of one or more protocol headers, including at least the BaseProtocol for the character set definition, which are in turn composed of one or more predefined contiguous bit fields. The ParseText control logic invokes the TextParseFields logic, in step 106, that systematically parses through each file until all characters in the file have been examined, or a programmably configured filter channel criteria set has been satisfied. Once the system has received a file, defined by a file name and a file length, the file is resolved into its protocol and field components. The filtering and statistical results may be examined at the completion of TextParseFields processing, at step 108.

Step-by-Step Parsing and Filtering Example

The following is a detailed step-by-step example of how a data file is parsed and filtered using the methods of an embodiment of the invention. Using the exemplary file Example (2) described above, an embodiment of the system obtains a file name from the input or storage device at the initial step 100 in FIG. 4. The file name is used to open the file, obtain the file length, set variable HwLen to the file length times the number of bits per byte (eight), read a maximum of 65535 bytes from the file to a character buffer, set the TextPtr to zero (the starting index of the character buffer), and set the charstodo counter to the number of characters read into the character buffer. The file length of example (2) is 15976 bits.

The ParseText logic, at step 104, sets TextLen to HwLen, and sets the TextParsePtr and the characteristics pointers to the TextPtr. The BaseProtocol is used to call the protocol's TextParseFields control logic, at step 106. Each field of the BaseProtocol is shown in FIG. 10A.

Returning to FIG. 5, at step 202 TextParseFields initializes LocalProtocol to zero, cptr to the start of the character buffer, and the local field record pointers to the field record of BaseProtocol. At step 210 the first character examined, at byte offset 0 (cbfr[0]) in the exemplary file Example (2), is hexadecimal value 0xff. The text_value_ok logic is called at step 214 to identify the next field or next protocol associated with this value in the BaseProtocol's field[0] lookup_array record (FIGS. 10B and 10D.)

Returning now to FIG. 6, in step 306 the text_value_ok logic finds the lookup_array entry for index value 0xff (see FIG. 10*d*), and at step 308 returns the pointer to the StandardPrefix multi-byte control protocol description in variable LocalProtocol, and the field pointer for value 0xff.

Returning again to FIG. 5, a determination is made at step 218 as to whether to collect statistics for the next field. Assuming a yes from step 218, statistics as shown in Table 10A for field[19] statistics column are collected at step 236 for the field found for the value (here, field[19] in FIG. 10A), and at step 219 filtering may be skipped because the ignore-embedded-control option was configured when the filter criteria were initially defined. LocalProtocol is checked for a NULL value at step 220. The non-NULL value in LocalProtocol is used at step 221 to call the ParseProtocol (and ParseFields) control logic, which is described in detail in U.S. Pat. No. 5,793,954 (see FIGS. 12 and 13 of that patent). When the processing of the protocol initiated by the LocalProtocol is completed (i.e., the NextProtocol pointer returned at either step 152 or step 164 in FIG. 12 of the U.S. Pat. No. 5,793,954 is NULL), the TextParsePtr is incremented at step 222 to point at the character buffer offset 0x2f0 in Example (2), which is the next character after the now-parsed standard prefix multi-byte control. The count of characters remaining to parse (charstodo) is decremented by 0x2ef, from 0x7cd to 0x4de, to reflect the length of the protocol(s) parsed minus one. Lastly, cptr is set to 0x2ft. The loop control checks at step 224, and charstodo decrement at step 226, are performed, and control loops back to step 206, where a determination is made as to whether there are more characters to parse.

The next character in the exemplary file Example (2), at offset 0x2f0 in cbfr, has the value 0xd0, as determined in step 210. The text_value_ok logic is called at step 214 to identify the next field and next protocol associated with this value in the BaseProtocol's field[0] lookup_array record (see FIGS. 10B and 10D.) Returning to FIG. 6, the text_valueok logic makes a determination at step 306, finds the lookup_array entry for index value 0xd0 (See FIG. 10D), and at step 308 returns the pointer to the Page_Format multi-byte control protocol description in LocalProtocol. Returning now to FIG. 5, statistics are collected (field[14] in FIG. 10*a*), filtering is skipped, and the non-NULL value in LocalProtocol is processed as described above. The cptr is set to 0x2fa and charstodo is decremented to 0x4d4.

The next character in the exemplary file Example (2), at offset 0x2fa in cbfr, has the value 0xd3 as determined at step 210. The text_value_ok logic is called, at step 214, to identify the next field and next protocol associated with this value in the BaseProtocol's field[0] lookup_array record as shown in FIGS. 10B and 10D.

Returning now to FIG. 6, the text_value_ok logic makes a determination at step 306, finds the lookup_array entry for index value 0xd3 (see FIG. 10D), and at step 308 returns the pointer to the Set_Underline_Mode multi-byte control protocol description in LocalProtocol. Returning to FIG. 5, statistics are collected (field[16] in FIG. 10A), filtering is skipped, and the non-NULL value in LocalProtocol is processed as described above. The cptr is set to 0x304 and charstodo is decremented to 0x4ca.

The next character in the exemplary file Example (2) at offset 0x304 in cbfr has the value 0x0a, as determined at step 210. The text_value_ok logic is called at step 214 to identify the next field or next protocol associated with this value in the BaseProtocol's field[0] lookup_array record as shown in FIGS. 10B and 10D.

Returning to FIG. 6, the text_value_ok logic makes a determination at step 306, finds the lookup_array entry for index value 0x0a (see FIG. 10B), and at step 310 sets LocalProtocol to NULL and returns the pointer to BaseProtocol field sub-record two (field[2]), the field for single-byte control character statistics.

Returning to FIG. 5, statistics are collected and filtering checked. The check for enabled filters at step 219 finds the Filter channel (see FIG. 19), and the first criterion (see FIG. 19C) in the criteria chain (see FIG. 19B) is applied at step 232.

Referring now to FIG. 7, processing is entered at step 400 with the current val, representing the current character being parsed, set to 0x0a, and the next val set to the next character in the exemplary file Example (2) (the character at cbfr offset 0x305, which is 0xd2). The check for the criterion (0) (see FIG. 19C) FoundFlag status determination at step 401 finds the flag set to FALSE. The comparison at step 403 of the value 0x0a with the first byte (since MatchChar is 0) of the criterion (0) string evaluates to FALSE, so the search is restarted at step 404, and the comparison check at step 406 for a match with the current val also fails. The return value at step 410 is FALSE.

Referring again to FIG. 5, at step 234 the return value is checked to see if the filter is satisfied, and a determination of whether the LocalProtocol is equal to NULL is made at step 220. LocalProtocol is found to equal NULL, so cptr is incremented at step 222 to cbfr offset 0x305, and charstodo is decremented in step 226 to 0x4c9.

The next character in the exemplary file Example (2), at offset 0x305 in cbfr, has the value 0xd2, as determined at step 210. The text_value_ok logic is called at step 214 to identify the next field or next protocol associated with this value in the BaseProtocol's field[0] lookup_array record (see FIGS. 10B and 10D.)

Returning to FIG. 6, the text_value_ok logic makes a determination at step 306, finds the lookup_array entry for index value 0xd2 (see FIG. 10D), and at step 308 returns the pointer to the Define_Tables multi-byte control protocol description in LocalProtocol (see FIG. 10A, Field[15]). Returning to FIG. 5, statistics are collected, filtering is skipped, and the non-NULL value in LocalProtocol is processed as described above. The cptr is advanced to 0x35d and charstodo is decremented to 0x480.

The next character of the exemplary file Example (2) at offset 0x35d in cbfr, has the value 0xdc, as determined at step 210. The text_value_ok logic is called at step 214 to identify the next field or next protocol associated with this value in the BaseProtocol's field[0] lookup_array record (see FIGS. 10B and 10D).

Returning now to FIG. 6, the text_value_ok logic makes a determination at step 306, finds the lookup_array entry for index value 0xdc (see FIG. 10D), and, at step 308 returns the pointer to the Table_End_of_Line_Codes multi-byte control protocol description in LocalProtocol. Returning to FIG. 5, statistics are collected (see FIG. 10A, field[18]), filtering is skipped, and the non-NULL value in Localprotocol is processed as described above. The cptr is advanced to 0x37b and charstodo decremented to 0x462.

The next character in the exemplary file Example (2), at offset 0x37b in cbfr, has the value 0d0, as determined at step 210. The text_value_ok logic is called at step 214 to identify the next field or next protocol associated with this value in the BaseProtocol's field[0] lookup_array record (see in FIGS. 10B and 10D.)

Returning to FIG. 6, the text_value_ok logic makes a determination at step 306, finds the lookup_array entry for index value 0xd0 (see FIG. 10D), and at step 308 returns the pointer to the Page_Format multi-byte control protocol description in LocalProtocol. Returning to FIG. 5, statistics are collected (see FIG. 10A, field[14]), filtering is skipped, and the non-NULL value in LocalProtocol is processed as described above. The cptr is advanced to 0x388 and charstodo decremented to 0x43f. The remainder of the file is parsed in the same way.

Table 28 below summarizes the complete parsing of the exemplary file Example (2).

TABLE 28

| offset in file (cptr) | character in val (hex) | dec/ascii | lookup | multi-byte protocol | charstodo (hex) | statistics field | filter result |
|---|---|---|---|---|---|---|---|
| 0 | ff | | FIG. 10d | Standard_Prefix | 7cd | field[19] | |
| 2f0 | d0 | | FIG. 10d | Page_Format | 4dd | field[14] | |
| 2fa | d3 | | FIG. 10d | Set_Underline_Mode | 4d3 | field[16] | |
| 304 | 0a | 10/ | FIG. 10b | [None] | 4c9 | field[3] | FALSE |
| 305 | d2 | | FIG. 10d | Define_Tables | 4c8 | field[15] | |
| 35d | dc | | FIG. 10d | Table_End_of_Line_Codes | 470 | field[18] | |
| 37b | dc | | FIG. 10d | Table_End_of_Line_Codes | 452 | field[18] | |
| 38e | d0 | | FIG. 10d | Page_Format | 43f | field[14] | |
| 39a | 0a | 10/ | FIG. 10b | [None] | 433 | field[3] | FALSE |
| 39b | d0 | | FIG. 10d | Page_Format | 432 | field[14] | |
| 3a7 | d0 | | FIG. 10d | Page_Format | 426 | field[14] | |
| 3b1 | c3 | | FIG. 10d | Attribute_ON | 41c | field[12] | |
| 3b4 | 43 | 67/C | FIG. 9b | [None] | 419 | field[9] | FALSE |
| 3b5 | 6f | 111/o | FIG. 9b | [None] | 418 | field[9] | FALSE |
| 3b6 | 75 | 117/u | FIG. 9b | [None] | 417 | field[9] | FALSE |
| 3b7 | 6e | 110/n | FIG. 9b | [None] | 416 | field[9] | FALSE |
| 3b8 | 74 | 116/t | FIG. 9b | [None] | 415 | field[9] | FALSE |
| 3b9 | 72 | 114/r | FIG. 9b | [None] | 414 | field[9] | FALSE |
| 3ba | 79 | 121/y | FIG. 9b | [None] | 413 | field[9] | FALSE |
| 3bb | dc | | FIG. 10d | Table_End_of_Line_Codes | 412 | field[18] | |
| 3ce | d0 | | FIG. 10d | Page_Format | 3ff | field[14] | |
| 3da | 0a | | FIG. 10b | [None] | 3f3 | field[3] | FALSE |
| 3db | d0 | | FIG. 10d | Page_Format | 3f2 | field[14] | |
| 3e7 | d0 | | FIG. 10d | Page_Format | 3e6 | field[14] | |
| 3f1 | 47 | 71/G | FIG. 9b | [None] | 3dc | field[9] | FALSE |
| 3f2 | 72 | 114/r | FIG. 9b | [None] | 3db | field[9] | FALSE |
| 3f3 | 6f | 111/o | FIG. 9b | [None] | 3da | field[9] | FALSE |
| 3f4 | 73 | 115/s | FIG. 9b | [None] | 3d9 | field[9] | FALSE |
| 3f5 | 73 | 115/s | FIG. 9b | [None] | 3d8 | field[9] | FALSE |
| 3f6 | 20 | 32/space | FIG. 9b | [None] | 3d7 | field[6] | FALSE |
| 3f7 | 53 | 83/S | FIG. 9b | [None] | 3d6 | field[9] | FALSE |
| 3f8 | 61 | 97/a | FIG. 9b | [None] | 3d5 | field[9] | FALSE |
| 3f9 | 6c | 108/l | FIG. 9b | [None] | 3d4 | field[9] | FALSE |
| 3fa | 65 | 101/e | FIG. 9b | [None] | 3d3 | field[9] | FALSE |
| 3fb | 73 | 115/s | FIG. 9b | [None] | 3d2 | field[9] | FALSE |
| 3fc | dc | | FIG. 10d | Table_End_of_Line_Codes | 3d1 | field[18] | |
| 40f | d0 | | FIG. 10d | Page_Format | 3be | field[14] | |
| 41b | 0a | | FIG. 10b | [None] | 3b2 | field[3] | FALSE |
| 41c | d0 | | FIG. 10d | Page_Format | 3b1 | field[14] | |
| 428 | d0 | | FIG. 10d | Page_Format | 3a5 | field[14] | |
| 432 | 55 | 85/U | FIG. 9b | [None] | 39b | field[9] | FALSE |
| 433 | 6e | 110/n | FIG. 9b | [None] | 39a | field[9] | FALSE |
| 434 | 69 | 105/i | FIG. 9b | [None] | 399 | field[9] | FALSE |
| 435 | 74 | 116/t | FIG. 9b | [None] | 398 | field[9] | FALSE |
| 436 | 73 | 115/s | FIG. 9b | [None] | 397 | field[9] | FALSE |
| 437 | 20 | 32/space | FIG. 9b | [None] | 396 | field[6] | FALSE |
| 438 | 53 | 83/S | FIG. 9b | [None] | 395 | field[9] | FALSE |
| 439 | 6f | 111/o | FIG. 9b | [None] | 394 | field[9] | FALSE |
| 43a | 6c | 108/l | FIG. 9b | [None] | 393 | field[9] | FALSE |
| 43b | 64 | 100/d | FIG. 9b | [None] | 392 | field[9] | FALSE |
| 43c | c4 | | FIG. 10d | Attribute_OFF | 391 | field[13] | |
| 43f | dc | | FIG. 10d | Table_End_of_Line_Codes | 38e | field[18] | |
| 45d | dc | | FIG. 10d | Table_End_of_Line_Codes | 370 | field[18] | |
| 470 | d0 | | FIG. 10d | Page_Format | 35d | field[14] | |
| 47c | 0a | | FIG. 10b | [None] | 351 | field[3] | FALSE |
| 47d | d0 | | FIG. 10d | Page_Format | 350 | field[14] | |
| 489 | 45 | 69/E | FIG. 9b | [None] | 344 | field[9] | FALSE |
| 48a | 6e | 110/n | FIG. 9b | [None] | 343 | field[9] | FALSE |
| 48b | 67 | 103/g | FIG. 9b | [None] | 342 | field[9] | FALSE |
| 48c | 6c | 108/l | FIG. 9b | [None] | 341 | field[9] | FALSE |
| 48d | 61 | 97/a | FIG. 9b | [None] | 340 | field[9] | FALSE |
| 48e | 6e | 110/n | FIG. 9b | [None] | 33f | field[9] | FALSE |
| 48f | 64 | 100/d | FIG. 9b | [None] | 33e | field[9] | FALSE |
| 490 | dc | | FIG. 10d | Table_End_of_Line_Codes | 33d | field[18] | |
| 4a3 | d0 | | FIG. 10d | Page_Format | 32a | field[14] | |
| 4af | 0a | | FIG. 10b | [None] | 31e | field[3] | FALSE |

TABLE 28-continued

| offset in file (cptr) | character in val (hex) | dec/ascii | lookup | multi-byte protocol | charstodo (hex) | statistics field | filter result |
|---|---|---|---|---|---|---|---|
| 4b0 | d0 | | FIG. 10d | Page_Format | 31d | field[14] | |
| 4bc | d0 | | FIG. 10d | Page_Format | 311 | field[14] | |
| 4c6 | 24 | 36/$ | FIG. 9b | [None] | 307 | field[8] | FALSE |
| 4c7 | 31 | 49/1 | FIG. 9b | [None] | 306 | field[8] | FALSE |
| 4c8 | 2c | 44/, | FIG. 9b | [None] | 305 | field[8] | FALSE |
| 4c9 | 32 | 50/2 | FIG. 9b | [None] | 304 | field[9] | FALSE |
| 4ca | 35 | 53/5 | FIG. 9b | [None] | 303 | field[9] | FALSE |
| 4cb | 30 | 48/0 | FIG. 9b | [None] | 302 | field[9] | FALSE |
| 4cc | 2c | 44/, | FIG. 9b | [None] | 301 | field[8] | FALSE |
| 4cd | 30 | 48/0 | FIG. 9b | [None] | 300 | field[9] | FALSE |
| 4ce | 30 | 48/0 | FIG. 9b | [None] | 2ff | field[9] | FALSE |
| 4cf | 30 | 48/0 | FIG. 9b | [None] | 2fe | field[9] | FALSE |
| 4d0 | 2e | 46/. | FIG. 9b | [None] | 2fd | field[8] | FALSE |
| 4d1 | 30 | 48/0 | FIG. 9b | [None] | 2fc | field[9] | FALSE |
| 4d2 | 30 | 48/0 | FIG. 9b | [None] | 2fb | field[9] | FALSE |
| 4d3 | dc | | FIG. 10d | Table_End_of_Line_Codes | 2fa | field[18] | |
| 4e6 | d0 | | FIG. 10d | Page_Format | 2e7 | field[14] | |
| 4f2 | 0a | | FIG. 10b | [None] | 2db | field[3] | FALSE |
| 4f3 | d0 | | FIG. 10d | Page_Format | 2da | field[14] | |
| 4ff | d0 | | FIG. 10d | Page_Format | 2ce | field[14] | |
| 509 | 31 | 49/1 | FIG. 9b | [None] | 2c4 | field[9] | FALSE |
| 50a | 30 | 48/0 | FIG. 9b | [None] | 2c3 | field[9] | FALSE |
| 50b | 2c | 44/, | FIG. 9b | [None] | 2c2 | field[8] | FALSE |
| 50c | 30 | 48/0 | FIG. 9b | [None] | 2c1 | field[9] | FALSE |
| 5d0 | 30 | 48/0 | FIG. 9b | [None] | 2c0 | field[9] | FALSE |
| 5e0 | 30 | 48/0 | FIG. 9b | [None] | 2bf | field[9] | FALSE |
| 50f | dc | | FIG. 10d | Table_End_of_Line_Codes | 2be | field[18] | |
| 52d | dc | | FIG. 10d | Table_End_of_Line_Codes | 2a0 | field[18] | |
| 540 | d0 | | FIG. 10d | Page_Format | 28d | field[14] | |
| 54c | 0a | | FIG. 10b | [None] | 281 | field[3] | FALSE |
| 54d | d0 | | FIG. 10d | Page_Format | 280 | field[14] | |
| 559 | 49 | 73/l | FIG. 9b | [None] | 274 | field[9] | FALSE |
| 55a | 63 | 99/c | FIG. 9b | [None] | 273 | field[9] | FALSE |
| 55b | 65 | 101/e | FIG. 9b | [None] | 272 | field[9] | FALSE |
| 55c | 6c | 108/l | FIG. 9b | [None] | 271 | field[9] | FALSE |
| 55d | 61 | 97/a | FIG. 9b | [None] | 270 | field[9] | FALSE |
| 55e | 6e | 110/n | FIG. 9b | [None] | 26f | field[9] | FALSE |
| 55f | 64 | 100/d | FIG. 9b | [None] | 26e | field[9] | FALSE |
| 560 | dc | | FIG. 10d | Table_End_of_Line_Codes | 26d | field[18] | |
| 573 | d0 | | FIG. 10d | Page_Format | 25a | field[14] | |
| 57f | 0a | | FIG. 10b | [None] | 24e | field[3] | FALSE |
| 580 | d0 | | FIG. 10d | Page_Format | 24d | field[14] | |
| 58c | d0 | | FIG. 10d | Page_Format | 241 | field[14] | |
| 596 | 24 | 36/$ | FIG. 9b | [None] | 237 | field[8] | FALSE |
| 597 | 34 | 52/4 | FIG. 9b | [None] | 236 | field[9] | FALSE |
| 598 | 39 | 57/9 | FIG. 9b | [None] | 235 | field[9] | FALSE |
| 599 | 30 | 48/0 | FIG. 9b | [None] | 234 | field[9] | FALSE |
| 59a | 2c | 44/, | FIG. 9b | [None] | 233 | field[8] | FALSE |
| 59b | 30 | 48/0 | FIG. 9b | [None] | 232 | field[9] | FALSE |
| 59c | 30 | 48/0 | FIG. 9b | [None] | 231 | field[9] | FALSE |
| 59d | 30 | 48/0 | FIG. 9b | [None] | 230 | field[9] | FALSE |
| 59e | 2e | 46/. | FIG. 9b | [None] | 22f | field[8] | FALSE |
| 59f | 30 | 48/0 | FIG. 9b | [None] | 22e | field[9] | FALSE |
| 5a0 | 30 | 48/0 | FIG. 9b | [None] | 22d | field[9] | FALSE |
| 5a1 | dc | | FIG. 10d | Table_End_of_Line_Codes | 22c | field[18] | |
| 5b4 | d0 | | FIG. 10d | Page_Format | 219 | field[14] | |
| 5c0 | 0a | | FIG. 10b | [None] | 20d | field[3] | FALSE |
| 5c1 | d0 | | FIG. 10d | Page_Format | 20c | field[14] | |
| 5cd | d0 | | FIG. 10d | Page_Format | 200 | field[14] | |
| 5d7 | 37 | 55/7 | FIG. 9b | [None] | 1f6 | field[9] | FALSE |
| 5d8 | 2c | 44/, | FIG. 9b | [None] | 1f5 | field[8] | FALSE |
| 5d9 | 30 | 48/0 | FIG. 9b | [None] | 1f4 | field[9] | FALSE |
| 5da | 30 | 48/0 | FIG. 9b | [None] | 1f3 | field[9] | FALSE |
| 5db | 30 | 48/0 | FIG. 9b | [None] | 1f2 | field[9] | FALSE |
| 5dc | dc | | FIG. 10d | Table_End_of_Line_Codes | 1f1 | field[18] | |
| 5fa | dc | | FIG. 10d | Table_End_of_Line_Codes | 1d3 | field[18] | |
| 60d | d0 | | FIG. 10d | Page_Format | 1c0 | field[14] | |
| 619 | 0a | | FIG. 10b | [None] | 1b4 | field[3] | FALSE |
| 61a | d0 | | FIG. 10d | Page_Format | 1b3 | field[14] | |
| 626 | 4e | 78/N | FIG. 9b | [None] | 1a7 | field[9] | FALSE |
| 627 | 6f | 111/o | FIG. 9b | [None] | 1a6 | field[9] | FALSE |
| 628 | 72 | 114/r | FIG. 9b | [None] | 1a5 | field(9) | FALSE |
| 629 | 77 | 119/w | FIG. 9b | [None] | 1a4 | field[9] | FALSE |
| 62a | 61 | 97/a | FIG. 9b | [None] | 1a3 | field[9] | FALSE |
| 62b | 79 | 121/y | FIG. 9b | [None] | 1a2 | field[9] | FALSE |
| 62c | dc | | FIG. 10d | Table_End_of_Line_Codes | 1a1 | field[18] | |

TABLE 28-continued

| offset in file (cptr) | character in val (hex) | dec/ascii | lookup | multi-byte protocol | charstodo (hex) | statistics field | filter result |
|---|---|---|---|---|---|---|---|
| 63f | d0 | | FIG. 10d | Page_Format | 18e | field[14] | |
| 64b | 0a | | FIG. 10b | [None] | 182 | field[3] | FALSE |
| 64c | d0 | | FIG. 10d | Page_Format | 181 | field[14] | |
| 658 | d0 | | FIG. 10d | Page_Format | 175 | field[14] | |
| 662 | 24 | 36/$ | FIG. 9b | [None] | 16b | field[9] | FALSE |
| 663 | 31 | 49/1 | FIG. 9b | [None] | 16a | field[9] | FALSE |
| 664 | 2c | 44/, | FIG. 9b | [None] | 169 | field[8] | FALSE |
| 665 | 32 | 50/2 | FIG. 9b | [None] | 168 | field[9] | FALSE |
| 666 | 31 | 49/1 | FIG. 9b | [None] | 167 | field[9] | FALSE |
| 667 | 35 | 53/5 | FIG. 9b | [None] | 166 | field[9] | FALSE |
| 668 | 2c | 44/, | FIG. 9b | [None] | 165 | field[8] | FALSE |
| 669 | 30 | 48/0 | FIG. 9b | [None] | 164 | field[9] | FALSE |
| 66a | 30 | 48/0 | FIG. 9b | [None] | 163 | field[9] | FALSE |
| 66b | 30 | 48/0 | FIG. 9b | [None] | 162 | field[9] | FALSE |
| 66c | 2e | 46/. | FIG. 9b | [None] | 161 | field[8] | FALSE |
| 66d | 30 | 48/0 | FIG. 9b | [None] | 160 | field[9] | FALSE |
| 66e | 30 | 48/0 | FIG. 9b | [None] | 15f | field[9] | FALSE |
| 66f | dc | | FIG. 10d | Table_End_of_Line_Codes | 15e | field[18] | FALSE |
| 682 | d0 | | FIG. 10d | Page_Format | 14b | field[14] | |
| 68e | 0a | | FIG. 10b | [None] | 13f | field[3] | |
| 68f | d0 | | FIG. 10d | Page_Format | 13e | field[14] | |
| 69b | d0 | | FIG. 10d | Page_Format | 132 | field[14] | |
| 6a5 | 39 | 57/9 | FIG. 9b | [None] | 128 | field[9] | FALSE |
| 6a6 | 2c | 44/, | FIG. 9b | [None] | 127 | field[8] | FALSE |
| 6a7 | 30 | 48/0 | FIG. 9b | [None] | 126 | field[9] | FALSE |
| 6e8 | 30 | 48/0 | FIG. 9b | [None] | 125 | field[9] | FALSE |
| 6a9 | 30 | 48/0 | FIG. 9b | [None] | 124 | field[9] | FALSE |
| 6aa | dc | | FIG. 10d | Table_End_of_Line_Codes | 123 | field[18] | |
| 6bf | d9 | | FIG. 10d | Leading Adjustment | 10e | field[17] | |
| 6cf | 0a | | FIG. 10b | [None] | fe | field[3] | FALSE |
| 6d0 | d9 | | FIG. 10d | Leading Adjustment | fd | field[17] | |
| 6e0 | 0a | | FIG. 10b | [None] | ed | field[3] | FALSE |
| 6e1 | 44 | 68/D | FIG. 9b | [None] | ec | field[9] | FALSE |
| 6e2 | 65 | 101/e | FIG. 9b | [None] | eb | field[9] | FALSE |
| 6e3 | 6e | 110/n | FIG. 9b | [None] | ea | field[9] | FALSE |
| 6e4 | 76 | 118/v | FIG. 9b | [None] | e9 | field[9] | FALSE |
| 6e5 | 65 | 101/e | FIG. 9b | [None] | e8 | field[9] | FALSE |
| 6e6 | 72 | 114/r | FIG. 9b | [None] | e7 | field[9] | FALSE |
| 6e7 | 20 | 32/space | FIG. 9b | [None] | e6 | field[6] | FALSE |
| 6e8 | 74 | 116/t | FIG. 9b | [None] | e5 | field[9] | FALSE |
| 6e9 | 6f | 111/o | FIG. 9b | [None] | e4 | field[9] | FALSE |
| 6ea | 3a | 58/: | FIG. 9b | [None] | e3 | field[8] | FALSE |
| 6eb | c1 | | FIG. 10d | Center_Align_Tab_Left_M | e2 | field[11] | FALSE |
| 6f4 | 4d | 77/M | FIG. 9b | [None] | d9 | field[9] | FALSE |
| 6f5 | 61 | 97/a | FIG. 9b | [None] | d8 | field[9] | FALSE |
| 6f6 | 7a | 122/z | FIG. 9b | [None] | d7 | field[9] | FALSE |
| 6f7 | 61 | 97/a | FIG. 9b | [None] | d6 | field[9] | FALSE |
| 6f8 | 74 | 116/t | FIG. 9b | [None] | d5 | field[9] | FALSE |
| 6f9 | 6c | 108/l | FIG. 9b | [None] | d4 | field[9] | FALSE |
| 6fa | 61 | 97/a | FIG. 9b | [None] | d3 | field[9] | FALSE |
| 6fb | 6e | 110/n | FIG. 9b | [None] | d2 | field[9] | FALSE |
| 6fc | 0a | | FIG. 10b | [None] | d1 | field[3] | FALSE |
| 6fd | 24 | 36/$ | FIG. 9b | [None] | d0 | field[8] | FALSE |
| 6fe | 37 | 55/7 | FIG. 9b | [None] | cf | field[9] | FALSE |
| 6ff | 35 | 53/5 | FIG. 9b | [None] | ce | field[9] | FALSE |
| 700 | 30 | 48/0 | FIG. 9b | [None] | cd | field[9] | FALSE |
| 701 | 20 | 32/space | FIG. 9b | [None] | cc | field[6] | FALSE |
| 702 | 52 | 82/R | FIG. 9b | [None] | cb | field[9] | FALSE |
| 703 | 6f | 111/o | FIG. 9b | [None] | ca | field[9] | FALSE |
| 704 | 75 | 117/u | FIG. 9b | [None] | c9 | field[9] | FALSE |
| 705 | 6e | 110/n | FIG. 9b | [None] | c8 | field[9] | FALSE |
| 706 | 64 | 100/d | FIG. 9b | [None] | c7 | field[9] | FALSE |
| 707 | 20 | 32/space | FIG. 9b | [None] | c6 | field[6] | FALSE |
| 708 | 54 | 84/T | FIG. 9b | [None] | c5 | field[9] | FALSE |
| 709 | 72 | 114/r | FIG. 9b | [None] | c4 | field[9] | FALSE |
| 70a | 69 | 105/i | FIG. 9b | [None] | c3 | field[9] | FALSE |
| 70b | 70 | 112/p | FIG. 9b | [None] | c2 | field[9] | FALSE |
| 70c | 0a | | FIG. 10b | [None] | c1 | field[3] | FALSE |
| 70d | 37 | 55/7 | FIG. 9b | [None] | c0 | field[9] | FALSE |
| 70e | 20 | 32/space | FIG. 9b | [None] | bf | field[6] | FALSE |
| 70f | 44 | 68/D | FIG. 9b | [None] | be | field[9] | FALSE |
| 710 | 61 | 97/a | FIG. 9b | [None] | bd | field[9] | FALSE |
| 711 | 79 | 121/y | FIG. 9b | [None] | bc | field[9] | FALSE |
| 712 | 73 | 115/s | FIG. 9b | [None] | bb | field[9] | FALSE |
| 713 | 20 | 32/space | FIG. 9b | [None] | ba | field[6] | FALSE |
| 714 | 41 | 65/A | FIG. 9b | [None] | b9 | field[9] | FALSE |

TABLE 28-continued

| offset in file (cptr) | character in val (hex) | dec/ascii | lookup | multi-byte protocol | charstodo (hex) | statistics field | filter result |
|---|---|---|---|---|---|---|---|
| 715 | 63 | 99/c | FIG. 9b | [None] | b8 | field[9] | FALSE |
| 716 | 63 | 99/c | FIG. 9b | [None] | b7 | field[9] | FALSE |
| 717 | 6f | 111/o | FIG. 9b | [None] | b6 | field[9] | FALSE |
| 718 | 6d | 109/m | FIG. 9b | [None] | b5 | field[9] | FALSE |
| 719 | 6f | 111/o | FIG. 9b | [None] | b4 | field[9] | FALSE |
| 71a | 64 | 100/d | FIG. 9b | [None] | b3 | field[9] | FALSE |
| 71b | 61 | 97/a | FIG. 9b | [None] | b2 | field[9] | FALSE |
| 71c | 74 | 116/t | FIG. 9b | [None] | b1 | field[9] | FALSE |
| 71d | 69 | 105/i | FIG. 9b | [None] | b0 | field[9] | FALSE |
| 71e | 6f | 111/o | FIG. 9b | [None] | af | field[9] | FALSE |
| 71f | 6e | 110/n | FIG. 9b | [None] | ae | field[9] | FALSE |
| 720 | 73 | 115/s | FIG. 9b | [None] | ad | field[9] | FALSE |
| 721 | 0a | | FIG. 10b | [None] | ac | field[3] | FALSE |
| 722 | 53 | 83/S | FIG. 9b | [None] | ab | field[9] | FALSE |
| 723 | 75 | 117/u | FIG. 9b | [None] | aa | field[9] | FALSE |
| 724 | 72 | 114/r | FIG. 9b | [None] | a9 | field[9] | FALSE |
| 725 | 66 | 102/f | FIG. 9b | [None] | a8 | field[9] | FALSE |
| 726 | 73 | 115/s | FIG. 9b | [None] | a7 | field[9] | FALSE |
| 727 | 69 | 105/i | FIG. 9b | [None] | a6 | field[9] | FALSE |
| 728 | 64 | 100/d | FIG. 9b | [None] | a5 | field[9] | FALSE |
| 729 | 65 | 101/e | FIG. 9b | [None] | a4 | field[9] | FALSE |
| 72a | 20 | 32/space | FIG. 9b | [None] | a3 | field[6] | FALSE |
| 72b | 49 | 73/I | FIG. 9b | [None] | a2 | field[9] | FALSE |
| 72c | 6e | 110/n | FIG. 9b | [None] | a1 | field[9] | FALSE |
| 72d | 6e | 110/n | FIG. 9b | [None] | a0 | field[9] | FALSE |
| 72e | 0a | | FIG. 10b | [None] | 9f | field[3] | FALSE |
| 72f | 0a | | FIG. 10b | [None] | 9e | field[3] | FALSE |
| 730 | 44 | 68/D | FIG. 9b | [None] | 9d | field[9] | FALSE |
| 731 | 65 | 101/e | FIG. 9b | [None] | 9c | field[9] | FALSE |
| 732 | 6e | 110/n | FIG. 9b | [None] | 9b | field[9] | FALSE |
| 733 | 76 | 118/v | FIG. 9b | [None] | 9a | field[9] | FALSE |
| 734 | 65 | 101/e | FIG. 9b | [None] | 99 | field[9] | FALSE |
| 735 | 72 | 114/r | FIG. 9b | [None] | 98 | field[9] | FALSE |
| 736 | 20 | 32/space | FIG. 9b | [None] | 97 | field[6] | FALSE |
| 737 | 74 | 116/t | FIG. 9b | [None] | 96 | field[9] | FALSE |
| 738 | 6f | 110/o | FIG. 9b | [None] | 95 | field[9] | FALSE |
| 739 | 3a | 58/: | FIG. 9b | [None] | 94 | field[8] | FALSE |
| 73a | c1 | | FIG. 10d | Center_Align_Tab_Left_M | 93 | field[11] | |
| 743 | 4d | 77/M | FIG. 9b | [None] | 8a | field[9] | FALSE |
| 744 | 61 | 97/a | FIG. 9b | [None] | 89 | field[9] | FALSE |
| 745 | 75 | 117/u | FIG. 9b | [None] | 88 | field[9] | FALSE |
| 746 | 69 | 105/i | FIG. 9b | [None] | 87 | field[9] | TRUE |
| 747 | 0a | | FIG. 10b | [None] | 86 | field[3] | FALSE |
| 748 | 24 | 36/$ | FIG. 9b | [None] | 85 | field[8] | FALSE |
| 749 | 37 | 55/7 | FIG. 9b | [None] | 84 | field[9] | FALSE |
| 74a | 38 | 56/8 | FIG. 9b | [None] | 83 | field[9] | FALSE |
| 74b | 39 | 59/9 | FIG. 9b | [None] | 82 | field[9] | FALSE |
| 74c | 20 | 32/space | FIG. 9b | [None] | 81 | field[6] | FALSE |
| 74d | 52 | 82/R | FIG. 9b | [None] | 80 | field[9] | FALSE |
| 74e | 6f | 111/o | FIG. 9b | [None] | 7f | field[9] | FALSE |
| 74f | 75 | 117/u | FIG. 9b | [None] | 7e | field[9] | FALSE |
| 750 | 6e | 110/n | FIG. 9b | [None] | 7d | field[9] | FALSE |
| 751 | 64 | 100/d | FIG. 9b | [None] | 7c | field[9] | FALSE |
| 752 | 20 | 32/space | FIG. 9b | [None] | 7b | field[6] | FALSE |
| 753 | 54 | 84/T | FIG. 9b | [None] | 7a | field[9] | FALSE |
| 754 | 72 | 114/r | FIG. 9b | [None] | 79 | field[9] | FALSE |
| 755 | 69 | 105/i | FIG. 9b | [None] | 78 | field[9] | FALSE |
| 756 | 70 | 112/p | FIG. 9b | [None] | 77 | field[9] | FALSE |
| 757 | 0a | | FIG. 10b | [None] | 76 | field[3] | FALSE |
| 758 | 31 | 49/1 | FIG. 9b | [None] | 75 | field[9] | FALSE |
| 759 | 30 | 48/0 | FIG. 9b | [None] | 74 | field[9] | FALSE |
| 75a | 20 | 32/space | FIG. 9b | [None] | 73 | field[6] | FALSE |
| 75b | 44 | 68/D | FIG. 9b | [None] | 72 | field[9] | FALSE |
| 75c | 61 | 97/a | FIG. 9b | [None] | 71 | field[9] | FALSE |
| 75d | 79 | 121/y | FIG. 9b | [None] | 70 | field[9] | FALSE |
| 75e | 73 | 115/s | FIG. 9b | [None] | 6f | field[9] | FALSE |
| 75f | 20 | 32/space | FIG. 9b | [None] | 6e | field[6] | FALSE |
| 760 | 41 | 65/A | FIG. 9b | [None] | 6d | field[9] | FALSE |
| 761 | 63 | 99/c | FIG. 9b | [None] | 6c | field[9] | FALSE |
| 762 | 63 | 99/c | FIG. 9b | [None] | 6b | field[9] | FALSE |
| 763 | 6f | 111/o | FIG. 9b | [None] | 6a | field[9] | FALSE |
| 764 | 6d | 109/m | FIG. 9b | [None] | 69 | field[9] | FALSE |
| 765 | 6f | 111/o | FIG. 9b | [None] | 68 | field[9] | FALSE |
| 766 | 64 | 100/d | FIG. 9b | [None] | 67 | field[9] | FALSE |
| 767 | 61 | 97/a | FIG. 9b | [None] | 66 | field[9] | FALSE |
| 768 | 74 | 116/t | FIG. 9b | [None] | 65 | field[9] | FALSE |

TABLE 28-continued

| offset in file (cptr) | character in val (hex) | dec/ascii | lookup | multi-byte protocol | charstodo (hex) | statistics field | filter result |
|---|---|---|---|---|---|---|---|
| 769 | 69 | 105/i | FIG. 9b | [None] | 64 | field[9] | FALSE |
| 76a | 6f | 111/o | FIG. 9b | [None] | 63 | field[9] | FALSE |
| 76b | 6e | 110/n | FIG. 9b | [None] | 62 | field[9] | FALSE |
| 76c | 73 | 115/s | FIG. 9b | [None] | 61 | field[9] | FALSE |
| 76d | 0a |  | FIG. 10b | [None] | 60 | field[3] | FALSE |
| 76e | 54 | 84/T | FIG. 9b | [None] | 5f | field[9] | FALSE |
| 76f | 6f | 111/o | FIG. 9b | [None] | 5e | field[9] | FALSE |
| 770 | 6c | 109/m | FIG. 9b | [None] | 5d | field[9] | FALSE |
| 771 | 6f | 111/o | FIG. 9b | [None] | 5c | field[9] | FALSE |
| 772 | 66 | 102/f | FIG. 9b | [None] | 5b | field[9] | FALSE |
| 773 | 61 | 97/a | FIG. 9b | [None] | 5a | field[9] | FALSE |
| 774 | 20 | 32/space | FIG. 9b | [None] | 59 | field[6] | FALSE |
| 775 | 50 | 90/p | FIG. 9b | [None] | 58 | field[9] | FALSE |
| 776 | 6c | 108/l | FIG. 9b | [None] | 57 | field[9] | FALSE |
| 777 | 61 | 97/a | FIG. 9b | [None] | 56 | field[9] | FALSE |
| 778 | 7a | 122/z | FIG. 9b | [None] | 55 | field[9] | FALSE |
| 779 | 61 | 97/a | FIG. 9b | [None] | 54 | field[9] | FALSE |
| 77a | 0a |  | FIG. 10b | [None] | 53 | field[3] | FALSE |
| 77b | 0a |  | FIG. 10b | [None] | 52 | field[3] | FALSE |
| 77c | 44 | 68/D | FIG. 9b | [None] | 51 | field[9] | FALSE |
| 77d | 65 | 101/e | FIG. 9b | [None] | 50 | field[9] | FALSE |
| 77e | 6e | 110/n | FIG. 9b | [None] | 4f | field[9] | FALSE |
| 77f | 76 | 118/v | FIG. 9b | [None] | 4e | field[9] | FALSE |
| 780 | 65 | 101/e | FIG. 9b | [None] | 4d | field[9] | FALSE |
| 781 | 72 | 114/r | FIG. 9b | [None] | 4c | field[9] | FALSE |
| 782 | 20 | 32/space | FIG. 9b | [None] | 4b | field[6] | FALSE |
| 783 | 74 | 116/t | FIG. 9b | [None] | 4a | field[9] | FALSE |
| 784 | 6f | 111/o | FIG. 9b | [None] | 49 | field[9] | FALSE |
| 785 | 3a | 58/: | FIG. 9b | [None] | 48 | field[8] | FALSE |
| 786 | c1 |  | FIG. 10d | Center_Align_Tab_Left_M | 47 | field[11] | FALSE |
| 78f | 4a | 74/J | FIG. 9b | [None] | 3e | field[9] | FALSE |
| 790 | 61 | 97/a | FIG. 9b | [None] | 3d | field[9] | FALSE |
| 791 | 6d | 109/m | FIG. 9b | [None] | 3c | field[9] | FALSE |
| 792 | 61 | 97/a | FIG. 9b | [None] | 3b | field[9] | FALSE |
| 793 | 69 | 105/i | FIG. 9b | [None] | 3a | field[9] | FALSE |
| 794 | 63 | 99/c | FIG. 9b | [None] | 39 | field[9] | FALSE |
| 795 | 61 | 97/a | FIG. 9b | [None] | 38 | field[9] | FALSE |
| 796 | 0a |  | FIG. 10b | [None] | 37 | field[3] | FALSE |
| 797 | 24 | 36/6 | FIG. 9b | [None] | 36 | field[9] | FALSE |
| 798 | 31 | 49/1 | FIG. 9b | [None] | 35 | field[9] | FALSE |
| 799 | 31 | 49/1 | FIG. 9b | [None] | 34 | field[9] | FALSE |
| 79a | 30 | 48/0 | FIG. 9b | [None] | 33 | field[9] | FALSE |
| 79b | 30 | 48/0 | FIG. 9b | [None] | 32 | field[9] | FALSE |
| 79c | 20 | 32/space | FIG. 9b | [None] | 31 | field[6] | FALSE |
| 79d | 52 | 82/R | FIG. 9b | [None] | 30 | field[9] | FALSE |
| 79e | 6f | 111/o | FIG. 9b | [None] | 2f | field[9] | FALSE |
| 79f | 75 | 117/u | FIG. 9b | [None] | 2e | field[9] | FALSE |
| 7a0 | 6e | 110/n | FIG. 9b | [None] | 2d | field[9] | FALSE |
| 7a1 | 64 | 100/d | FIG. 9b | [None] | 2c | field[9] | FALSE |
| 7a2 | 20 | 32/space | FIG. 9b | [None] | 2b | field[6] | FALSE |
| 7a3 | 54 | 84/T | FIG. 9b | [None] | 2a | field[9] | FALSE |
| 7a4 | 72 | 114/r | FIG. 9b | [None] | 29 | field[9] | FALSE |
| 7a5 | 69 | 105/i | FIG. 9b | [None] | 28 | field[9] | FALSE |
| 7a6 | 70 | 112/p | FIG. 9b | [None] | 27 | field[9] | FALSE |
| 7a7 | 0a |  | FIG. 10b | [None] | 26 | field[3] | FALSE |
| 7a8 | 36 | 54/6 | FIG. 9b | [None] | 25 | field[9] | FALSE |
| 7a9 | 20 | 32/space | FIG. 9b | [None] | 24 | field[6] | FALSE |
| 7aa | 44 | 68/D | FIG. 9b | [None] | 23 | field[9] | FALSE |
| 7ab | 61 | 97/a | FIG. 9b | [None] | 22 | field[9] | FALSE |
| 7ac | 79 | 121/y | FIG. 9b | [None] | 21 | field[9] | FALSE |
| 7ad | 73 | 115/s | FIG. 9b | [None] | 20 | field[9] | FALSE |
| 7ae | 20 | 32/space | FIG. 9b | [None] | 1f | field[6] | FALSE |
| 7af | 41 | 65/A | FIG. 9b | [None] | 1e | field[9] | FALSE |
| 7b0 | 63 | 99/c | FIG. 9b | [None] | 1d | field[9] | FALSE |
| 7b1 | 63 | 99/c | FIG. 9b | [None] | 1c | field[9] | FALSE |
| 7b2 | 6f | 111/o | FIG. 9b | [None] | 1b | field[9] | FALSE |
| 7b3 | 6d | 109/m | FIG. 9b | [None] | 1a | field[9] | FALSE |
| 7b4 | 6f | 111/o | FIG. 9b | [None] | 19 | field[9] | FALSE |
| 7b5 | 64 | 100/d | FIG. 9b | [None] | 18 | field[9] | FALSE |
| 7b6 | 61 | 97/a | FIG. 9b | [None] | 17 | field[9] | FALSE |
| 7b7 | 74 | 116/t | FIG. 9b | [None] | 16 | field[9] | FALSE |
| 7b8 | 69 | 105/i | FIG. 9b | [None] | 15 | field[9] | FALSE |
| 7b9 | 6f | 111/o | FIG. 9b | [None] | 14 | field[9] | FALSE |
| 7ba | 6e | 110/n | FIG. 9b | [None] | 13 | field[9] | FALSE |
| 7bb | 73 | 115/s | FIG. 9b | [None] | 12 | field[9] | FALSE |
| 7bc | 0a |  | FIG. 10b | [None] | 11 | field[3] | FALSE |

TABLE 28-continued

| offset in file (cptr) | character in val (hex) | dec/ascii | lookup | multi-byte protocol | charstodo (hex) | statistics field | filter result |
|---|---|---|---|---|---|---|---|
| 7bd | 43 | 67/C | FIG. 9b | [None] | 10 | field[9] | FALSE |
| 7be | 61 | 97/a | FIG. 9b | [None] | f | field[9] | FALSE |
| 7bf | 72 | 114/r | FIG. 9b | [None] | e | field[9] | FALSE |
| 7c0 | 69 | 105/i | FIG. 9b | [None] | d | field[9] | FALSE |
| 7c1 | 62 | 98/b | FIG. 9b | [None] | c | field[9] | FALSE |
| 7c2 | 62 | 98/b | FIG. 9b | [None] | b | field[9] | FALSE |
| 7c3 | 65 | 101/e | FIG. 9b | [None] | a | field[9] | FALSE |
| 7c4 | 61 | 97/a | FIG. 9b | [None] | 9 | field[9] | FALSE |
| 7c5 | 6e | 110/n | FIG. 9b | [None] | 8 | field[9] | FALSE |
| 7c6 | 20 | 32/space | FIG. 9b | [None] | 7 | field[6] | FALSE |
| 7c7 | 43 | 67/C | FIG. 9b | [None] | 6 | field[9] | FALSE |
| 7c8 | 6f | 111/o | FIG. 9b | [None] | 5 | field[9] | FALSE |
| 7c9 | 75 | 117/u | FIG. 9b | [None] | 4 | field[9] | FALSE |
| 7ca | 72 | 114/r | FIG. 9b | [None] | 3 | field[9] | FALSE |
| 7cb | 74 | 116/t | FIG. 9b | [None] | 2 | field[9] | FALSE |
| 7cc | 0a | | FIG. 10b | [None] | 1 | field[3] | FALSE |

As shown in Table 28 above, in the exemplary file Example (2) at offset 0x746 in cbfr, the status returned from TextFilterObject, at step 232 of FIG. 5, is TRUE.

| 746 | 69 | 105/i | FIG. 9b | [None] | 87 | field[9] | TRUE | indicating that the first of the two criteria for the enabled Filter channel has been satisfied. Therefore, the criterion applied to the rest of the characters in the file, from offset 0x747 through 0x7cc, is the second criterion in the Filter channel, the string "England". All remaining characters in the file are parsed without the second criterion being satisfied. Note that the string "England" is in the exemplary file Example (2), but the filter criteria fail because the criteria require that "England" appear after "Denver to: Maui", whereas in the exemplary file Example (2), "England" appears before "Denver to: Maui".

Referring to FIG. 4, at step 108 processing control is returned to ParseText for display of the filter and statistics results. The statistics counters are cleared at step 110, and the control logic is exited at step 112.

While the invention of this application is susceptible to various modifications and alternative forms, specific examples thereof have been shown in the drawings and are herein described in detail. It should be understood, however, that the invention is not limited to the particular forms or methods disclosed, but to the contrary, the invention is to cover all modifications, equivalents, and alternatives falling within the spirit and scope of the appended claims.

What is claimed is:

1. A method for parsing data according to configurable criteria, the method comprising steps of:
    storing in a first data storage device a plurality of programmably configurable protocol descriptions that define a plurality of control character characteristics of the data;
    storing in a second data storage device a program for controlling a data parsing function to be executed by a processing unit, the program including instructions for causing the processing unit to selectively retrieve at least one of the programmably configurable protocol descriptions from the first data storage device and to vary the execution of the data parsing function based upon the at least one retrieved protocol description file;
    delivering the program for controlling the data parsing function to the processing unit;
    delivering the data to the processing unit; and
    enabling the processing unit to execute the data parsing function.

2. A method for filtering data, the method comprising the steps of:
    storing in a first data storage device a plurality of programmably configurable protocol descriptions, the programmably configurable protocol descriptions defining one or more data filter criteria;
    storing in a second data storage device a program for controlling a data filtering function to be executed by a processing unit, the program including instructions for causing the processing unit to selectively retrieve at least one of the programmably configurable protocol descriptions from the first data storage device and to vary the execution of the data filtering function based upon the at least one retrieved protocol description;
    delivering to the processing unit the program for controlling the data filtering function;
    delivering to the processing unit the data; and
    enabling the processing unit to execute the data filtering function.

3. A method for filtering data, the method comprising the steps of:
    storing in a first data storage device a plurality of programmably configurable protocol descriptions and a plurality of programmably configurable filter channel descriptions, the programmably configurable filter channel descriptions defining one or more data filter criteria;
    storing in a second data storage device a program for controlling a data filtering function to be executed by a processing unit, the program including instructions for causing the processing unit to selectively retrieve at least one of the programmably configurable protocol descriptions and to selectively retrieve at least one of the programmably configurable filter channel descriptions from the first data storage device and to vary the execution of the data filtering function based upon the at least one retrieved protocol description and the at least one retrieved filter channel description;
    delivering to the processing unit the program for controlling the data filtering function;
    delivering to the processing unit the data; and
    enabling the processing unit to execute the data filtering function.

4. A method for gathering statistics on data, the method comprising the steps of:

storing in a first data storage device a plurality of programmably configurable protocol descriptions, the programmably configurable protocol descriptions defining at least one data statistics gathering criterion;

storing in a second data storage device a program for controlling a data statistics gathering function to be executed by a processing unit, the program including instructions for causing the processing unit to selectively retrieve at least one of the programmably configurable protocol descriptions from the first data storage device and to vary the execution of the data statistics gathering function based upon the at least one retrieved protocol description;

delivering to the processing unit the program for controlling the data statistics gathering function;

delivering to the processing unit the data; and enabling the processing unit to execute the data statistics gathering function.

5. A method for executing data conversion on data files, the method comprising the steps of:

storing in a first data storage device a plurality of programmably configurable protocol descriptions, the programmably configurable protocol descriptions defining at least one data conversion;

storing in a second data storage device a program for controlling a data conversion function to be executed by a processing unit, the program including instructions for causing the processing unit to selectively retrieve the at least one programmably configurable protocol description from the first data storage device and to vary the execution of the data conversion function based upon the at least one retrieved protocol description;

delivering to the processing unit the program for controlling the data conversion function;

delivering to the processing unit the data; and enabling the processing unit to execute the data conversion function.

6. A system for manipulating data files, the system comprising:

a logic control module capable of accessing a plurality of programmably configurable protocol descriptions stored in a data storage device, the programmably configurable protocol descriptions each including a protocol control record and at least one field sub-record for defining a selected portion of a data character set protocol definition to be manipulated and a plurality of rules for manipulating said portion of said protocol;

the logic control module including file and protocol header length determination logic, data conversion logic, statistics gathering logic, next protocol determination logic, filtering logic, and logic for controlling, based upon the programmably configurable protocol description, one or more character manipulation functions to be implemented by the system.

7. A machine implemented process for parsing data according to programmably configurable criteria, the process comprising the steps of:

storing at least one programmably configurable protocol description in a data storage device, the at least one programmably configurable protocol description comprising a protocol control record and at least one field sub-record for defining a plurality of data characteristics;

retrieving the at least one protocol description from the data storage device; and providing the at least one protocol description file to a logic control module, the logic control module, upon receiving the at least one protocol description, being configured to parse data based upon the characteristics defined by the protocol description.

8. The process of claim 7, wherein a plurality of programmably configurable protocol descriptions are stored in the data storage device, and wherein the programmably configurable protocol descriptions are selectively retrieved from the data storage device in response to selected data sequences.

9. A machine implemented process for filtering data according to programmably configurable criteria, the process comprising the steps of:

storing at least one programmably configurable protocol description in a data storage device, the at least one programmably configurable protocol description comprising a protocol control record and at least one field sub-record for defining a plurality of characteristics of the data;

retrieving the at least one protocol description from the data storage device; and providing the at least one protocol description to a logic control module, the logic control module, upon receiving the at least one protocol description, being configured to filter data based upon the characteristics defined in the protocol description.

10. The process of claim 9, wherein a plurality of programmably configurable protocol descriptions are stored in the data storage device, and wherein the programmably configurable protocol descriptions are selectively retrieved from the data storage device in response to selected data sequences.

11. A machine implemented process for gathering statistics on data characteristics according to programmably configurable criteria, the process comprising the steps of:

storing at least one programmably configurable protocol description in a data storage device, the at least one programmably configurable protocol description comprising a protocol control record and at least one field sub-record for defining a plurality of characteristics of the data;

retrieving the at least one protocol description from the data storage device; and providing the at least one protocol description to a logic control module, the logic control module, upon receiving the at least one protocol description, being configured to gather statistics based upon the characteristics defined in the protocol description.

12. The process of claim 11, wherein a plurality of programmably configurable protocol descriptions are stored in the data storage device, and wherein the programmably configurable protocol descriptions are selectively retrieved from the data storage device in response to selected data sequences.

13. A machine implemented process for converting data characters according to programmably configurable criteria, the process comprising the steps of:

storing at least one programmably configurable protocol description file in a data storage device, the at least one programmably configurable protocol description file comprising a protocol control record and at least one field sub-record for defining a plurality of characteristics of the data;

retrieving the at least one protocol description from the data storage device; and providing the at least one protocol description to a logic control module configured such that upon receiving the at least one protocol description, the logic control module converts data characters based upon the characteristics defined by the protocol description.

14. The process of claim 13, wherein a plurality of programmably configurable protocol descriptions are stored in the data storage device, and wherein the programmably configurable protocol descriptions are selectively retrieved from the data storage device in response to selected data sequences.

* * * * *